United States Patent
Kim et al.

(10) Patent No.: US 11,122,608 B2
(45) Date of Patent: Sep. 14, 2021

(54) METHOD AND APPARATUS FOR TRANSMITTING AND RECEIVING REFERENCE SIGNALS IN A WIRELESS COMMUNICATION SYSTEM

(71) Applicant: LG Electronics Inc., Seoul (KR)

(72) Inventors: Kyuseok Kim, Seoul (KR); Hyungtae Kim, Seoul (KR); Haewook Park, Seoul (KR); Jiwon Kang, Seoul (KR); Kijun Kim, Seoul (KR); Jonghyun Park, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/099,954

(22) PCT Filed: Jul. 10, 2018

(86) PCT No.: PCT/KR2018/007787
§ 371 (c)(1),
(2) Date: Feb. 7, 2019

(87) PCT Pub. No.: WO2019/027151
PCT Pub. Date: Feb. 7, 2019

(65) Prior Publication Data
US 2020/0178287 A1    Jun. 4, 2020

Related U.S. Application Data

(60) Provisional application No. 62/544,253, filed on Aug. 11, 2017, provisional application No. 62/541,150, (Continued)

(51) Int. Cl.
*H04W 72/12* (2009.01)
*H04L 5/00* (2006.01)

(52) U.S. Cl.
CPC ......... *H04W 72/1289* (2013.01); *H04L 5/001* (2013.01); *H04L 5/0051* (2013.01); *H04L 5/0094* (2013.01)

(58) Field of Classification Search
CPC ............. H04W 72/1289; H04L 5/0051; H04L 5/0094; H04L 5/001
See application file for complete search history.

(56) References Cited

U.S. PATENT DOCUMENTS

2012/0188937 A1*  7/2012  Wang .................... H04L 5/0048
                                                                    370/315
2012/0300718 A1*  11/2012  Ji .......................... H04L 5/0051
                                                                    370/329
(Continued)

FOREIGN PATENT DOCUMENTS

JP      2013502812       1/2013
KR    1020100132459    12/2010
(Continued)

OTHER PUBLICATIONS

3GPP TSG RAN WG1 NR ad-hoc#2—R1-1710196 ZTE Discussion on downlink DMRS design Jun. 2017 (Year: 2017).*
(Continued)

*Primary Examiner* — Rina C Pancholi
(74) *Attorney, Agent, or Firm* — Fish & Richardson P.C.

(57) ABSTRACT

Disclosed is a method and apparatus for transmitting and receiving a Reference Signal (RS) performed by a User Equipment (UE) in a wireless communication system. According to the present invention, a method and apparatus includes receiving a first Dedicated Demodulation Reference Signal and a first Physical Downlink Shared Channel (PDSCH); receiving a Physical Downlink Control Channel (PDCCH) including Downlink Control Information (DCI) in relation to a configuration of the second Dedicated Demodulation Reference Signal based on the first PDSCH; and
(Continued)

receiving the second Dedicated Demodulation Reference Signal and a second PDSCH based on the PDCCH, and the first Dedicated Demodulation Reference Signal is transmitted only on a single antenna port, and a configuration of the DCI is determined based on the maximum number of symbols to which the second Dedicated Demodulation Reference Signal is mapped.

20 Claims, 29 Drawing Sheets

Related U.S. Application Data filed on Aug. 4, 2017, provisional application No. 62/541,155, filed on Aug. 4, 2017.

(56) References Cited

U.S. PATENT DOCUMENTS

| | | | |
|---|---|---|---|
| 2012/0329400 A1* | 12/2012 | Seo | H04L 5/00 455/63.1 |
| 2013/0322229 A1* | 12/2013 | Yoon | H04L 5/0023 370/208 |
| 2014/0321421 A1 | 10/2014 | Popovic et al. | |
| 2015/0373694 A1* | 12/2015 | You | H04L 5/0094 370/329 |
| 2016/0020882 A1 | 1/2016 | Shimezawa et al. | |
| 2016/0087709 A1* | 3/2016 | Horiuchi | H04B 7/068 375/260 |
| 2018/0270699 A1* | 9/2018 | Babaei | H04W 28/0278 |
| 2018/0279358 A1* | 9/2018 | Babaei | H04W 72/14 |
| 2018/0316534 A1* | 11/2018 | Shin | H04L 5/0048 |
| 2019/0052420 A1* | 2/2019 | Manolakos | H04L 5/0012 |
| 2019/0159181 A1* | 5/2019 | Manolakos | H04B 7/0617 |
| 2019/0182009 A1* | 6/2019 | Mondal | H04L 5/003 |
| 2019/0342062 A1* | 11/2019 | Ren | H04L 5/00 |

FOREIGN PATENT DOCUMENTS

| | | |
|---|---|---|
| KR | 1020110085878 | 7/2011 |
| KR | 1020130054180 | 5/2013 |
| WO | WO2012074273 | 10/2012 |

OTHER PUBLICATIONS

3GPP TSG RAN WG1 NR ad-hoc#2—R1-1710182 ZTE On transmission setting Jun. 2017 (Year: 2017).*
Ericsson, "On DL DMRS design", R1-1711043, 3GPP TSG-RAN WG1 NR Ad-Hoc#2, Qingdao, P.R. China, dated Jun. 27-30, 2017, 7 pages.
Qualcomm, "Remaining issues on NR DM-RS", R1-1711778, 3GPP TSG RAN WG1 NR Ad-Hoc#2, Qingdao, P.R. China, dated Jun. 27-30, 2017, 19 pages.
Ad-Hoc chair (Qualcomm), "Chairman's notes of AI 5.1.2 MIMO", R1-1711916, 3GPP TSG RAN WG1 NR Ad-Hoc#2, Qingdao, P.R. China, dated Jun. 27-30, 2017, 25 pages.
ETRI, "DMRS design for NR-PDCCH," R1-1710615, 3GPP TSG RAN WG1 NR Ad-Hoc#2, Qingdao, China, dated Jun. 27-30, 2017, 6 pages.
Extended European Search Report in European Application No. 18826912.0, dated Feb. 19, 2020, 7 pages.
LG Electronics, "On DL and UL DMRS design," R1-1713156, 3GPP TSG RAN WG1 Meeting #90, Prague, Czech Republic, dated Aug. 21-25, 2017, 16 pages.
ZTE, "Discussion on downlink DMRS design," R1-1710196, 3GPP TSG RAN WG1 NR Ad-Hoc#2, Qingdao, P.R. China, dated Jun. 27-30, 2017, 22 pages.
IN Office Action in Indian Appln. No. 202027008937, dated Jul. 3, 2021, 6 pages.

* cited by examiner (a)

(b)

(a)

(b)

(a)

(b)

(a)

(b)

(a)

(b)

METHOD AND APPARATUS FOR TRANSMITTING AND RECEIVING REFERENCE SIGNALS IN A WIRELESS COMMUNICATION SYSTEM

CROSS-REFERENCE TO RELATED APPLICATIONS

This application is a National Stage application under 35 U.S.C. § 371 of International Application No. PCT/KR2018/007787, filed on Jul. 10, 2018, which claims the benefit of U.S. Provisional Application No. 62/544,253, filed on Aug. 11, 2017, U.S. Provisional Application No. 62/541,155, filed on Aug. 4, 2017, and U.S. Provisional Application No. 62/541,150, filed on Aug. 4, 2017. The disclosures of the prior applications are incorporated by reference in their entirety.

TECHNICAL FIELD

The present invention relates to wireless communications, and more particularly, to a method for transmitting and receiving dedicated demodulation reference signals (DM-RSs) in a wireless communication system and an apparatus for the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method and apparatus for transmitting and receiving dedicated demodulation reference signals (DM-RSs).

In addition, an object of the present invention is to provide a method and apparatus for defining a Downlink Control Information (DCI) format for a User Equipment to receive DM-RSs.

In addition, an object of the present invention is to provide a method and apparatus for defining a DCI format differently depending on the number of symbols to which DM-RSs are mapped.

In addition, an object of the present invention is to provide a method and apparatus for defining a DCI format differently depending on a multiplexing method among antenna ports through which DM-RSs are transmitted.

In addition, an object of the present invention is to provide a method and apparatus for defining a DCI format differently depending on channel state information reported from a User Equipment.

The technical objects to attain in the present invention are not limited to the above-described technical objects and other technical objects which are not described herein will become apparent to those skilled in the art from the following description.

Technical Solution

A method for transmitting and receiving a Reference Signal (RS) performed by a User Equipment (UE) in a wireless communication system according to an embodiment of the present invention includes receiving a first Physical Downlink Shared Channel (PDSCH) including a number value representing a maximum number of symbols to which a first Dedicated Demodulation Reference Signal and a second Dedicated Demodulation Reference Signal are mapped; receiving a Physical Downlink Control Channel (PDCCH) including Downlink Control Information (DCI) in relation to a configuration of the second Dedicated Demodulation Reference Signal; and receiving the second Dedicated Demodulation Reference Signal and a second PDSCH based on the PDCCH, and a configuration of the DCI is determined based on the number value. In addition, in the present invention, the first Dedicated Demodulation Reference Signal is transmitted only on a single antenna port.

In addition, in the present invention, the first Dedicated Demodulation Reference Signal is mapped to a single symbol on a time axis and the second Dedicated Demodulation Reference Signal is mapped to one or two symbols on the time axis.

In addition, in the present invention, the DCI includes at least one of antenna port information in which the second Dedicated Demodulation Reference Signal is transmitted, number information of layers or number information of symbols.

In addition, in the present invention, the second Dedicated Demodulation Reference Signal is transmitted on different antenna ports, the different antenna ports are multiplexed through at least one multiplexing methods of Code Division Multiplexing (CDM) scheme or Frequency Division Multiplexing (FDM) scheme.

In addition, in the present invention, the DCI further includes port information of antenna ports for at least one multiplexing method.

In addition, in the present invention, the different antenna ports are multiplexed through the CDM scheme on frequency and/or time axis, and the DCI further includes port information of the different antenna ports.

In addition, in the present invention, the different antenna ports are multiplexed through the CDM scheme on a time axis and/or the FDM scheme on a frequency axis, and the DCI further includes port information of the different antenna ports.

In addition, in the present invention, the second Dedicated Demodulation Reference Signal is mapped on a time axis and a frequency axis according to a first configuration type and a second configuration type, and the DCI is configured according to the first configuration type and the second configuration type, respectively.

In addition, in the present invention, when the second Dedicated Demodulation Reference Signal is mapped according to a single time axis symbol and the first configuration type, a physical channel in which the second Dedicated Demodulation Reference Signal and the second PDSCH are transmitted is mapped on different frequency axis and time axis.

In addition, in the present invention, when the second Dedicated Demodulation Reference Signal is mapped according to a single time axis symbol and the first configuration type, the second Dedicated Demodulation Reference Signal is multiplexed with a physical channel in which the second PDSCH is transmitted using the CDM scheme.

In addition, in the present invention, the DCI further includes a Rank Indicator (RI) representing codebook subset restriction (CBSR).

In addition, in the present invention, the DCI is configured for layer values of a value smaller than a Rank Indicator having a maximum value among remaining Rank Indicators except the Rank Indicator.

In addition, in the present invention, the DCI is configured only for layer values corresponding to remaining Rank Indicators except the Rank Indicator.

In addition, the present invention further includes reporting channel state information representing a channel state to a BS, and the channel state information includes Rank Indicator values used for reporting the channel state information by the UE.

In addition, in the present invention, the DCI is configured for layer values corresponding to the Rank Indicator values.

In addition, in the present invention, the DCI is configured for layer values of a value smaller than a Rank Indicator value transmitted from the UE the most recently among the Rank Indicator values.

In addition, in the present invention further includes estimating a channel value for channel compensation based on the second Dedicated Demodulation Reference Signal; compensating a channel using the channel value; demodulating the second PDSCH; and decoding the demodulated second PDSCH.

In addition, a user equipment (UE) for transmitting and receiving a Reference Signal (RS) in a wireless communication system according to another embodiment of the present invention includes a radio frequency (RF) unit for transmitting and receiving a radio signal; and a processor functionally connected with the RF unit, and the processor is configured to perform: receiving a first Physical Downlink Shared Channel (PDSCH) including a number value representing a maximum number of symbols to which a first Dedicated Demodulation Reference Signal and a second Dedicated Demodulation Reference Signal are mapped; receiving a Physical Downlink Control Channel (PDCCH) including Downlink Control Information (DCI) in relation to a configuration of the second Dedicated Demodulation Reference Signal; and receiving the second Dedicated Demodulation Reference Signal and a second PDSCH based on the PDCCH, and a configuration of the DCI is determined based on the number value.

Technical Effects

According to the present invention, a DCI format is defined differently depending on the number of symbols to which DM-RSs are mapped, and accordingly, there is an effect of decreasing payload size of a DCI field.

In addition, according to the present invention, a DCI format is defined differently depending on a multiplexing method among antenna ports through which DM-RSs are transmitted, and the multiplexing method is restricted, and accordingly, overhead of the DCI may be reduced.

In addition, according to the present invention, the information transmitted from a Base Station restricts the number of layers defined in a DCI format through a Rank Indicator (RI) that indicates codebook subset restriction (CBSR), and accordingly, there is an effect of reducing payload size of a DCI field.

In addition, according to the present invention, a configuration of DM-RS for receiving a Physical Downlink Shared Channel (PDSCH) which is broadcasted before the configuration information of the DM-RS is restricted, and there is an effect for a User Equipment to receive the DM-RS efficiently.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
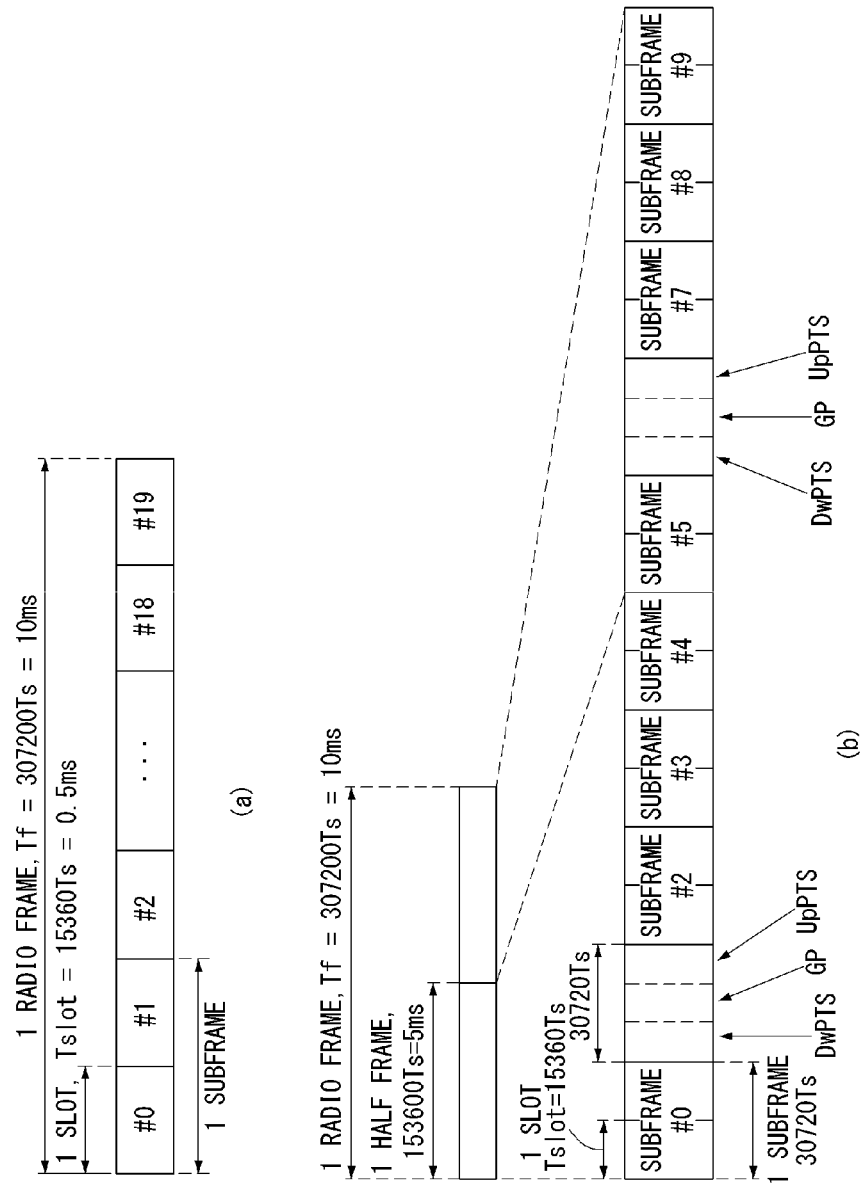
FIG. 1 shows the structure of a radio frame in a wireless communication system to which an embodiment of the present invention may be applied.

Hereinafter, preferred embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station (BS) (or eNB) has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an evolved-NodeB (eNB), a Base Transceiver System (BTS), an access point (AP), a transmitter, and the like. Furthermore, the terminal may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device, a receiver, and the like.

Hereinafter, downlink (DL) means communication from an eNB to a UE, and uplink (UL) means communication from a UE to an eNB. In DL, a transmitter may be part of an eNB, and a receiver may be part of a UE. In UL, a transmitter may be part of a UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

Definitions of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal.

Further, the configuration information as a kind of downlink control information may be transmitted through a physical downlink control channel (PDCCH) similarly to other scheduling information and may be commonly transmitted to all terminals in a cell through a broadcast channel as broadcasting information.

Table 2 below represents a configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame shown in FIG. 1 is only one example. The number of subcarriers included in a radio frame or the number of slots included in a subframe and the number of OFDM symbols included in a slot may be changed in various ways.

Figure 2:
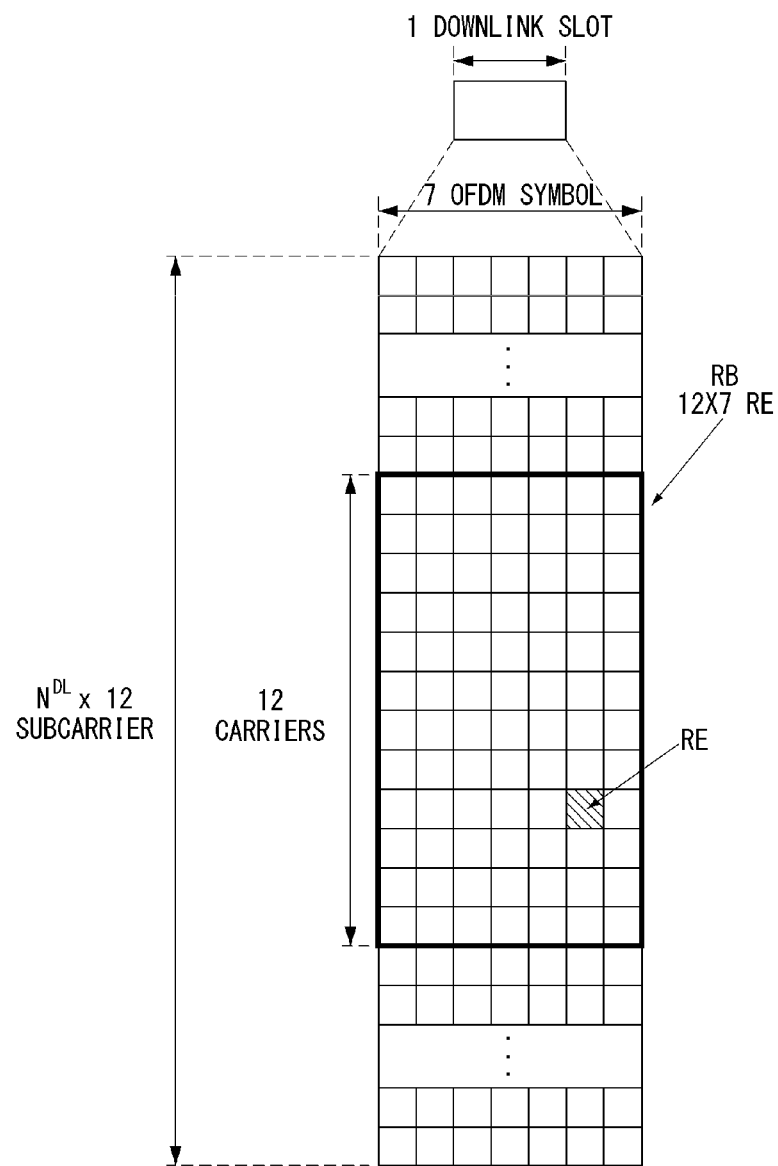
FIG. 2 is a diagram illustrating a resource grid for one downlink slot in a wireless communication system to which an embodiment of the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
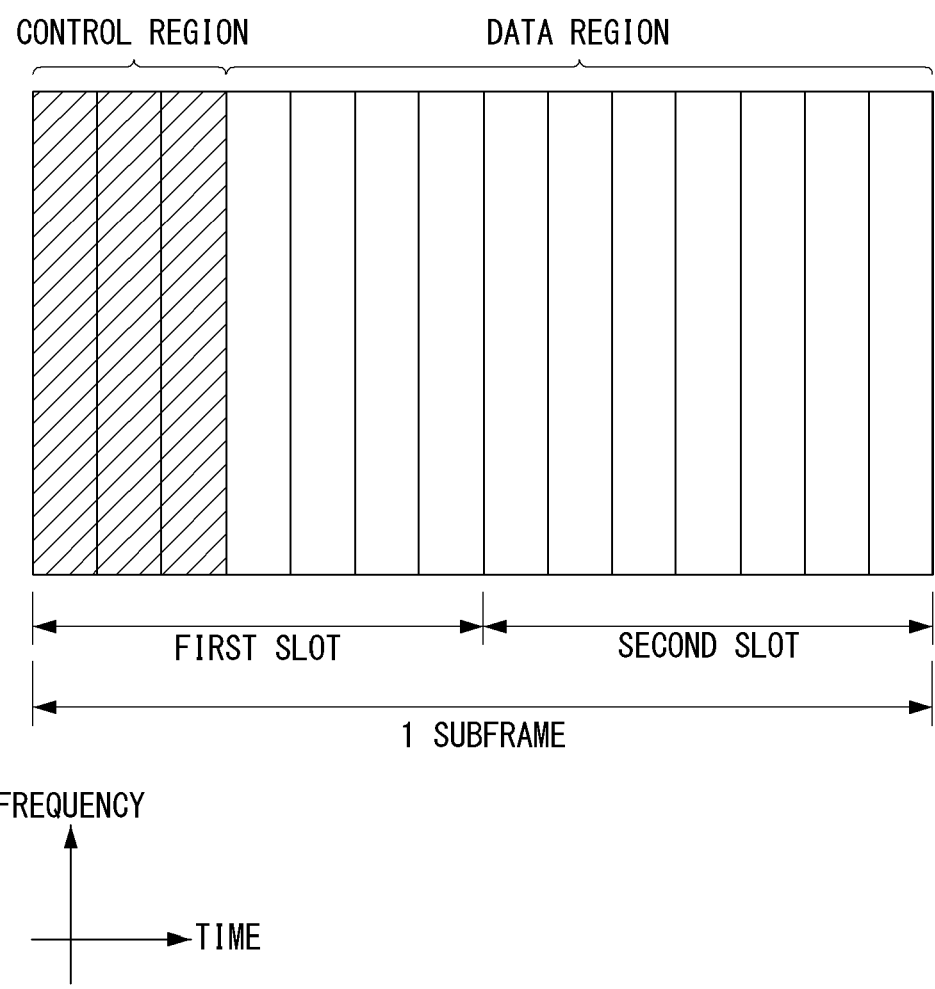
FIG. 3 shows the structure of a downlink subframe in a wireless communication system to which an embodiment of the present invention may be applied.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

PDCCH (Physical Downlink Control Channel)

Hereinafter, a PDCCH will be described in detail.

The control information transmitted via the PDCCH is referred to as downlink control information (DCI). The size and use of control information transmitted via the PDCCH may be changed according to DCI format or the size of control information may be changed according to coding rate.

Table 3 shows the DCI according to DCI format.

TABLE 3

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Referring to Table 3 above, the DCI format includes format 0 for scheduling of a PUSCH, format 1 for scheduling of one PDSCH codeword, format 1A for compact scheduling of one PDSCH codeword, format 1c for very compact scheduling of a DL-SCH, format 2 for PDSCH scheduling in a closed-loop spatial multiplexing mode, format 2A for PDSCH scheduling in an open-loop spatial multiplexing mode, formats 3 and 3A for transmission of a transmission power control (TPC) command for an uplink channel, and format 4 for PUSCH scheduling in a uplink cell in a multiple antenna port transmission mode.

DCI format 1A may be used for PDSCH scheduling regardless of the transmission mode of the UE.

Such DCI format is independently applicable per UE and PDCCHs of several UEs may be multiplexed within one subframe. The PDCCH is composed of an aggregate of one or several control channel elements (CCEs). The CCE is a logical allocation unit used to provide a PDCCH with a coding rate according to radio channel state. The CCE refers to a unit corresponding to 9 sets of REGs composed of four resource elements. The BS may use {1, 2, 4, 8} CCEs in order to configure one PDCCH signal and {1, 2, 4, 8} is referred to as a CCE aggregation level.

The number of CCEs used to transmit a specific PDCCH is determined by the BS according to channel state. The PDCCH configured according to UE is interleaved and mapped to a control channel region of each subframe by a CCE-to-RE mapping rule. The location of the PDCCH may depend on the number of OFDM symbols for a control channel of each subframe, the number of PHICH groups, transmit antenna, frequency shift, etc.

As described above, channel coding is performed independent of the multiplexed PDCCHs of the UEs and cyclic redundancy check (CRC) is applied. A unique identifier (UE ID) of each UE is masked to the CRC such that the UE receives the PDCCH thereof. However, in the control region allocated within the subframe, the BS does not provide the UE with information about where the PDCCH of the UE is located. Since the UE does not know the location of the PDCCH thereof and at which CCE aggregation level or with which DCI format the PDCCH thereof is transmitted, the UE monitors a set of PDCCH candidates within the subframe to detect the PDCCH thereof, in order to receive the control channel from the BS. This is referred to as blind decoding (BD).

The BD may also be referred to as blind detection or blind detect. The BD refers to a method of, at a UE, de-masking a UE ID thereof in a CRC portion, checking CRC errors, and determining whether a PDCCH is a control channel thereof.

Hereinafter, the information transmitted by DCI format 0 will be described.

DCI format 0 is used for PUSCH scheduling in one uplink cell.

Table 4 represents the information transmitted through DCI format 0.

TABLE 4

| Format 0 (Release 8) | Format 0 (Release 10) Carrier Indicator (CIF) |
| --- | --- |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |
| CSI request (1 bit) | CSI request (1 or 2 bits: 2 bit is for multi carrier) SRS request Resource allocation type (RAT) |

Referring to Table 3 above, the following information is transmitted through DCI format 0.

1) Carrier indicator, which has a length of 0 or 3 bits.

2) Flag for DCI format 0 and DCI format 1A differentiation, which has a length of 1 bit, and 0 indicates DCI format 0 and 1 indicates DCI format 1A 3) Frequency hopping flag, which has 1 bit. This field may used for the multi-cluster allocation for the Most Significant bit (MSB) of the corresponding resource allocation if it is required.

4) Resource block assignment and hopping resource allocation, which has $\lceil \log_2(N_{RB}^{DL}(N_{RB}^{DL}+1)/2) \rceil$ bit.

Herein, in the case of PUSCH hopping in a single-cluster allocation, in order to acquire the value of $ñ_{PRB(i)}$, the most significant bits (MSBs) of NUL_hop number are used. $(\lceil \log_2(N_{RB}^{UL}(N_{RB}^{UL}+1)/2) \rceil - N_{UL\_hop})$ bit provides the resource allocation of the first slot in the uplink subframe. In addition, in the case that there is no PUSCH hopping in the single-cluster allocation, $(\lceil \log_2(N_{RB}^{UL}(N_{RB}^{UL}+1)/2) \rceil)$ bit provides the resource allocation in the uplink subframe. In addition, in the case that there is no PUSCH hopping in a multi-cluster allocation, the resource allocation information is obtained from the concatenation between the frequency hoping flag field and the hopping resource allocation field of the resource block allocation, and $(\lceil \log_2(N_{RB}^{UL}(N_{RB}^{UL}+1)/2) \rceil)$ bit provides the resource allocation in the uplink subframe. In this case, value of P is determined by the number of downlink resource blocks.

5) Modulation and coding scheme (MCS), which has a length of 1 bit.

6) New data indicator, which has a length of 2 bits.

7) Transmit Power Control (TPC) command for PUSCH, which has a length of 2 bits.

8) Cyclic shift (CS) for a demodulation reference signal (DMRS) and an index of orthogonal cover/orthogonal cover code (OC/OCC), which has 3 bits.

9) Uplink index, which has a length of 2 bits. This field exits only for the TDD operation according to uplink-downlink configuration 0.

10) Downlink Assignment Index (DAI), which has a length of 2 bits. This field exits only for the TDD operation according to uplink-downlink configurations 1-6.

11) Channel State Information (CSI) request, which has a length of 1 bit or 2 bits. Herein, the field of 2 bits is applied only to the case that the corresponding DCI is mapped to the UE to which one or more downlink cells are configured by the Cell-RNTI (C-RNTI) in a UE-specific manner.

12) Sounding Reference Signal (SRS) request, which has a length of 0 bit or 1 bit. Herein, this field exists only in the case that the scheduling PUSCH is mapped by the C-RNTI in the UE-specific manner.

13) Resource allocation type, which has a length of 1 bit.

In the case that the number of information bits in DCI format 0 is smaller than the payload size (including additional padding bits) of DCI format 1A, 0 is added in order that DCI format 1A becomes identical to DCI format 0.

Figure 4:
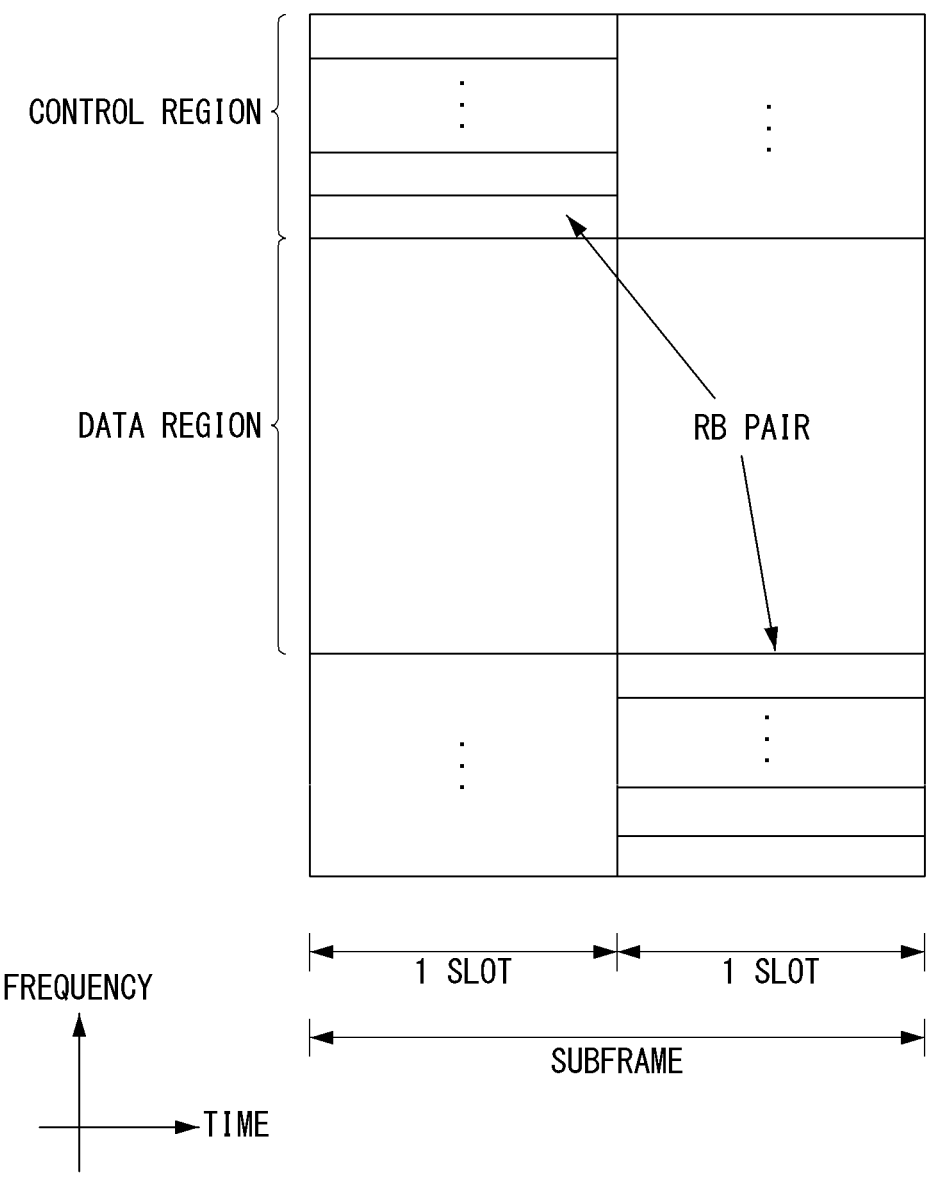
FIG. 4 shows the structure of an uplink subframe in a wireless communication system to which an embodiment of the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 5 given below.

TABLE 5

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

Figure 5:
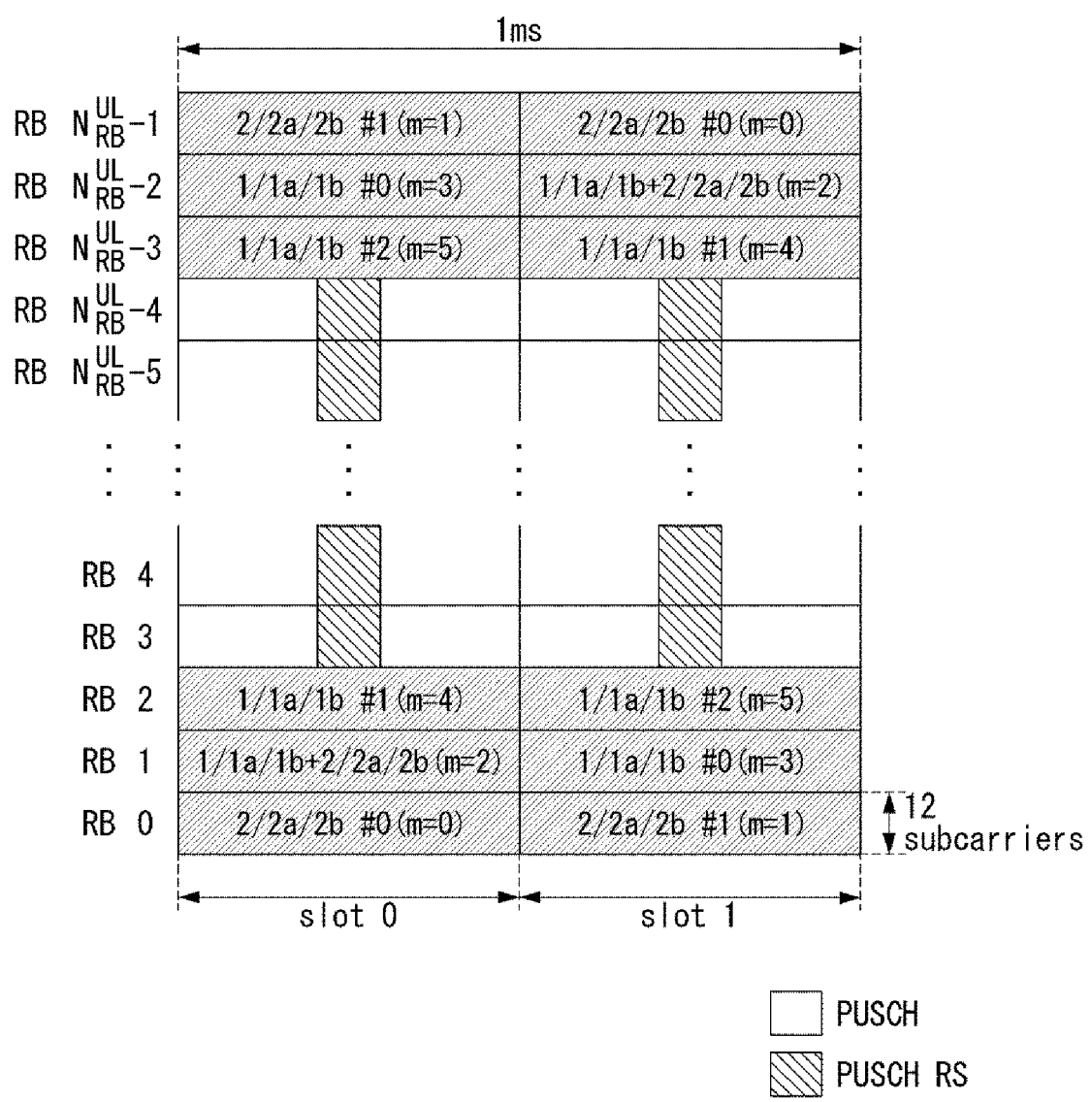
FIG. 5 illustrates one example of a type in which PUCCH formats are mapped to a PUCCH region of an uplink physical resource block in the wireless communication system to which the present invention can be applied.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and 0, 1, . . . , $N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
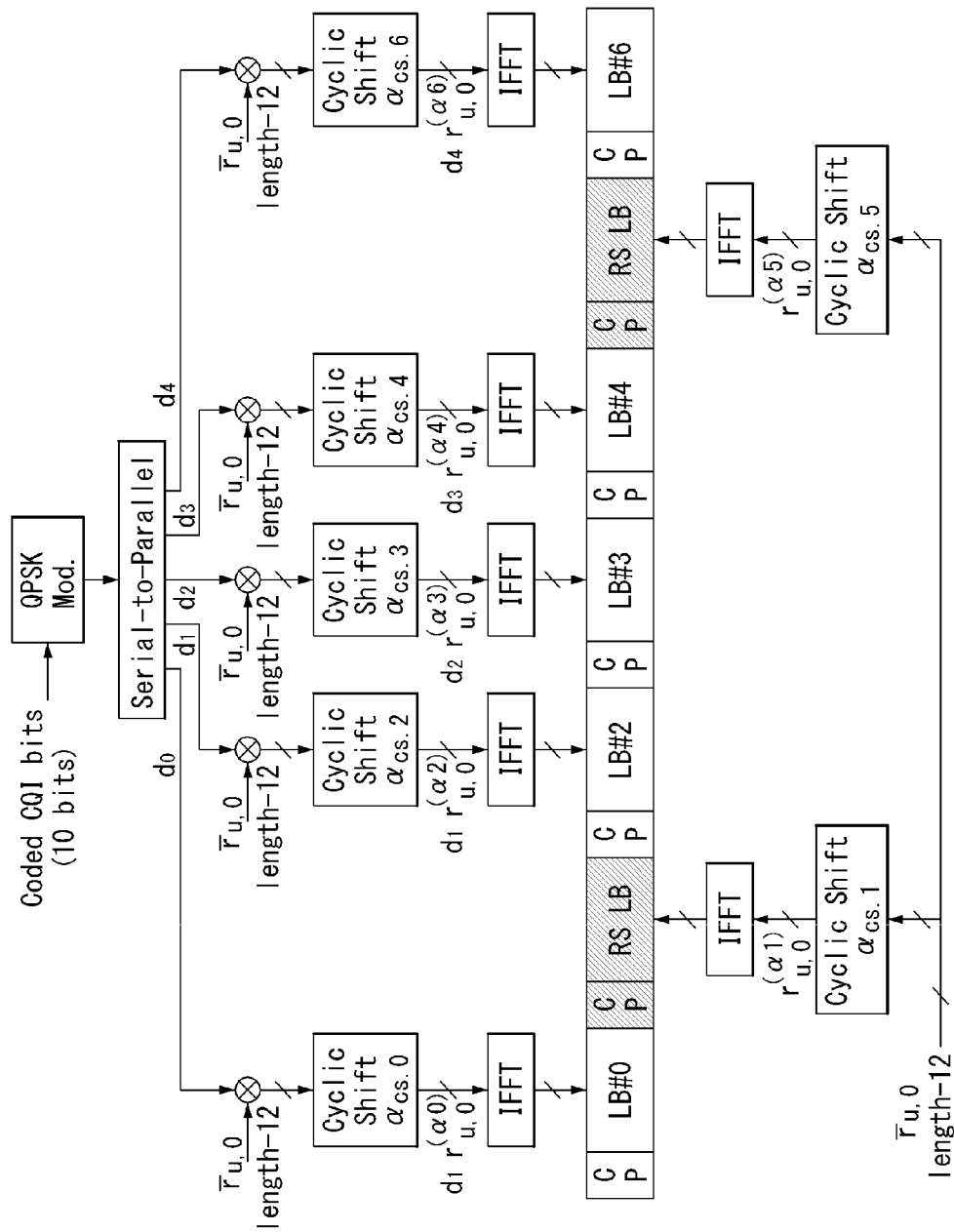
FIG. 6 illustrates a structure of a CQI channel in the case of a general CP in the wireless communication system to which the present invention can be applied.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, . . . , N−1) having a length of N becomes y(0), y(1), y(2), . . . , y(N−1). y(0), . . . , y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

Figure 7:
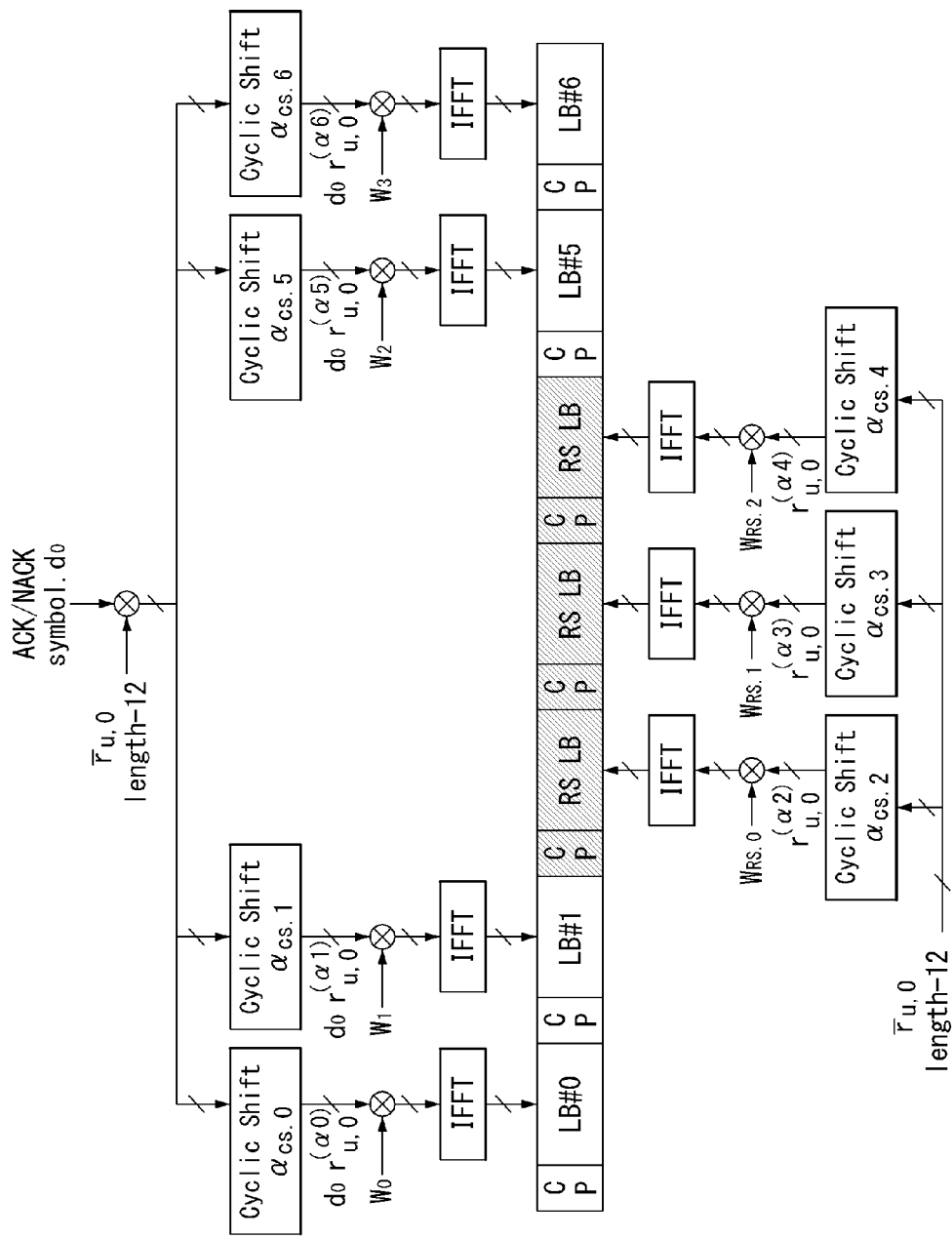
FIG. 7 illustrates a structure of an ACK/NACK channel in the case of a general CP in the wireless communication system to which the present invention can be applied.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

Figure 8:
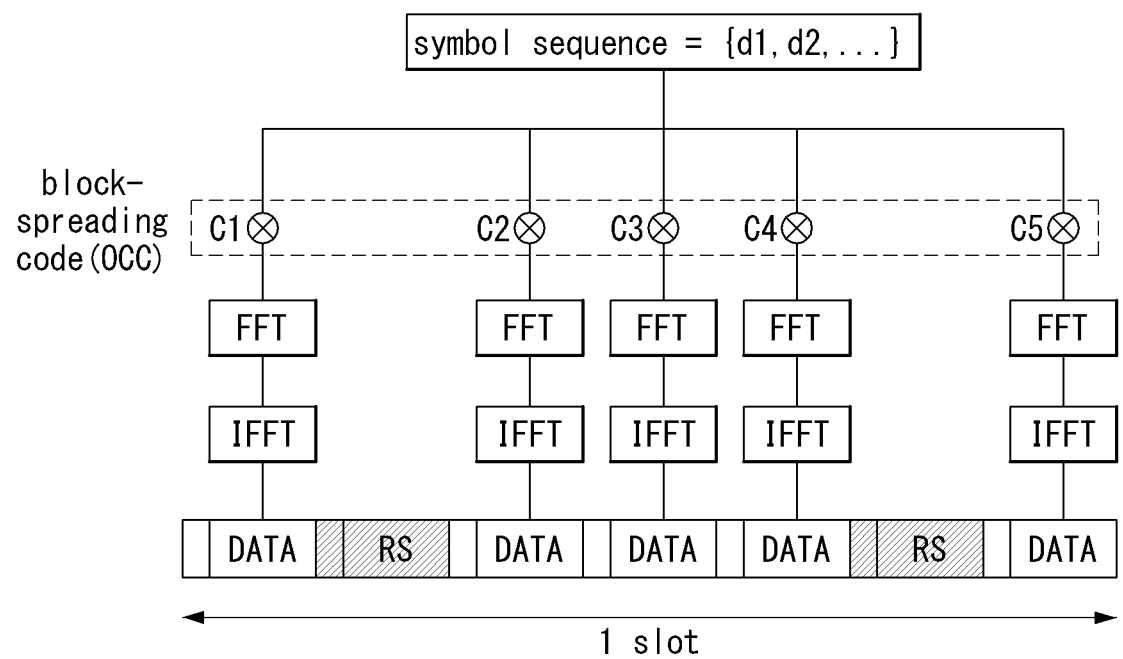
FIG. 8 illustrates one example of generating and transmitting 5 SC-FDMA symbols during one slot in the wireless communication system to which the present invention can be applied.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 9:
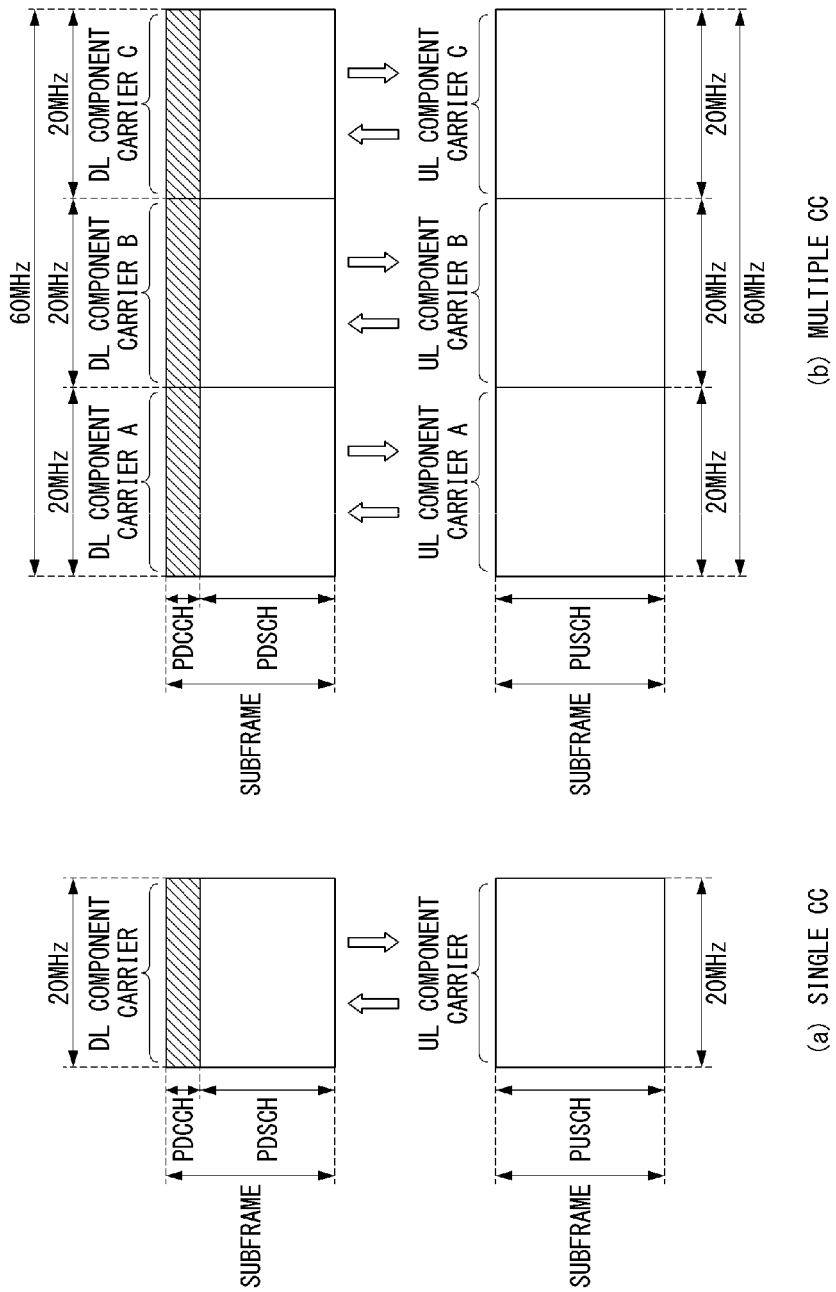
FIG. 9 illustrates examples of a component carrier and carrier aggregation in the wireless communication system to which the present invention can be applied.

FIG. 9 illustrates examples of a component carrier and carrier aggregation in the wireless communication system to which the present invention can be applied.

FIG. 9a illustrates a single carrier structure used in an LTE system. The component carrier includes the DL CC and the UL CC. One component carrier may have a frequency range of 20 MHz.

FIG. 9b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 10:
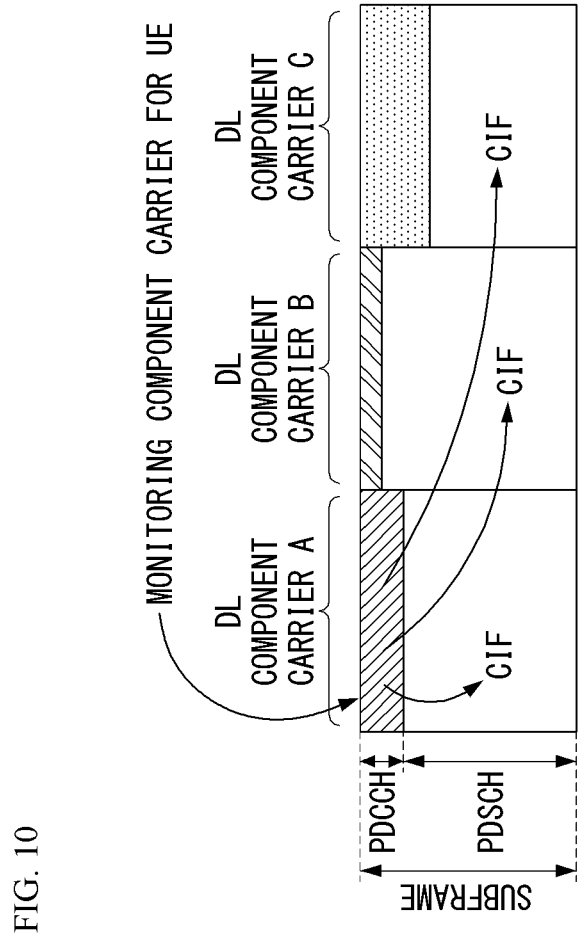
FIG. 10 illustrates one example of a subframe structure depending on cross carrier scheduling in the wireless communication system to which the present invention can be applied.

FIG. 10 illustrates one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

General ACK/NACK Multiplexing Method

In a situation in which the terminal simultaneously needs to transmit multiple ACKs/NACKs corresponding to multiple data units received from an eNB, an ACK/NACK mulplexign method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 6 given below.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |

TABLE 6-continued

| | |
|---|---|
| ACK, NACK/DTX, NACK/DTX, ACK | $n_{PUCCH,0}^{(1)}$ 0, 1 |
| ACK, NACK/DTX, NACK/DTX, NACK/DTX | $n_{PUCCH,0}^{(1)}$ 1, 1 |
| NACK/DTX, ACK, ACK, ACK | $n_{PUCCH,3}^{(1)}$ 0, 1 |
| NACK/DTX, NACK, DTX, DTX | $n_{PUCCH,1}^{(1)}$ 0, 0 |
| NACK/DTX, ACK, ACK, NACK/DTX | $n_{PUCCH,2}^{(1)}$ 1, 0 |
| NACK/DTX, ACK, NACK/DTX, ACK | $n_{PUCCH,3}^{(1)}$ 1, 0 |
| NACK/DTX, ACK, NACK/DTX, NACK/DTX | $n_{PUCCH,1}^{(1)}$ 0, 1 |
| NACK/DTX, NACK/DTX, ACK, ACK | $n_{PUCCH,3}^{(1)}$ 0, 1 |
| NACK/DTX, NACK/DTX, ACK, NACK/DTX | $n_{PUCCH,2}^{(1)}$ 0, 0 |
| NACK/DTX, NACK/DTX, NACK/DTX, ACK | $n_{PUCCH,3}^{(1)}$ 0, 0 |
| DTX, DTX, DTX, DTX | N/A     N/A |

In Table 5 given above, HARQ-ACK(i) represents an ACK/NACK result for an i-th data unit. In Table 3 given above, discontinuous transmission (DTX) means that there is no data unit to be transmitted for the corresponding HARQ-ACK(i) or that the terminal may not detect the data unit corresponding to the HARQ-ACK(i).

According to Table 5 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails to decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Validation of PDCCH for Semi-Persistent Scheduling

Semi-persistent scheduling (SPS) is a scheduling scheme that allocates the resource to the terminal to be persistently maintained during a specific time interval.

When a predetermined amount of data is transmitted for a specific time like a voice over Internet protocol (VoIP), since the control information need not be transmitted every data transmission interval for the resource allocation, the waste of the control information may be reduced by using the SPS scheme. In a so-called semi-persistent scheduling (SPS) method, a time resource domain in which the resource may be allocated to the terminal is preferentially allocated.

In this case, in a semi-persistent allocation method, a time resource domain allocated to a specific terminal may be configured to have periodicity. Then, a frequency resource domain is allocated as necessary to complete allocation of the time-frequency resource. Allocating the frequency resource domain may be designated as so-called activation. When the semi-persistent allocation method is used, since the resource allocation is maintained during a predetermined period by one-time signaling, the resource need not be repeatedly allocated, and as a result, signaling overhead may be reduced.

Thereafter, since the resource allocation to the terminal is not required, signaling for releasing the frequency resource allocation may be transmitted from the base station to the terminal. Releasing the allocation of the frequency resource domain may be designated as deactivation.

In current LTE, in which subframes the SPS is first transmitted/received through radio resource control (RRC) signaling for the SPS for the uplink and/or downlink is announced to the terminal. That is, the time resource is preferentially designated among the time and frequency resources allocated for the SPS through the RRC signaling. In order to announce a usable subframe, for example, a period and an offset of the subframe may be announced. However, since the terminal is allocated with only the time resource domain through the RRC signaling, even though the terminal receives the RRC signaling, the terminal does not immediately perform transmission and reception by the SPS and the terminal allocates the frequency resource domain as necessary to complete the allocation of the time-frequency resource. Allocating the frequency resource domain may be designated as deactivation and releasing the allocation of the frequency resource domain may be designated as deactivation.

Therefore, the terminal receives the PDCCH indicating the activation and thereafter, allocate the frequency resource according to RB allocation information included in the received PDCCH and applies modulation and code rate depending on modulation and coding scheme (MCS) information to start transmission and reception according to the period and the offset of the subframe allocated through the RRC signaling.

Next, when the terminal receives the PDCCH announcing the deactivation from the base station, the terminal stops transmission and reception. When the terminal receives the PDCCH indicating the activation or reactivation after stopping the transmission and reception, the terminal resumes the transmission and reception again with the period and the offset of the subframe allocated through the RRC signaling by using the RC allocation, the MCS, and the like designated by the PDCCH. That is, the time resource is performed through the RRC signaling, but the signal may be actually transmitted and received after receiving the PDCCH indicating the activation and reactivation of the SPS and the signal transmission and reception stop after receiving the PDCCH indicating the deactivation of the SPS.

When all conditions described below are satisfied, the terminal may validate a PDCCH including an SPS indication. First, a CRC parity bit added for a PDCCH payload needs to be scrambled with an SPS C-RNTI and second, a new data indicator (NDI) field needs to be set to 0. Herein, in the case of DCI formats 2, 2A, 2B, and 2C, the new data indicator field indicates one activated transmission block.

In addition, when each field used in the DCI format is set according to Tables 4 and 5 given below, the validation is completed. When the validation is completed, the terminal recognizes that received DCI information is valid SPS activation or deactivation (alternatively, release). On the contrary, when the validation is not completed, the terminal recognizes that a non-matching CRC is included in the received DCI format.

Table 7 shows a field for validating the PDCCH indicating the SPS activation.

TABLE 7

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and | MSB is set | N/A | N/A |

TABLE 7-continued

|  | DCI format 0 | DCI format 1/1A | DCI format 2/2A/2B |
| --- | --- | --- | --- |
| coding scheme and redundancy version | to '0' | | |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 8 shows a field for validating the PDCCH indicating the SPS deactivation (alternatively, release).

TABLE 8

|  | DCI format 0 | DCI format 1A |
| --- | --- | --- |
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

When the DCI format indicates SPS downlink scheduling activation, a TPC command value for the PUCCH field may be used as indexes indicating four PUCCH resource values set by the upper layer.

PUCCH Piggybacking in Rel-8 LTE

Figure 11:
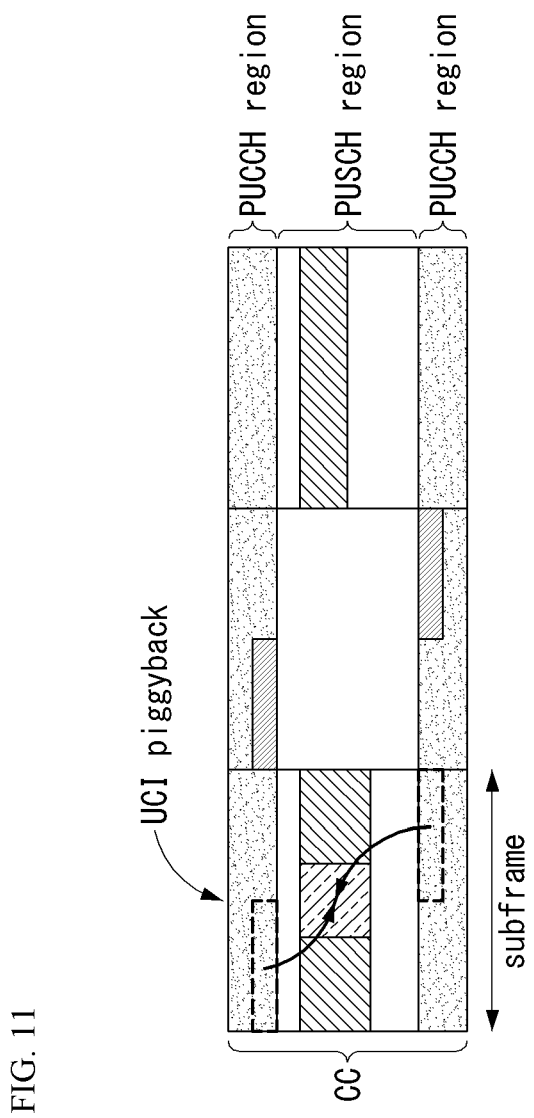
FIG. 11 illustrates one example of transport channel processing of a UL-SCH in the wireless communication system to which the present invention can be applied.

FIG. 11 illustrates one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

Figure 12:
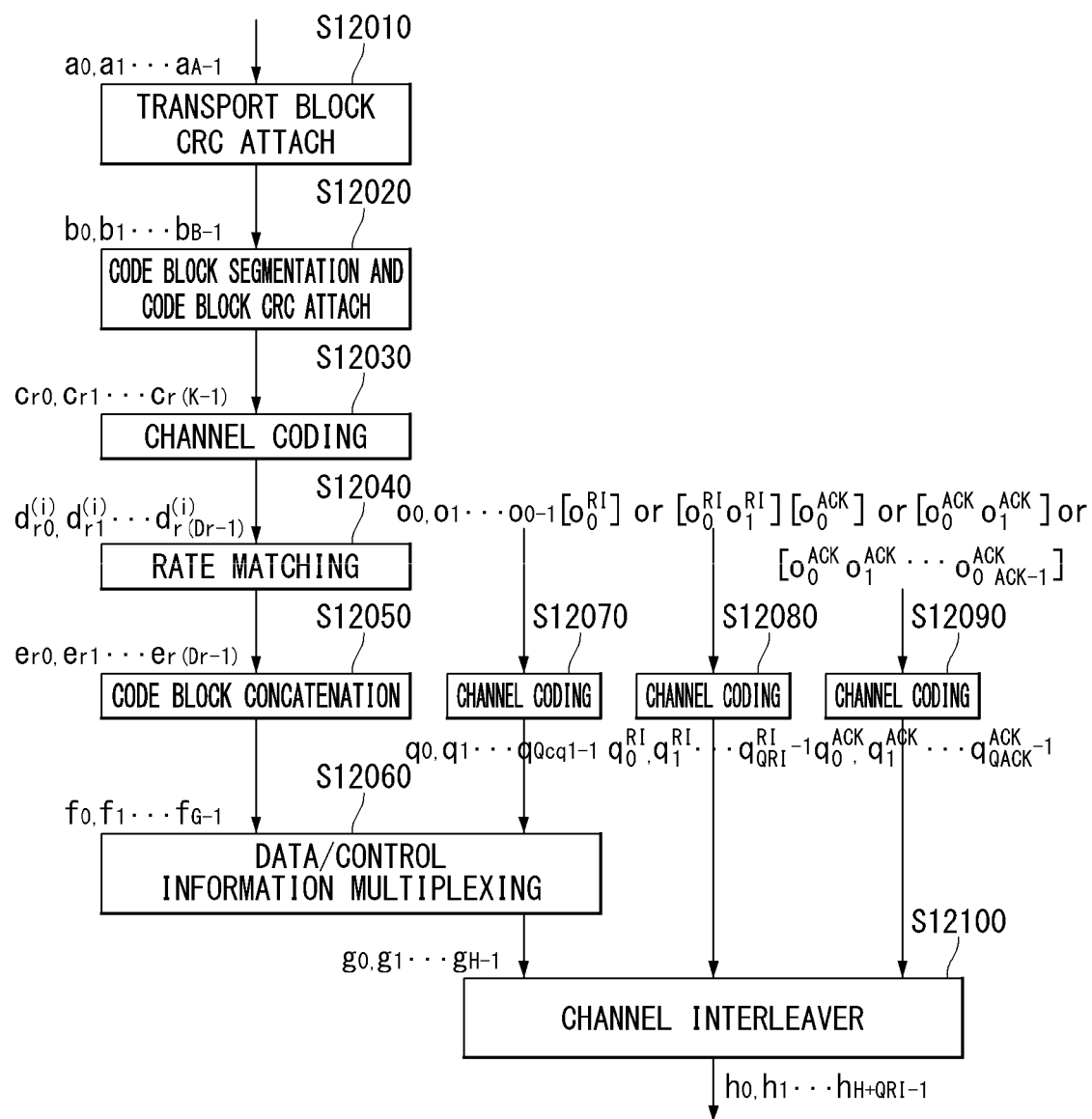
FIG. 12 illustrates one example of a signal processing process of an uplink share channel of a transport channel in the wireless communication system to which the present invention can be applied.

FIG. 12 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block received from the upper layer (S12010). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S12020). Bits after the code block segmentation and the CRC attachment are shown in $c_{r0}, c_{r1}, c_{r2}, c_{r3}, \ldots, c_{r(K_r-1)}$. Herein, r represents No. (r=0, . . . , C−1) of the code block and Kr represents the bit number depending on the code block r. Further, C represents the total number of code blocks.

Subsequently, channel coding is performed (S12030). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, . . . , C−1) and C represents the total number of code blocks. Each code block may be encoded by turbo coding.

Subsequently, rate matching is performed (S12040). Bits after the rate matching are shown in $e_{r0}, e_{r1}, e_{r2}, e_{r3}, \ldots, e_{r(E_r-1)}$. In this case, r represents the code block number (r=0, . . . , C−1) and C represents the total number of code blocks. Er represents the number of rate-matched bits of the r-th code block.

Subsequently, concatenation among the code blocks is performed again (S12050). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S12070, S12080, and S12090). Since different encoded symbols are allocated for transmitting each control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S12050, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S12060). A multiplexed result of the data and the CQI/PMI is shown in $g_0, g_1, g_2, g_3, \ldots, g_{H'-1}$. In this case, $g_i$ (i=0, ..., H'−1) represents a column vector having a length of $(Q_m \cdot N_L)$. $H=(G+N_L \cdot Q_{CQI})$ and $H'=H/(N_L \cdot Q_m)$. $N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S12100).

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

Figure 13:
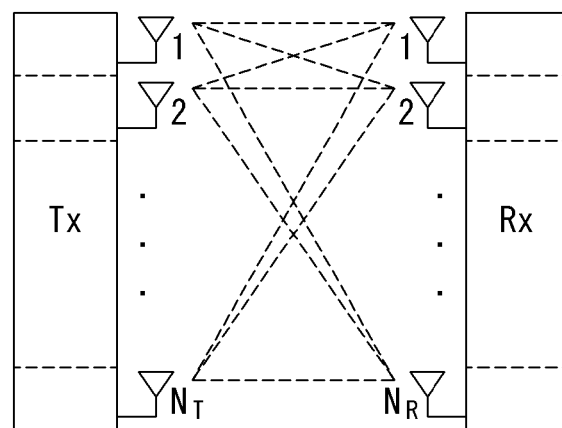
FIG. 13 is a configuration diagram of a general multiple input multiple output (MIMO) communication system.

FIG. 13 is a configuration diagram of a general multiple input multiple output (MIMO) communication system.

Referring to FIG. 13, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 13.

First, in respect to a transmission signal, when NT transmitting antennas are provided, since the maximum number of transmittable information is NT, NT may be expressed as a vector given below.

$$s = [s_1, s_2, \ldots, s_{N_T}]^T \qquad \text{[Equation 2]}$$

Meanwhile, transmission power may be different in the respective transmission information s1, s2, ..., sNT and in this case, when the respective transmission power is P1, P2, ..., PNT, the transmission information of which the transmission power is adjusted may be expressed as a vector given below.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ of which the transmission power is adjusted is multiplied by a weight matrix W to constitute NT transmission signals x1, x2, ..., xNT which are actually transmitted. Herein, the weight matrix serves to appropriately distribute the transmission information to the respective antennas according to a transmission channel situation, and the like. The transmission signals x1, x2, ..., xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, ..., yNR of the respective antennas are expressed as a vector y as described below.

$$y=[y_1,y_2,\ldots,y_{N_R}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

Figure 14:
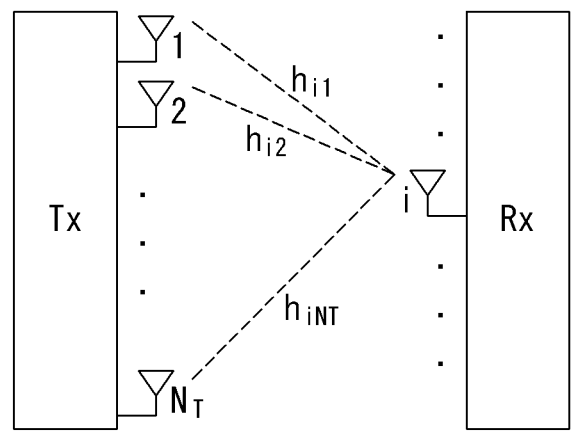
FIG. 14 is a diagram illustrating a channel from multiple transmitting antennas to one receiving antenna.

FIG. 14 is a diagram illustrating a channel from multiple transmitting antennas to one receiving antenna.

As illustrated in FIG. 14, a channel which reaches receiving antenna I from a total of NT transmitting antennas may be expressed as below.

$$h_i^T=[h_{i1},h_{i1},\ldots,h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Meanwhile, since additive white Gaussian noise (AWGN) is added after passing through a channel matrix H given above in an actual channel, white noises n1, n2, ..., nNR added to NR receiving antennas, respectively are expressed as below.

$$n=[n_1,n_2,\ldots,n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx+n \quad \text{[Equation 10]}$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \qquad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is mainly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna should be detected in order to accurately receive the signal. Accordingly, each transmission antenna should have an individual reference signal.

In a mobile communication system, an RS may be basically divided into two types depending on its purpose. There are an RS having a purpose of obtaining channel state information and an RS used for data demodulation. The former has a purpose of obtaining, by a UE, to obtain channel state information in the downlink, and accordingly, a corresponding RS should be transmitted in a wideband, and a UE should be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS should be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used only for data demodulation, and the CRS is used for the two purposes of channel information acquisition and data demodulation.

The reception side (i.e., UE) measures a channel state based on a CRS and feedbacks an indicator related to channel quality, such as a channel quality indicator (CQI), a precoding matrix index (PMI) and/or a rank indicator (RI), back to the transmission side (i.e., an eNB). The CRS is also called a cell-specific RS. On the other hand, a reference signal related to the feedback of channel state information (CSI) may be defined as a CSI-RS.

The DRS may be transmitted through resource elements if data demodulation on a PDSCH is required. A UE may receive information about whether a DRS is present through a higher layer, and the DRS is valid only in the case that a corresponding PDSCH has been mapped. The DRS may also be called a UE-specific RS or Demodulation RS (DMRS).

Figure 15:
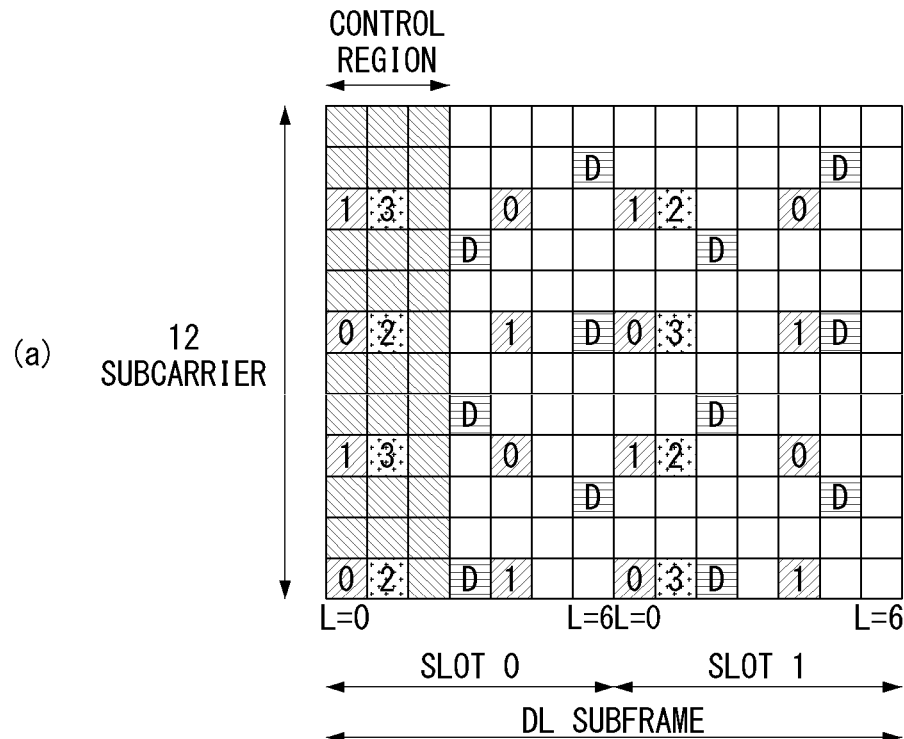
FIG. 15 illustrates reference signal patterns mapped to downlink resource block pairs in a wireless communication system to which the present invention may be applied.
Figure 15:
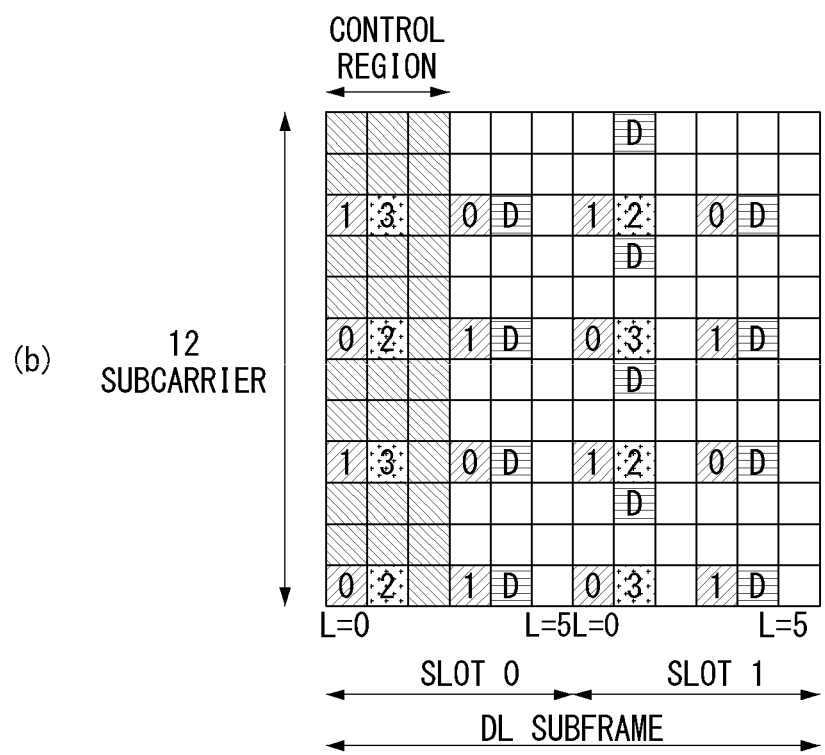

FIG. 15 illustrates reference signal patterns mapped to downlink resource block pairs in a wireless communication system to which the present invention may be applied.

Referring to FIG. 15, a downlink resource block pair, a unit in which a reference signal is mapped may be represented in the form of one subframe in a time domain×12 subcarriers in a frequency domain. That is, in a time axis (an x axis), one resource block pair has a length of 14 OFDM symbols in the case of a normal cyclic prefix (CP) (in FIG. 15a) and has a length of 12 OFDM symbols in the case of an extended cyclic prefix (CP) (FIG. 15b). In the resource block lattice, resource elements (REs) indicated by '0', '1', '2', and '3' mean the locations of the CRSs of antenna port indices '0', '1', '2', and '3', respectively, and REs indicated by 'D' mean the location of a DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (eNB). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the eNB is two, CRSs for antenna #0 and antenna #1 are transmitted. For another instance, in case that the number of the transmitting antennas of the eNB is four, CRSs for antennas #0 to #3 are transmitted.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user MIMO antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A rule for mapping a CRS to a resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent a subcarrier index and a symbol index, respectively and p represents an antenna port. $N_{symb}^{DL}$ represents the number of OFDM symbols in one downlink slot and $N_{RB}^{DL}$ represents the number of radio resources allocated to the downlink, ns represents a slot index and, $N_{ID}^{cell}$ represents a cell ID. mod represents a modulo operation. The position of the reference signal varies depending on the $v_{shift}$ value in the frequency domain. Since $v_{shift}$ depends on the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a $3k^{th}$ subcarrier and a reference signal in another cell is allocated to a $3k+1^{th}$ subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Accordingly, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also represents a reference signal for antenna port index 5.

A rule of mapping the DRS to the resource block is defined as below. Equation 13 represents the case of the normal CP and Equation 14 represents the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l indicate a subcarrier index and a symbol index, respectively, and p indicates an antenna port. $N_{sc}^{RB}$ indicates the size of the resource block in the frequency domain and is expressed as the number of subcarriers. $n_{PRB}$ indicates the number of physical resource blocks. $N_{RB}^{PDSCH}$ indicates a frequency band of the resource block for the PDSCH transmission. ns indicates the slot index and $N_{ID}^{cell}$ indicates the cell ID. mod indicates the modulo operation. The position of the reference signal varies depending on the $v_{shift}$ value in the frequency domain. Since $v_{shift}$ depends on the cell ID, the position of the reference signal has various frequency shift values according to the cell.

In LTE-A which has evolved from LTE, a system needs to be designed such that up to eight transmission antennas can be supported on downlink. Accordingly, RSs for up to eight transmission antennas also need to be supported. Since only downlink RSs for up to four antenna ports have been defined in an LTE system, if an eNB has four to eight downlink transmission antennas in an LTE-A system, RSs for such antenna ports need to be additionally defined and designed. As RSs for up to eight transmission antenna ports, the aforementioned RS for channel measurement and RS for data demodulation need to be designed One important consideration in design of an LTE-A system is backward compatibility. That is, an LTE UE needs to properly operate and the system needs to support the same. RSs for up to eight transmission antenna ports need to be additionally defined in a time-frequency region in which a CRS defined in LTE is transmitted per subframe in the full band in terms of RS transmission. When an RS pattern for up to eight transmission antennas is added to the full band per subframe in an LTE-A system, like the CRS in LTE, RS overhead excessively increases.

Accordingly, RSs newly designed in LTE-A are classified into an RS for channel measurement for selecting an MCS, a PMI and the like (CSI-RS: Channel State Information-RS, Channel State Indication-RS, etc.) and an RS for demodulating data transmitted through eight transmission antennas (DM-RS: Data Demodulation-RS).

The CSI-RS is designed mainly for channel measurement, whereas the conventional CRS is used for channel measurement, handover measurement and data demodulation. Of course, the CSI-RS may also be used for handover measurement. Since the CSI-RS is transmitted only for the purpose of obtaining information about a channel state, the CSI-RS may not be transmitted per subframe, differently from the CRS. To reduce CSI-RS overhead, the CSI-RS is intermittently transmitted in the time domain.

For data demodulation, a DM-RS dedicated to a UE scheduled in the corresponding time-frequency domain is transmitted. That is, a DM-RS of a specific UE is transmitted only in a region in which the UE is scheduled, that is, a time-frequency domain in which data is received.

In LTE-A system, an eNB needs to transmit CSI-RSs for all antenna ports. Since transmission of CSI-RSs for up to eight transmission antenna ports per subframe causes excessive overhead, the overhead is reduced by intermittently transmitting the CSI-RSs in the time domain instead of transmitting the same per subframe. That is, the CSI-RS can be periodically transmitted in a period corresponding to an integer multiple of one subframe or transmitted in a specific transmission pattern. In this case, the transmission period or pattern of the CSI-RS can be configured by an eNB.

To measure CSI-RSs, a UE needs to know a transmission subframe index of a CSI-RS for each CSI-RS antenna port of a cell to which the UE belongs, a time-frequency position of a CSI-RS resource element (RE) in a transmission subframe, and information about a CSI-RS sequence.

In an LTE-A system, an eNB needs to transmit a CSI-RS for each of up to eight antenna ports. Resources used for transmission of CSI-RSs for different antenna ports need to be orthogonal. When an eNB transmits CSI-RSs for different antenna ports, the eNB can orthogonally allocate resources through FDM/TDM by mapping the CSI-RSs for the antenna ports to different REs. Alternatively, CSI-RSs can be transmitted according to CDM which maps CSI-RSs for different antenna ports to orthogonal codes.

When an eNB informs a UE belonging to the cell thereof of information about CSI-RSs, the eNB needs to inform the UE of information about a time-frequency to which a CSI-RS for each antenna port is mapped. Specifically, the information includes numbers of subframes in which CSI-RSs are transmitted, a CSI-RS transmission period, a subframe offset in which a CSI-RS is transmitted, the number of an OFDM symbol through which a CSI-RS RE of an antenna is transmitted, frequency spacing, and an offset or shift value of REs in the frequency domain.

Sequence Generation

In the case that transform precoding is not enabled in PUSCH or in the case of PDSCH, a reference signal sequence r(m) may be generated by Equation 15 below.

$$r(m) = \frac{1}{\sqrt{2}}(1 - 2 \cdot c(2m)) + j\frac{1}{\sqrt{2}}(1 - 2 \cdot c(2m+1))$$ [Equation 15]

In Equation 15, pseudo-random sequence c(n) may be defined by Gold sequence of length 31, and c(n) of length MPN may be defined by Equation 16 below.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$
$$n = 0, 1, \ldots, M_{PN}-1$$ [Equation 16]

In Equation 16, Nc is '1600' and the first m-sequence x1(n) is initialized as x1(0)=1, x1(n)=0, n=1, 2, . . . , 30.

Values of initialization of x2(n), which is the second m-sequence, may be represented as Equation 17 below according to an application of the sequence.

$$c_{init} = \sum_{i=0}^{30} x_2(i) \cdot 2^i$$ [Equation 17]

In the case that transform precoding for PUSCH is enabled, a sequence r(m) may be generated by Equation 18 below.

$$r(m) = e^{-j\frac{\pi q m(m+1)}{L}}$$ [Equation 18]

Mapping to Physical Resource

A DMRS may be mapped to a physical resource according to a type given by high layer signaling.

For DMRS type 1, a sequence r(m) is mapped to a physical resource according to Equation 19 below.

$$a_{k,l}^{(p,\mu)} = e^{j\varphi_k} \cdot w_f(l') \cdot r(m+m_0)$$

$$k = k_0 + 2m + \Delta$$

$$l = l_0 + l'$$ [Equation 19]

In Equation 19, l', $w_f(l')$, $\varphi_k$ and Δ may be provided by Table 9 below.

TABLE 9

| Antenna port | | | $w_f(l') = [w_f(0)\ w_f(1)]$ | |
|---|---|---|---|---|
| p | Δ | $\varphi_k$ | One symbol | Two symbol |
| 1000 | 0 | 0 | [+1] | [+1 +1] |
| 1001 | 1 | 0 | [+1] | [+1 +1] |
| 1002 | 0 | π(k mod 2) | [+1] | [+1 +1] |
| 1003 | 1 | π(k mod 2) | [+1] | [+1 +1] |
| 1004 | 0 | 0 | — | [+1 −1] |
| 1005 | 1 | 0 | — | [+1 −1] |
| 1006 | 0 | π(k mod 2) | — | [+1 −1] |

TABLE 9-continued

| Antenna port | | | $w_t(l') = [w_t(0)\ w_t(1)]$ | |
|---|---|---|---|---|
| p | Δ | $\varphi_k$ | One symbol | Two symbol |
| 1007 | 1 | π(k mod 2) | — | [+1  −1] |

For DMRS type 2, a sequence r(m) is mapped to a physical resource according to Equation 20 below.

$$a_{k,l}^{(p,\mu)} = w_f(k') \cdot w_t(l') \cdot r(m+m_0)$$

$$k = k_0 + 6m + k' + \Delta$$

$$l = l_0 + l'$$  [Equation 20]

In Equation 20, $w_f(k')$, $w_t(l')$ and Δ may be provided by Table 10 below.

TABLE 10

| Antenna port | | | | $w_t(l') = [w_t(0)\ w_t(1)]$ | |
|---|---|---|---|---|---|
| p | Δ | $w_f(l') = [w_f(0)\ w_f(1)]$ | | One symbol | Two symbol |
| 1000 | 0 | [+1 | +1] | [+1] | [+1  +1] |
| 1001 | 0 | [+1 | −1] | [+1] | [+1  +1] |
| 1002 | 2 | [+1 | +1] | [+1] | [+1  +1] |
| 1003 | 2 | [+1 | −1] | [+1] | [+1  +1] |
| 1004 | 4 | [+1 | +1] | [+1] | [+1  +1] |
| 1005 | 4 | [+1 | −1] | [+1] | [+1  +1] |
| 1006 | 0 | [+1 | +1] | — | [+1  −1] |
| 1007 | 0 | [+1 | −1] | — | [+1  −1] |
| 1008 | 2 | [+1 | +1] | — | [+1  −1] |
| 1009 | 2 | [+1 | −1] | — | [+1  −1] |
| 1010 | 4 | [+1 | +1] | — | [+1  −1] |
| 1011 | 4 | [+1 | −1] | — | [+1  −1] |

Quantity 10 is defined in relation to a start of a PUSCH transmission.

New Radio Access Technology System

More communication devices require greater communication capacity, and accordingly, a necessity of mobile broadband communication more improved than the existing radio access technology (RAT) has been raised. In addition, the massive MTC (Machine Type Communications) that provides various services anytime and anywhere by connecting a plurality of devices and objects is also one of important issues, which is considered in a next generation communication. Moreover, it has been discussed a design or a structure of a communication system in which a service and/or a UE sensitive to reliability and latency.

As such, an introduction of a next generation radio access technology (RAT) has been discussed currently, which considers enhanced mobile broadband communication, massive MTC, Ultra-Reliable and Low Latency Communication (URLLC), and the like, and the corresponding technology is referred to as 'new RAT (NR)' in the present disclosure for the convenience of description.

Self-Contained Subframe Structure

Figure 16:
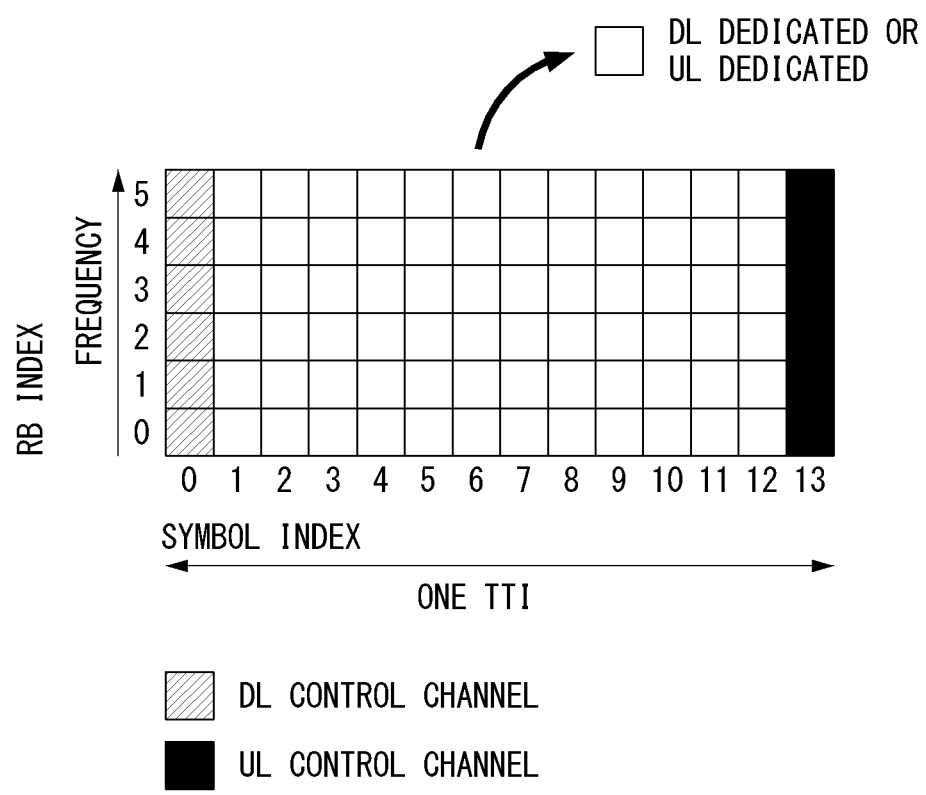
FIG. 16 is a diagram illustrating Self-contained subframe structure in a wireless communication system to which the present invention may be applied.

FIG. 16 is a diagram illustrating Self-contained subframe structure in a wireless communication system to which the present invention may be applied.

In order to minimize the data transmission latency in TDD system, the self-constrained subframe structure as shown in FIG. 16 has been considered in 5 generation (5G) new RAT.

In FIG. 16, the shaded area (symbol index 0) represents DL control region, and dark area (symbol index 13) represents UL control region. The area which is not shaded may be used for DL data transmission or UL data transmission. This structure is characterized that DL transmission and UL transmission are sequentially progressed in a single subframe, and DL data may be transmitted in the subframe, and UL ACK/NACK may also be received. Consequently, when a data transmission error occurs, a time consumed till a data retransmission may be reduced, and accordingly, latency of final data forwarding may be minimized.

In such a self-contained subframe structure, a time gap is required for the switching process for an eNB and a UE from transmission mode to reception mode or the switching process from reception mode to transmission mode. For this, in the self-contained subframe structure, a part of OFMD symbol of the timing switched from DL to UL is configured as a guard period (GP).

Figure 17:
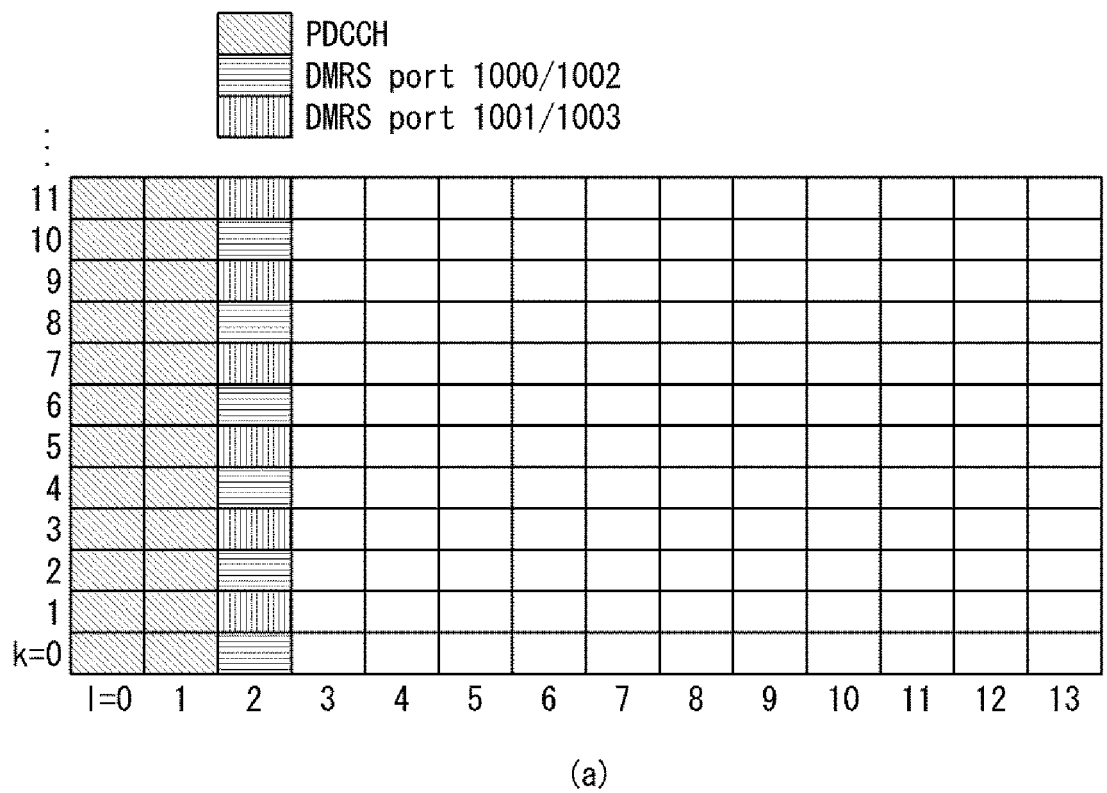
FIG. 17 is a diagram illustrating an example of a mapping pattern of a demodulation reference signal to which the present invention may be applied.
Figure 17:
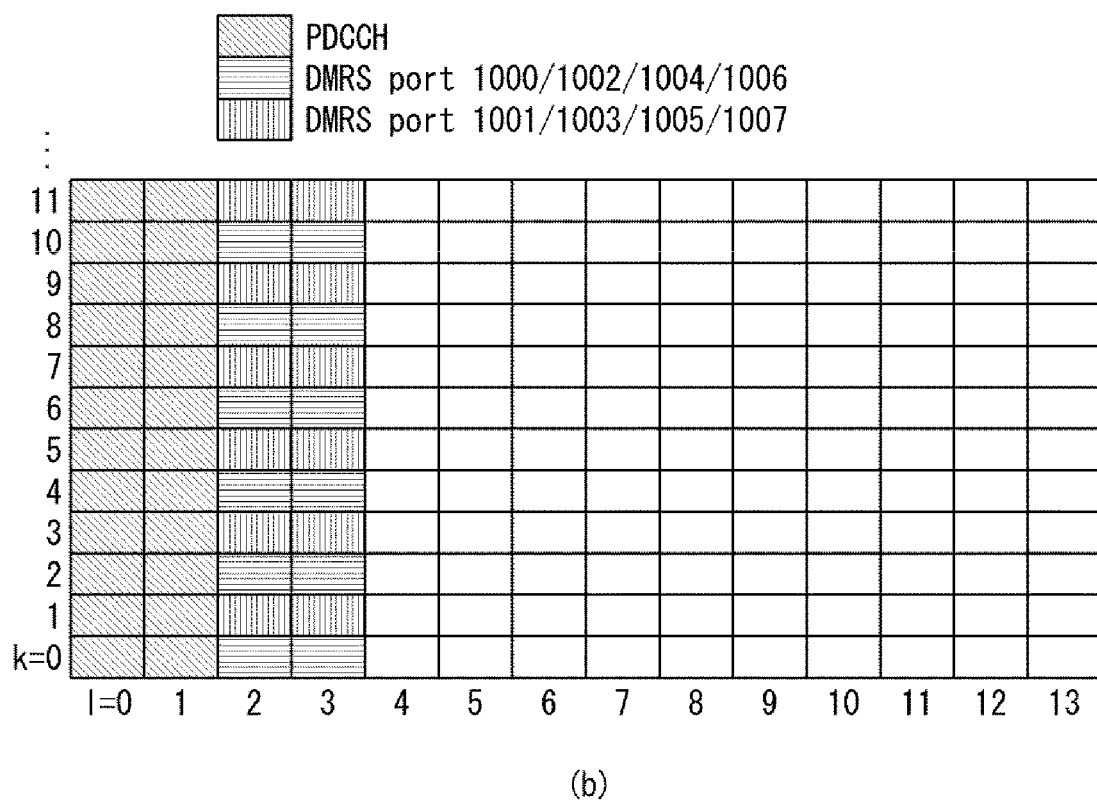

FIG. 17 is a diagram illustrating an example of a mapping pattern of a demodulation reference signal to which the present invention may be applied.

As described above, one function of DCI is to transmit scheduling information of DL, UL or Sidelink to a UE.

The DCI may be defined as a plurality of formats according to the information that an eNB transmits to a UE. A format of DCI defines a plurality of fields for forwarding specific information, and different types of information are included in each field and forwarded to a UE.

The UE receives a field defined in a DCI format of PDCCH, and receives information in relation to an operation that the UE needs to perform such as scheduling information by decoding the received field.

The UE may perform an operation such as receiving data according to the received information.

An example of the field defined in a DCI format may include information of Antenna port(s), scrambling identity, number of layer, and the like, and may be constructed with 3 bits or 4 bits.

Two types of DMRS are supported in NR, and the number of symbols to which the DMRS is mapped may be one or two.

FIG. 17(a) and FIG. 17(b) show the case that a mapping type of DMRS is 1. Type 1 supports up to maximum 8 ports, and a position of each DMRS in a PRB is as shown in FIG. 17(a) and FIG. 17(b) (FIG. 17(a) and FIG. 17(b) assumes the case that there is no additional DMRS and there are 14 symbol slots).

Hereinafter, unless a separate mention in the present invention, a DMRS resource mapping is assumed, which corresponds to FIG. 17(a) and FIG. 17(b).

Hereinafter, unless a special mention in the present invention, CDM is assumed to be a CDM in a single frequency domain (CDM in the time domain is represented as CDM-T).

Figure 18:
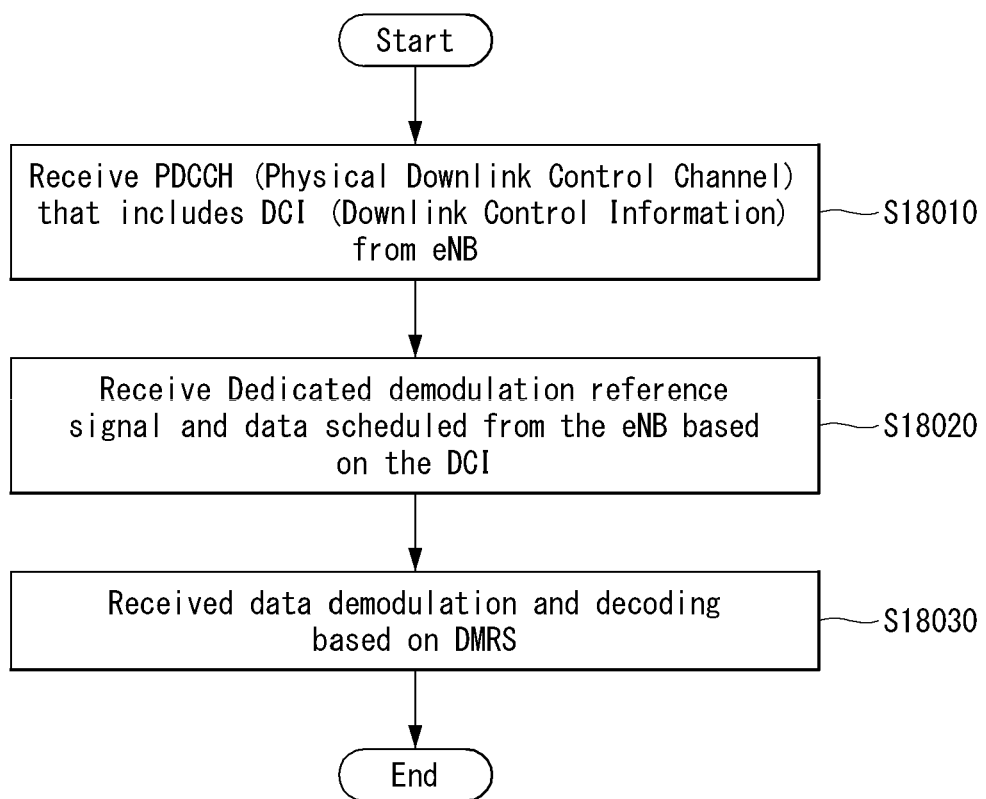
FIG. 18 is a flowchart illustrating an example of a method for receiving DL data through a demodulation reference signal to which the present invention may be applied.

FIG. 18 is a flowchart illustrating an example of a method for receiving DL data through a demodulation reference signal to which the present invention may be applied.

Referring to FIG. 18, a UE may receive a DMRS by receiving a PDCCH that includes DCI in relation to the DMRS from an eNB.

Particularly, the UE receives a PDCCH that includes DCI from the eNB (step, S18010).

The DCI may include information such as scheduling for an operation of the UE according to a format.

For example, the DCI may include the information such as antenna port(s), the number of layers, and/or the number of symbols in relation to the DMRS.

The UE may receive DMRS and data scheduled from the eNB based on the DCI (step, S18020).

Later, the UE may demodulate the received data based on the DMRS, and may decode it (step, S18030).

The eNB may define a DCI field included in PDCCH for indicating a mapping pattern of the DMRS.

Hereinafter, a method for configuring a DCI field is described, according to the number of symbols to which the DMRS is mapped.

1. Symbol DMRS

In the case that the DMRS is mapped to one symbol, the information of antenna port(s), the number of layers, and/or the number of symbols are as represented in Table 11 below.

Hereinafter, for the convenience of description, in the present disclosure, antenna ports 1000/1001/ . . . /1007 for a transmission of DMRS is called P0/P1/ . . . /P7, respectively.

TABLE 11

| value | message | | |
|---|---|---|---|
| # | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P1 | 1 |
| 5 | 2 layer | P2/P3 | 1 |
| 6 | 2 layer | P0/P2 | 1 |
| 7 | 2 layer | P1/P3 | 1 |
| 8 | 3 layer | P0/P1/P2 | 1 |
| 9 | 4 layer | P0/P1/P2/P3 | 1 |

The DCI format based on Table 11 may be configured as below.

Embodiment 1

In a DCI format, a DCI field may be defined, which includes antenna port(s), the number of layers, and/or the number of symbols, and so on. At this time, in the case that different multiplexing schemes are available for two or more layers, antenna port(s) for all available multiplexing schemes may be defined in the same DCI field together.

The definition in relation to a configuration of a DCI field is preconfigured between an eNB and a UE, and the UE may obtain information of the antenna port(s), the number of layers, and/or the number of symbols, that are configured, by receiving a DCI field transmitted through a control channel.

The UE receives a DCI field transmitted through the control channel, and obtains the antenna port(s), the number of layers, and the number of symbols. The UE may receive a data signal and a DMRS using the information obtained through the DCI field.

For example, the UE may obtain the information (e.g., antenna port index, position of RS RE, etc.) in relation to a DMRS mapping pattern through the information, and using this, may estimate a channel value required for channel compensation.

Later, the UE compensates a channel for the received data signal using the estimated channel value, and detects the received data by performing demodulation and decoding processes for the signal after the compensation.

Such an operation of the UE may be applied identically to the embodiment below although there is no separate description.

In the case of using such a method, the implementation is available in the scheme of one type of DCI field definition in hardware aspect, and accordingly, there is an advantage of reducing cost for implementing a plurality of definition schemes. In addition, for the case of two layers or more, both of the advantages that each multiplexing scheme has may be utilized, and appropriate multiplexing scheme may be used for occasions.

Furthermore, in the case that a transmission of Mini-slot transmission or Comp (NCJT) situation is frequently occurred, when DCI field definition schemes are different for each transmission situation, a separate signaling is required for configuring a specific DCI field definition scheme to a UE. In the case of the present proposal, the overhead required for the separate signaling may be reduced, and free scheduling may be available.

Embodiment 2

In a DCI format, a DCI field may be defined, which includes antenna port(s), the number of layers, and/or the number of symbols, and so on. In this case, a message for two or more layers may include antenna port(s) that performs multiplexing in the FDM scheme as represented in Table 12 below.

TABLE 12

| value | message | | |
|---|---|---|---|
| # | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P1 | 1 |
| 5 | 2 layer | P2/P3 | 1 |
| 6 | 3 layer | P0/P1/P2 | 1 |
| 7 | 4 layer | P0/P1/P2/P3 | 1 |

The definition in relation to a configuration of a DCI field is preconfigured between an eNB and a UE, and the UE may obtain information of the antenna port(s), the number of layers, and/or the number of symbols, that are configured, by receiving a DCI field transmitted through a control channel.

In the case of Mini-slot, in a DCI field constructed with the information such as the antenna port(s), the number of layers, the number of symbols, and the like of a DCI format (or control channel) associated with a transmission of Mini-slot, a message for two layers may be constructed with antenna port(s) that performs multiplexing in the CDM scheme.

In this case, a DCI field may be preconfigured between a UE and an eNB, or configured to the UE through high layer signaling.

Example of being promised in advance between an eNB and a UE: The UE that receives data using slot, not Mini-slot, may follow a definition of DCI field corresponding to embodiment 2, and the UE that receives data using slot corresponding to Mini-slot may follow a definition of DCI field corresponding to the embodiment described above.

Example of being configured to a UE through high layer signaling: In the case that there is no separate high layer signaling, the UE may follow a definition of DCI field corresponding to embodiment 2, and in the case that a configuration value is forwarded to the UE through high layer signaling, the UE may follow a definition of DCI field corresponding to the embodiment described above.

The Mini-slot means a slot of which symbol number constructing a slot is 'x' or less. For example, for x=4, a slot of which symbol number that constructs a slot is 4 or less may be defined as mini-slot.

In the case of the Mini-slot, increase of RS overhead may cause significant deterioration in system performance. Accordingly, in a mini-slot transmission, performing multiplexing using the CDM scheme, rather than the FDM scheme may reduce the RS overhead, and accordingly, a performance of system may be improved.

As another embodiment of the present invention, a DCI field may be defined, which includes the information of antenna port(s), the number of layers, and/or the number of symbols, and the like in a DCI format. In this case, a combination of the antenna port(s), the number of layers, and the number of symbols that construct a DCI field may be configured with different combinations with being associated with the symbol number 'x' that constructs a slot.

Here, different DCI field configuration may be predefined between an eNB and a UE according to 'x' value, or an eNB may inform a configuration of a specific DCI field according to 'x' value through high layer signaling.

A UE may obtain information of the antenna port(s), the number of layers, and the number of symbols that are configured by receiving a DCI field transmitted through a control channel.

In the case of Mini-slot, the symbol number that constructs a slot in relation to latency and the like may be one of two or more values like {x1, x2}.

For example, x1 value may be set to '2' for the purpose of low latency & low throughput, or x2 value may be set to '4' for the purpose of mid latency & mid throughput.

At this time, in the case that low latency is the main purpose, requirements for the throughput is low, and accordingly, a restricted transmission layer may be configured.

Accordingly, a message of DCI field may be defined so as to be constructed with different combinations which are associated with symbol number 'x' that constructs a slot.

Table 13 below represents an example of a DCI field in the case that low latency is the main purpose, in which x value is set to '2', and Table 14 represents an example of a DCI field in the case that mid latency is the main purpose, in which x value is set to '4'.

TABLE 13

| value # | # of layers | message antenna port(s) | # of symbols |
|---|---|---|---|
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P2 | 1 |
| 5 | 2 layer | P1/P3 | 1 |

TABLE 14

| value # | # of layers | message antenna port(s) | # of symbols |
|---|---|---|---|
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P2 | 1 |
| 5 | 2 layer | P1/P3 | 1 |
| 6 | 3 layer | P0/P1/P2 | 1 |
| 7 | 4 layer | P0/P1/P2/P3 | 1 |

Embodiment 3

In a DCI format, a DCI field may be defined, which includes antenna port(s), the number of layers, and/or the number of symbols, and so on. In this case, a message for two or more layers may include antenna port(s) that performs multiplexing in the CDM scheme as represented in Table 15 below.

TABLE 15

| value # | # of layers | message antenna port(s) | # of symbols |
|---|---|---|---|
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P2 | 1 |
| 5 | 2 layer | P1/P3 | 1 |
| 6 | 3 layer | P0/P1/P2 | 1 |
| 7 | 4 layer | P0/P1/P2/P3 | 1 |

In the case that multiplexing is performed using the CDM scheme, the RS overhead may be reduced, and in the case of 2 layer transmission, multiplexing with different waveforms may be available.

In this embodiment, a DCI format (or control channel) according to Comp (NCJT) transmission may be constructed by antenna port(s) that performs multiplexing in the FDM scheme of a message for 2 layer in a DCI field including information of antenna port(s), the number of layers, and/or the number of symbols, and so on.

In this case, the DCI field may be preconfigured between a UE and an eNB, or configured to a UE through high layer signaling.

Example of being promised in advance between an eNB and a UE: A DCI field corresponding to embodiment 3 may be applied to the UE that does not receive data with Comp (NCJT) scheme may follow a definition of DCI field corresponding to embodiment 2, and a DCI field of the DCI format according to Comp (NCJT) transmission may be applied to the UE that receives data with Comp (NCJT) transmission.

Example of being configured to a UE through high layer signaling: In the case that there is no separate high layer signaling, a definition of DCI field corresponding to embodiment 3 may be applied, and in the case that a configuration value is forwarded to the UE through high layer signaling, a DCI field of the DCI format according to Comp (NCJT) transmission may be applied.

Comp (NCJT) means the case of transmitting data to a single UE in different TRPs, and in this case, QCL is not established between ports of the different TRPs.

In the case of NR ad-hoc, QCL needs to be established for an antenna port in which multiplexing is performed in the CDM in the frequency domain. Accordingly, in the situation of Comp (NCJT) in which QCL is not established, an antenna port combination in which the CDM is performed in the frequency domain may not be used.

Accordingly, in Comp (NCJT) transmission, multiplexing needs to be performed in the FDM scheme.

Embodiment 4

In a DCI format, a DCI field may be defined, which includes antenna port(s), the number of layers, and/or the number of symbols, and so on. In the case of 2 layer transmission, the DCI field may be constructed according to the FDM scheme and/or the CDM scheme, respectively.

An eNB may notify a configuration of the DCI field through high layer signaling to a UE.

Table 16 below represents an example of the DCI field in the case of using the FDM scheme, and Table 17 represents an example of the DCI field in the case of using the CDM scheme.

TABLE 16

| value # | message | | |
|---|---|---|---|
| | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P1 | 1 |
| 5 | 2 layer | P2/P3 | 1 |
| 6 | 3 layer | P0/P1/P2 | 1 |
| 7 | 4 layer | P0/P1/P2/P3 | 1 |

TABLE 17

| value # | message | | |
|---|---|---|---|
| | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P2 | 1 |
| 5 | 2 layer | P1/P3 | 1 |
| 6 | 3 layer | P0/P1/P2 | 1 |
| 7 | 4 layer | P0/P1/P2/P3 | 1 |

The configuration of DCI field according to the FDM and/or the CDM may be preconfigured between an eNB and a UE, and the eNB may setup one of two types of configuration to the UE through high layer signaling.

The UE may obtain information in relation to antenna port(s), the number of layers, and/or the number of symbols defined in the DCI field configured through high layer signaling.

As another embodiment of the present invention, a DCI field may be constructed to include both of the FDM and the CDM schemes, or include either one of the FDM scheme or the CDM scheme, for 2 layer transmission.

In this case, the eNB may setup a DCI field to the UE through high layer signaling that is the same as that of embodiment 4 described above.

Table 18 represents an example of a DCI field in the case that both of the FDM and the CDM schemes are used.

TABLE 18

| value # | message | | |
|---|---|---|---|
| | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P1 | 1 |
| 5 | 2 layer | P2/P3 | 1 |
| 6 | 2 layer | P0/P2 | 1 |
| 7 | 2 layer | P1/P3 | 1 |
| 8 | 3 layer | P0/P1/P2 | 1 |
| 9 | 4 layer | P0/P1/P2/P3 | 1 |

2 Symbol DMRS

In the case that a DMRS is mapped to two symbols, information in relation to antenna port(s), the number of layers, and/or the number of symbols is as represented in Table 19 below.

TABLE 19

| value # | message | | | |
|---|---|---|---|---|
| | # of layers | antenna port(s) | # of symbols | |
| 0 | 1 layer | P0 | 2 | |
| 1 | 1 layer | P1 | 2 | |
| 2 | 1 layer | P2 | 2 | |
| 3 | 1 layer | P3 | 2 | |
| 4 | 1 layer | P4 | 2 | |
| 5 | 1 layer | P5 | 2 | |
| 6 | 1 layer | P6 | 2 | |
| 7 | 1 layer | P7 | 2 | |
| 8 | 2 layer | P0/P4 | 2 | CDM-T |
| 9 | 2 layer | P1/P5 | 2 | CDM-T |
| 10 | 2 layer | P2/P6 | 2 | CDM-T |
| 11 | 2 layer | P3/P7 | 2 | CDM-T |
| 12 | 2 layer | P0/P2 | 2 | CDM-F |
| 13 | 2 layer | P1/P3 | 2 | CDM-F |
| 14 | 2 layer | P4/P6 | 2 | CDM-F |
| 15 | 2 layer | P5/P7 | 2 | CDM-F |
| 16 | 2 layer | P0/P1 | 2 | FDM |
| 17 | 2 layer | P2/P3 | 2 | FDM |
| 18 | 2 layer | P4/P5 | 2 | FDM |
| 19 | 2 layer | P6/P7 | 2 | FDM |
| 20 | 3 layer | P0/P2/P4 | 2 | CDM-F/T |
| 21 | 3 layer | P1/P3/P5 | 2 | CDM-F/T |
| 22 | 3 layer | P0/P3/P4 | 2 | CDM-T & FDM |
| 23 | 3 layer | P1/P2/P5 | 2 | CDM-T & FDM |

TABLE 19-continued

| value | | message | | |
|---|---|---|---|---|
| # | # of layers | antenna port(s) | # of symbols | |
| 24 | 3 layer | P0/P1/P2 | 2 | CDM-F & FDM |
| 25 | 3 layer | P3/P4/P5 | 2 | CDM-F & FDM |
| 26 | 4 layer | P0/P2/P4/P6 | 2 | CDM-F/T |
| 27 | 4 layer | P1/P3/P5/P7 | 2 | CDM-F/T |
| 28 | 4 layer | P0/P1/P4/P5 | 2 | CDM-T & FDM |
| 29 | 4 layer | P2/P3/P6/P7 | 2 | CDM-T & FDM |
| 30 | 4 layer | P0/P1/P2/P3 | 2 | CDM-F & FDM |
| 31 | 4 layer | P4/P5/P6/P7 | 2 | CDM-F & FDM |
| 32 | 5 layer | P0/P1/P2/P3/P4 | 2 | |
| 33 | 6 layer | P0/P1/P2/P3/P4/P5 | 2 | |
| 34 | 7 layer | P0/P1/P2/P3/P4/P5/P6 | 2 | |
| 35 | 8 layer | P0/P1/P2/P3/P4/P5/P6/P7 | 2 | |

Based on Table 19, a DCI field for informing a mapping pattern of a DMRS to a UE may be constructed according to the following method.

Embodiment 5

In a DCI format, a DCI field may be defined, which includes antenna port(s), the number of layers, and/or the number of symbols, and so on. In the case that different multiplexing schemes (e.g., CDM-T, CDM-F and/or FDM, etc.) are available for two or more layers, antenna port(s) may be defined in the same DCI field together for all multiplexing schemes.

A definition in relation to DCI field configuration may be preconfigured between an eNB and a UE, and the UE may obtain information of the antenna port(s), the number of layers, and the number of symbols, which is configured, by receiving a DCI field transmitted through a control channel.

In this case, in order to define the antenna port(s) for all multiplexing schemes in the same DCI field together, a payload size may become greater. For this, a payload size may be reduced by proposing a multiplexing method in the same layer.

Alternatively, overhead of the DCI may be reduced by proposing only one or two types of multiplexing scheme used in a single layer.

Such a restriction of multiplexing method may be pre-configured between an eNB and a UE. Otherwise, an eNB signals a multiplexing method restricted by considering a channel situation and the like, and a UE may detect a DCI field of a control channel according to the restriction of the multiplexing method.

Hereinafter, a method for configuring a DCI field will be described, by restricting a multiplexing method according to a layer.

2 Layers

Embodiment 6

In a DCI format, a DCI field may be defined, which includes antenna port(s), the number of layers, and/or the number of symbols, and so on. In this case, a DCI field for 2 layers may be configured with antenna ports in which multiplexing is performed using the CDM-T method.

The definition in relation to the configuration of a DCI field is preconfigured between an eNB and a UE, and the UE may obtain information of the antenna port(s), the number of layers, and the number of symbols, that are configured, by receiving a DCI field transmitted through a control channel.

In this case, by confining the multiplexing method for 2 layers to the CDM-T, RS overhead may be reduced, and there is an effect of being robust in frequency selectivity.

In addition, this may be used in Comp (NCJT), and multiplexing with other waveform may be available.

Embodiment 7

Different from embodiment 6, a DCI field for 2 layers may be constructed with antenna ports in which multiplexing is performed by using the CDM-F method.

In this case, this may not be used in Comp (NCJT), and a method of embodiment 6 or 7 may be informed to a UE through high layer signaling as that of embodiment 3.

Embodiment 8

Different from embodiment 6 or 7, a DCI field for 2 layers may be constructed with antenna ports in which multiplexing is performed by using the FDM method.

In this case, this may be used in Comp (NCJT), and robust in frequency selectivity. In addition, a channel estimation performance may be increased using RS power boosting.

As in embodiment 2, an eNB may inform a construction method of a DCI field to a UE through high layer signaling.

3/4 Layers

Embodiment 9

In a DCI format, a DCI field may be defined, which includes antenna port(s), the number of layers, and/or the number of symbols, and so on. In this case, a DCI field for 3 and/or 4 layers may be configured with antenna ports in which multiplexing is performed using the CDM-T and the CDM-F methods.

The definition in relation to the configuration of a DCI field is preconfigured between an eNB and a UE, and the UE may obtain information of the antenna port(s), the number of layers, and the number of symbols, that are configured, by receiving a DCI field transmitted through a control channel.

In this case, by confining the multiplexing method to the CDM-T and the CDM-F, RS overhead may be reduced, and there is an effect of being robust in frequency selectivity.

In addition, multiplexing with other waveform may be available.

Embodiment 10

Different from embodiment 9, a DCI field for 3 and/or 4 layers may be constructed with antenna ports in which multiplexing is performed by using the CDM-T and the FDM methods.

In this case, this may be robust in frequency selectivity, and a channel estimation performance may be increased using RS power boosting.

Embodiment 11

Different from embodiments 9 and 10, a DCI field for 3 and/or 4 layers may be constructed with antenna ports in which multiplexing is performed by using the CDM-F and the FDM methods.

In this case, a channel estimation performance may be increased using RS power boosting.

5 Layers or More

Embodiment 12

In a DCI format, a DCI field may be defined, which includes antenna port(s), the number of layers, and/or the number of symbols, and so on. In this case, for a DCI field for 5 layers or more, a combination with a layer may be configured by increasing antenna port(s) in an order of port number as represented in Table 20 below.

The definition in relation to the configuration of a DCI field is preconfigured between an eNB and a UE, and the UE may obtain information of the antenna port(s), the number of layers, and the number of symbols, that are configured, by receiving a DCI field transmitted through a control channel.

TABLE 20

| | message | |
|---|---|---|
| # of layers | antenna port(s) | # of symbols |
| 5 layer | P0/P1/P2/P3/P4 | 2 |
| 6 layer | P0/P1/P2/P3/P4/P5 | 2 |
| 7 layer | P0/P1/P2/P3/P4/P5/P6 | 2 |
| 8 layer | P0/P1/P2/P3/P4/P5/P6/P7 | 2 |

Embodiment 13

In a DCI format, a DCI field may be defined, which includes antenna port(s), the number of layers, and/or the number of symbols, and so on. In this case, the methods described in embodiments 5 to 11 may be combined and used for a DCI field.

In this case, a configuration method of a DCI field may be preconfigured between an eNB and a UE, or configured to a UE through high layer signaling.

In such a method, the advantage of each embodiment may be combined and used, and efficient signaling may be available in a DCI signaling aspect.

For example, in the case of using the multiplexing schemes of embodiments 6, 9 and 12 as represented in Table 21 below, a payload size of DCI may be reduced, and using such a method, a layer may be increased in an order of the CDM-T, the CDM-F and the FDM.

TABLE 21

| value | | message | |
|---|---|---|---|
| # | # of layers | antenna port(s) | # of symbols |
| 0 | 1 layer | P0 | 2 |
| 1 | 1 layer | P1 | 2 |
| 2 | 1 layer | P2 | 2 |
| 3 | 1 layer | P3 | 2 |
| 4 | 1 layer | P4 | 2 |
| 5 | 1 layer | P5 | 2 |
| 6 | 1 layer | P6 | 2 |
| 7 | 1 layer | P7 | 2 |
| 8 | 2 layer | P0/P4 | 2 |
| 9 | 2 layer | P1/P5 | 2 |
| 10 | 2 layer | P2/P6 | 2 |
| 11 | 2 layer | P3/P7 | 2 |
| 12 | 3 layer | P0/P2/P4 | 2 |
| 13 | 3 layer | P1/P3/P5 | 2 |
| 14 | 4 layer | P0/P2/P4/P6 | 2 |
| 15 | 4 layer | P1/P3/P5/P7 | 2 |
| 16 | 5 layer | P0/P1/P2/P3/P4 | 2 |
| 17 | 6 layer | P0/P1/P2/P3/P4/P5 | 2 |
| 18 | 7 layer | P0/P1/P2/P3/P4/P5/P6 | 2 |
| 19 | 8 layer | P0/P1/P2/P3/P4/P5/P6/P7 | 2 |

In the example of Table 20 constructed with #0 to #19, multiplexing (e.g., 4 layers to 2 layers (#14-#9/#11) between layers of 4 layers or less may be performed freely using information of #0 to #15.

However, for layer of 5 layers or more, multiplexing with other layer may not be performed easily. For example, in the case of 5 layer transmission defined in #16, multiplexing with other 2/3 layers is unavailable.

In the case that multiplexing is available for the case that a maximum number of layers x of a UE in which multiplexing is available is limited to '4' or less, but in the case that x is defined as '5' or more, multiplexing is not easy between UEs having 5 to 6 layers and UEs having have 2 to 3 layers.

Accordingly, in order to solve such a problem, a method for configuring a DCI field is proposed as below.

Embodiment 14

In a DCI field including information of antenna port(s), the number of layers, and/or the number of symbols, and so on in a DCI format, a DCI field for 5 and/or 6 layers may not include at least one of the antenna port(s) value for 3 and/or 2 layers.

The definition in relation to the configuration of a DCI field is preconfigured between an eNB and a UE, and the UE may obtain information of the antenna port(s), the number of layers, and the number of symbols, that are configured, by receiving a DCI field transmitted through a control channel.

For example, in the case that antenna port values for 3 layers are P0/P2/P4 and P1/P3/P5, antenna port values for 5 layers may include P0/P2/P4/P6/P7 value. That is, the P0/P2/P4/P6/P7 value that does not includes P1/P3/P5 combination, which is one of the antenna port values for 3 layers, may be used for 5 layer transmission. In such a case, P0/P2/P4/P6/P7 may be used for 5 layer transmission and P1/P3/P5 may be used for 3 layer transmission, and accordingly, 8 layers, which are all of the maximum transmission layer numbers of an eNB may be used.

Otherwise, in the case that antenna port values for 2 layers are P0/P2, P4/P6, P1/P3 and P5/P7, antenna port values for 6 layers may include P0/P1/P2/P3/P4/P6 values.

On the contrary, a type of combination among the antenna port combination for 2 and/or 3 layers may not include the antenna port(s) value 5 and/or 6 layers.

For example, in the case that antenna port values for 6 layers are P0/P1/P2/P3/P4/P6, antenna port values for 2 layers may include P0/P2, P4/P6, P1/P3, and P5/P7 values. In such a case, when P0/P1/P2/P3/P4/P6 are used for 6 layer transmission, P5/P7 may be used for 2 layer transmission, and accordingly, an eNB may use all of 8 layers, which is the maximum transmission layer number.

Alternatively, in the case that antenna port values for 5 layers are P0/P2/P4/P6/P7, antenna port values for 3 layers may include P5/P6/P7, P0/P1/P4 and P1/P3/P5 values.

DCI Field According to DMRS Symbol Number

A DCI field may be defined according to DMRS symbol number as described below.

Embodiment 15

In a DCI format, a DCI field may be defined, which includes antenna port(s), the number of layers, and/or the number of symbols, and so on. At this time, a DMRS mapped to one symbol and a DMRS mapped to two symbols may be defined in the same DCI field together.

The definition in relation to a configuration of a DCI field is preconfigured between an eNB and a UE, and the UE may obtain information of the antenna port(s), the number of layers, and/or the number of symbols, that are configured, by receiving a DCI field transmitted through a control channel.

In this case, the number of symbols value may be set to '1' or '2' to a UE by the DCI field value transmitted to the UE, and the antenna port(s), the number of layers, and the number of symbols of all cases may be informed to the UE.

Table 22 below represents an example of a DCI field for embodiment 15.

TABLE 22

| value | message | | |
|---|---|---|---|
| # | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 1 layer | P0 | 2 |
| 5 | 1 layer | P1 | 2 |
| 6 | 1 layer | P2 | 2 |
| 7 | 1 layer | P3 | 2 |
| 8 | 1 layer | P4 | 2 |
| 9 | 1 layer | P5 | 2 |
| 10 | 1 layer | P6 | 2 |
| 11 | 1 layer | P7 | 2 |
| 12 | 2 layer | P0/P2 | 1 |
| 13 | 2 layer | P1/P3 | 1 |
| 14 | 2 layer | P0/P4 | 2 |
| 15 | 2 layer | P1/P5 | 2 |
| 16 | 2 layer | P2/P6 | 2 |
| 17 | 2 layer | P3/P7 | 2 |
| 18 | 3 layer | P0/P1/P2 | 1 |
| 19 | 3 layer | P0/P2/P4 | 2 |
| 20 | 3 layer | P1/P3/P5 | 2 |
| 21 | 4 layer | P0/P1/P2/P3 | 1 |
| 22 | 4 layer | P0/P2/P4/P6 | 2 |
| 23 | 4 layer | P1/P3/P5/P7 | 2 |
| 24 | 5 layer | P0/P1/P2/P3/P4 | 2 |
| 25 | 6 layer | P0/P1/P2/P3/P4/P5 | 2 |
| 26 | 7 layer | P0/P1/P2/P3/P4/P5/P6 | 2 |
| 27 | 8 layer | P0/P1/P2/P3/P4/P5/P6/P7 | 2 |

Embodiment 16

In a DCI format, a DCI field may be defined, which includes antenna port(s), the number of layers, and/or the number of symbols, and so on. At this time, a DCI field may be defined with different methods according to the maximum value of the number of symbols value.

In this case, an eNB may set the maximum value (e.g., '1' or '2') to a UE through high layer signaling.

The UE receives a configured DCI field according to the maximum value set by high layer signaling. The definition in relation to a configuration of a DCI field is preconfigured between an eNB and a UE, and the UE may obtain information of the antenna port(s), the number of layers, and the number of symbols, that are configured, by receiving a DCI field transmitted through a control channel.

For example, in the case that the maximum value set by high layer signaling is '1', the UE may identify that a DCI field according to single-symbol DMRS is used.

Alternatively, in the case that the maximum value set by high layer signaling is '2', the UE may identify that a DCI field according to single-symbol DMRS or double-symbol DMRS.

Table 23 below represents an example of a DCI field in the case that the maximum value is '1', and Table 24 represents an example of a DCI field in the case that the maximum value is '2'.

TABLE 23

| value | message | | |
|---|---|---|---|
| # | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P2 | 1 |
| 5 | 2 layer | P1/P3 | 1 |
| 6 | 3 layer | P0/P1/P2 | 1 |
| 7 | 4 layer | P0/P1/P2/P3 | 1 |

TABLE 24

| value | message | | |
|---|---|---|---|
| # | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 1 layer | P0 | 2 |
| 5 | 1 layer | P1 | 2 |
| 6 | 1 layer | P2 | 2 |
| 7 | 1 layer | P3 | 2 |
| 8 | 1 layer | P4 | 2 |
| 9 | 1 layer | P5 | 2 |
| 10 | 1 layer | P6 | 2 |
| 11 | 1 layer | P7 | 2 |
| 12 | 2 layer | P0/P2 | 1 |
| 13 | 2 layer | P1/P3 | 1 |
| 14 | 2 layer | P0/P4 | 2 |
| 15 | 2 layer | P1/P5 | 2 |
| 16 | 2 layer | P2/P6 | 2 |
| 17 | 2 layer | P3/P7 | 2 |
| 18 | 3 layer | P0/P1/P2 | 1 |
| 19 | 3 layer | P0/P2/P4 | 2 |
| 20 | 3 layer | P1/P3/P5 | 2 |
| 21 | 4 layer | P0/P1/P2/P3 | 1 |
| 22 | 4 layer | P0/P2/P4/P6 | 2 |
| 23 | 4 layer | P1/P3/P5/P7 | 2 |
| 24 | 5 layer | P0/P1/P2/P3/P4 | 2 |
| 25 | 6 layer | P0/P1/P2/P3/P4/P5 | 2 |
| 26 | 7 layer | P0/P1/P2/P3/P4/P5/P6 | 2 |
| 27 | 8 layer | P0/P1/P2/P3/P4/P5/P6/P7 | 2 |

Embodiment 17

In a DCI format, a DCI field may be defined, which includes antenna port(s), the number of layers, and/or the number of symbols, and so on. At this time, a DCI field may be defined with different methods according to the maximum value of the number of symbols value.

In this case, an eNB may set the number of symbols to a UE through high layer signaling.

The UE receives a configured DCI field according to the number of symbols value set by high layer signaling. The definition in relation to a configuration of a DCI field is preconfigured between an eNB and a UE, and the UE may obtain information of the antenna port(s), the number of layers, and the number of symbols, that are configured, by receiving a DCI field transmitted through a control channel.

Table 25 below represents an example of a DCI field in the case that the number of symbols value is '1', and Table 26 represents an example of a DCI field in the case that the number of symbols value is '2'.

TABLE 25

| value | message | | |
|---|---|---|---|
| # | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P2 | 1 |
| 5 | 2 layer | P1/P3 | 1 |
| 6 | 3 layer | P0/P1/P2 | 1 |
| 7 | 4 layer | P0/P1/P2/P3 | 1 |

TABLE 26

| value | message | | |
|---|---|---|---|
| # | # of layers | antenna port(s) | # of symbols |
| 0 | 1 layer | P0 | 2 |
| 1 | 1 layer | P1 | 2 |
| 2 | 1 layer | P2 | 2 |
| 3 | 1 layer | P3 | 2 |
| 4 | 1 layer | P4 | 2 |
| 5 | 1 layer | P5 | 2 |
| 6 | 1 layer | P6 | 2 |
| 7 | 1 layer | P7 | 2 |
| 8 | 2 layer | P0/P4 | 2 |
| 9 | 2 layer | P1/P5 | 2 |
| 10 | 2 layer | P2/P6 | 2 |
| 11 | 2 layer | P3/P7 | 2 |
| 12 | 3 layer | P0/P2/P4 | 2 |
| 13 | 3 layer | P1/P3/P5 | 2 |
| 14 | 4 layer | P0/P2/P4/P6 | 2 |
| 15 | 4 layer | P1/P3/P5/P7 | 2 |
| 16 | 5 layer | P0/P1/P2/P3/P4 | 2 |
| 17 | 6 layer | P0/P1/P2/P3/P4/P5 | 2 |
| 18 | 7 layer | P0/P1/P2/P3/P4/P5/P6 | 2 |
| 19 | 8 layer | P0/P1/P2/P3/P4/P5/P6/P7 | 2 |

Embodiment 18

In a DCI format, a DCI field may be defined, which includes antenna port(s), the number of layers, and/or the number of symbols, and so on. At this time, a DCI field may be fixed in the standard by a specific method among the methods of embodiment 15 to 17, or an eNB may set a specific method to a UE using high layer signaling flexibly.

The UE may receive a DCI field transmitted through a control channel using a configuration method of the DCI field, and may obtain the configured information of antenna port(s), the number of layers, and the number of symbols.

DCI Field According to the CDM Scheme in the Frequency Domain

It is assumed that the CDM of the frequency domain of embodiment 1 to embodiment 18 described above is not signaled to a UE explicitly.

Accordingly, a UE may perform a reception process for two cases of ① the case of being CDMed and ② the case of not being CDMed.

For example, in the case that it is determined that a UE allocated with #8 in Table 27 below is multiplexed with a UE that uses P2/P6 through indirect channel estimation, a reception process of spreading the CDM should be performed.

However, in the case that it is determined that the UE is not multiplexed with a UE that uses P2/P6, the CDM may not be considered, and accordingly, the UE may have pattern characteristics of being robust to frequency selective property.

That is, dispreading for length 2 CDM may not be performed, and the UE may have DMRS sample for more REs.

TABLE 27

| value | message | | |
|---|---|---|---|
| # | # of layers | antenna port(s) | # of symbols |
| 0 | 1 layer | P0 | 2 |
| 1 | 1 layer | P1 | 2 |
| 2 | 1 layer | P2 | 2 |
| 3 | 1 layer | P3 | 2 |
| 4 | 1 layer | P4 | 2 |
| 5 | 1 layer | P5 | 2 |
| 6 | 1 layer | P6 | 2 |
| 7 | 1 layer | P7 | 2 |
| 8 | 2 layer | P0/P4 | 2 |
| 9 | 2 layer | P1/P5 | 2 |
| 10 | 2 layer | P2/P6 | 2 |
| 11 | 2 layer | P3/P7 | 2 |
| 12 | 3 layer | P0/P2/P4 | 2 |
| 13 | 3 layer | P1/P3/P5 | 2 |
| 14 | 4 layer | P0/P2/P4/P6 | 2 |
| 15 | 4 layer | P1/P3/P5/P7 | 2 |
| 16 | 5 layer | P0/P1/P2/P3/P4 | 2 |
| 17 | 6 layer | P0/P1/P2/P3/P4/P5 | 2 |
| 18 | 7 layer | P0/P1/P2/P3/P4/P5/P6 | 2 |
| 19 | 8 layer | P0/P1/P2/P3/P4/P5/P6/P7 | 2 |

A UE may estimate whether to perform CDM and reflect it to a reception process procedure, and a method is also available for an eNB to directly inform the corresponding information to the UE. In relation to this, the following method may be considered.

Embodiment 19

In a DCI format, a DCI field may be defined, which includes information of at least one of antenna port(s), the number of layers, the number of symbols, whether to perform CDM in the frequency domain, whether to perform FDM or whether to perform CDM in the time domain.

The definition in relation to a configuration of a DCI field is preconfigured between an eNB and a UE, and the UE may obtain information of the antenna port(s), the number of layers, the number of symbols, and whether to perform CDM in the frequency domain that are configured, by receiving a DCI field transmitted through a control channel.

Table 28 below represents an example of a DCI field in which it is included whether to perform CDM in the frequency domain.

TABLE 28

| value | | | | |
|---|---|---|---|---|
| # | # of layers | antenna port(s) | # of symbols | CDM-F 여부 |
| 0 | 1 layer | P0 | 1 | CDM-F off |
| 1 | 1 layer | P1 | 1 | CDM-F off |
| 2 | 1 layer | P0 | 1 | CDM-F on |
| 3 | 1 layer | P1 | 1 | CDM-F on |
| 4 | 1 layer | P2 | 1 | CDM-F on |
| 5 | 1 layer | P3 | 1 | CDM-F on |
| 6 | 2 layer | P0/P1 | 1 | CDM-F off |
| 7 | 2 layer | P0/P1 | 1 | CDM-F on |
| 8 | 2 layer | P2/P3 | 1 | CDM-F on |
| 9 | 3 layer | P0/P1/P2 | 1 | CDM-F off |
| 10 | 3 layer | P0/P1/P2 | 1 | CDM-F on |
| 11 | 4 layer | P0/P1/P2/P3 | 1 | CDM-F on |

In the case that the CDM-F indicating the CDM in the frequency domain is turned off, a UE may assume that MU MIMO in which port multiplexing is performed with the CDM-F is not existed.

On the contrary, in the case that the CDM-F is turned on, a UE may assume that MU MIMO in which port multiplexing is performed with the CDM-F is existed. That is, since the MU MIMO in which port multiplexing is performed may be existed, BD is performed for MU DMRS port.

This embodiment may be identically applied to the FDM on/off, the CDM-T on/off, and the like, as well as the CDM-F.

Table 29 below represents an example of a DCI field in which it is included whether to apply the FDM in the frequency domain.

TABLE 29

| value | | | | |
|---|---|---|---|---|
| # | # of layers | antenna port(s) | # of symbols | FDM여부 |
| 0 | 1 layer | P0 | 1 | FDM off |
| 1 | 1 layer | P2 | 1 | FDM off |
| 2 | 1 layer | P0 | 1 | FDM on |
| 3 | 1 layer | P1 | 1 | FDM on |
| 4 | 1 layer | P2 | 1 | FDM on |
| 5 | 1 layer | P3 | 1 | FDM on |
| 6 | 2 layer | P0/P2 | 1 | FDM off |
| 7 | 2 layer | P0/P2 | 1 | FDM on |
| 8 | 2 layer | P1/P3 | 1 | FDM on |
| 9 | 3 layer | P0/P1/P2 | 1 | FDM on |
| 10 | 4 layer | P0/P1/P2/P3 | 1 | FDM on |

1 symbol DMRS is exemplified in Table 28 and Table 29, but the present invention is not limited thereto, but also applied to 2 symbol DMRS as well as 1 symbol DMRS.

Embodiment 20

An eNB may set at least one of whether to perform CDM in the frequency domain, whether to perform FDM or whether to perform CDM in the time domain to a UE in relation to port multiplexing of a DMRS through high layer signaling.

In the case that a UE is configured not to use the FDM by an eNB, a PDSCH may be transmitted in an RE except the RE occupied by a specific antenna port(s) in a control channel of an OFDM symbol in which a DMRS is transmitted.

At this time, the specific antenna port(s) means antenna port(s) set through a DCI field in which the information of antenna port(s), the number of layers, the number of symbols, and the like.

However, in the case that a UE is configured to use the FDM by an eNB, a PDSCH may not be transmitted in an RE except the RE occupied by a specific antenna port(s) in a control channel of an OFDM symbol in which a DMRS is transmitted. And the UE may assume that x dB (e.g. 3 dB) power boosting is performed in the RE in which a DMRS is transmitted in comparison with a PDSCH.

At this time, 'x' value may be a value promised between an eNB and a UE in advance, or a value that an eNB set to a UE through high layer signaling.

The UE configured not to use the frequency domain CDM and/or the time domain CDM may assume that when a DCI field for forwarding information of antenna port(s), the number of layers, the number of symbols, and the like is set to a specific value, a UE allocated with a port that has different CSs in the frequency domain and/or different OCC codes in the time domain is not MU paring.

In this case, the UE may not perform dispreading process for length 2 CDM, and may obtain a DMRS sample for more REs.

Table 30 below represents an example of a DCI field for embodiment 20.

TABLE 30

| value | | | |
|---|---|---|---|
| # | # of layers | antenna port(s) | # of symbols |
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P1 | 1 |
| 5 | 2 layer | P2/P3 | 1 |
| 6 | 3 layer | P0/P1/P2 | 1 |
| 7 | 4 layer | P0/P1/P2/P3 | 1 |

When a UE receives that the CDM of the frequency domain is not used through high layer signaling, in the case that a DCI field is configured with #0, #1, #4, and #6, which are shaded in Table 30, the UE may identify that a UE allocated with a port (e.g., P2/P3) of different CSs in the frequency domain is not MU paring.

1 symbol DMRS is exemplified in Table 30, but the present invention is not limited thereto, but may be applied to 2 symbol DMRS as well as 1 symbol DMRS.

Embodiment 21

In a specific transmission environment (e.g., broadcast/multicast PDSCH, paging, random access message 3, etc.), a UE may identify that a UE allocated to port having different CS in the frequency domain is not MU pairing.

That is, in the case of a specific transmission environment such as broadcast PDSCH transmission in which more robust design is preferred for frequency selective property, it may be preferred not to use the CDM of the frequency domain.

Accordingly, in such a specific environment, it is configured not to use the CDM in the frequency domain, and more robust channel estimation performance may be provided for the frequency selective property.

For example, in the case that a PDSCH is received before dedicated higher layer configuration like RRC Configuration, a single DMRS of configuration type 1 is transmitted in a specific DMRS port, and all of the remaining orthogonal antenna ports may not be associated with a PDSCH transmission to other UE.

That is, even for the case of a PDSCH (e.g., broadcasted PDSCH, MIB (Mater Information Block), SIB (Secondary Information Block), etc.) transmitted before a DMRS pattern is identified in a UE through a DCI field of a PDCCH, the UE may demodulate or decode a PDSCH (first PDSCH), when the UE should receive a DMRS.

However, the UE is unable to identify the DMRS pattern since it is before the DCI is transmitted. In such a case, the DMRS pattern may be transmitted with a fixed pattern. That is, a DMRS (first DMRS) in such a transmission environment is a fixed type, and may be mapped to only a single symbol, and also transmitted only through a specific antenna port.

In addition, by configuring such that the CDM is not applied on the frequency domain, a UE may demodulate or decode a PDSCH by receiving a DMRS even in the case that the UE does not identify a DMRS mapping pattern by an eNB.

In such a case, the UE may demodulate or decode by receiving a DMRS in a specific environment and receiving a PDSCH that includes information of the DCI of a PDCCH.

Later, the UE may receive the DCI of the PDCCH based on the PDSCH, and may identify a mapping pattern of a DMRS (second DMRS) described in embodiments 1 to 20.

Then, the UE may receive a PDSCH (second PDSCH) that includes a DMRS and data based on the DCI, and may estimate a channel value which is required for channel compensation based on the DMRS.

Later, the UE may compensate a channel for the received data signal using the estimated channel value, and may detect the received data by performing demodulation and decoding processes for the signal after the compensation.

The antenna port of a DMRS (first DMRS) for a broadcasted PDSCH and the antenna port of the remaining DMRS (second DMRS) of other purpose may be multiplexed with the FDM scheme only. That is, it may be configured to use only other comb ($\Delta$=0 or 1).

In this case, $\Delta$ value may be used as a promised value between an eNB and a UE in advance, or a value that an eNB set to a UE through high layer signaling.

Signaling in Relation to RS Resource

Figure 19:
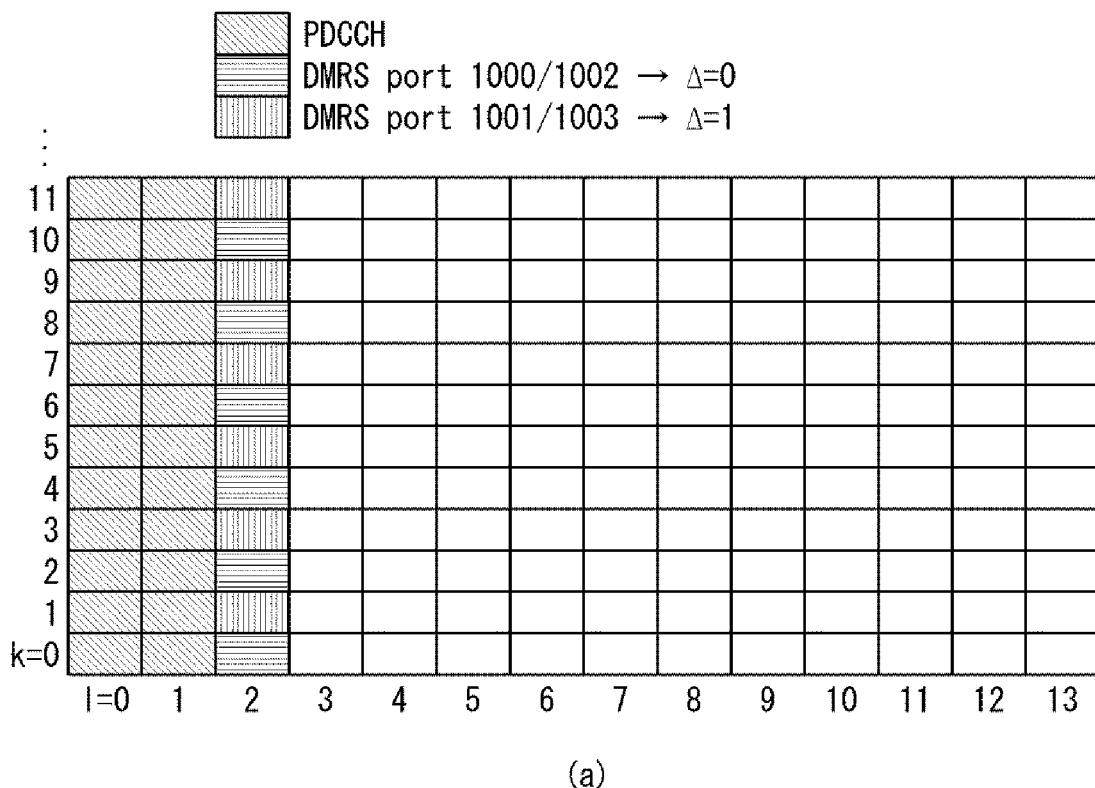
FIG. 19 is a diagram illustrating an example of a resource to which a demodulation reference signal is mapped which is proposed in the present invention.
Figure 19:
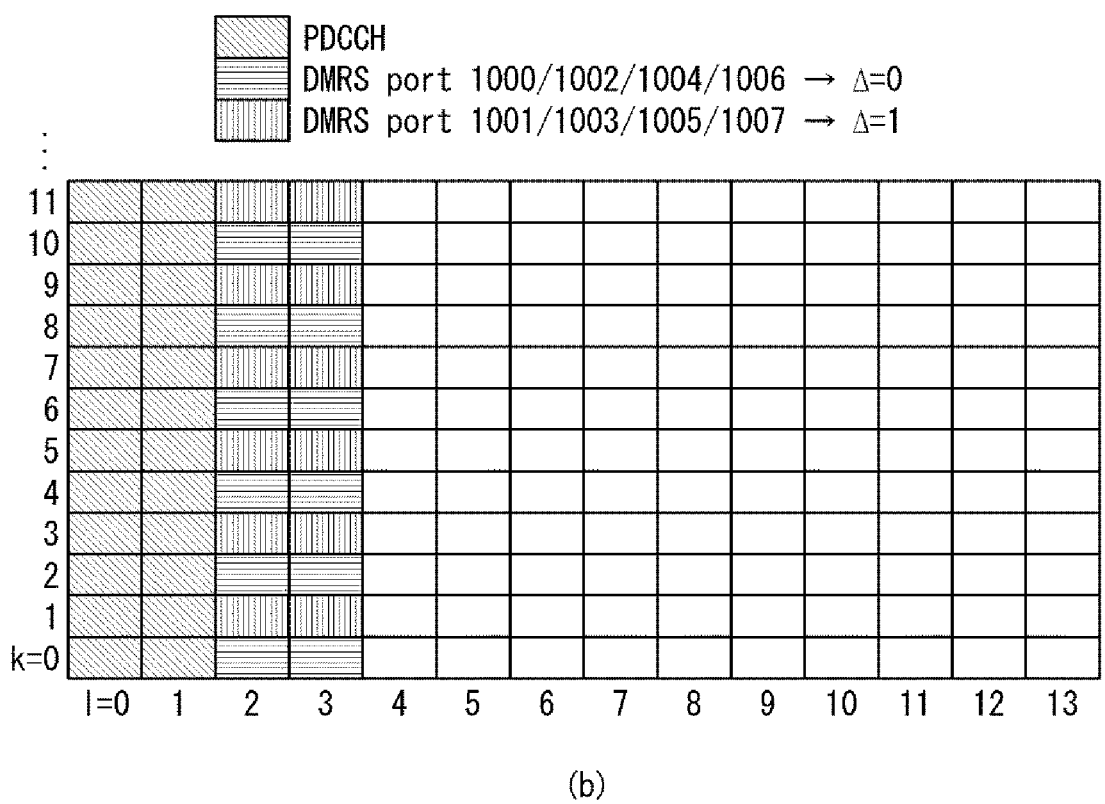

FIG. 19 is a diagram illustrating an example of a resource to which a demodulation reference signal is mapped which is proposed in the present invention.

For configuration type 1 as a DMRS configuration type, Repetition factor (RPF) may be '2', and each of RS resources may be represented as shown in FIG. 19. In FIG. 19, there is no additional DMRS, and 14 symbol slots are assumed.

The embodiment described above assumes that $\Delta$=0 and $\Delta$=1 are defined in the same DCI field together.

In such a case, it may be available to allocate a dynamic port or a layer number to a UE through DCI signaling.

However, since all number of cases should be defined in the same DCI field together, payload size of a DCI field may be increased.

In this case, a DCI field may be configured through the embodiment below.

Embodiment 22

Figure 20:
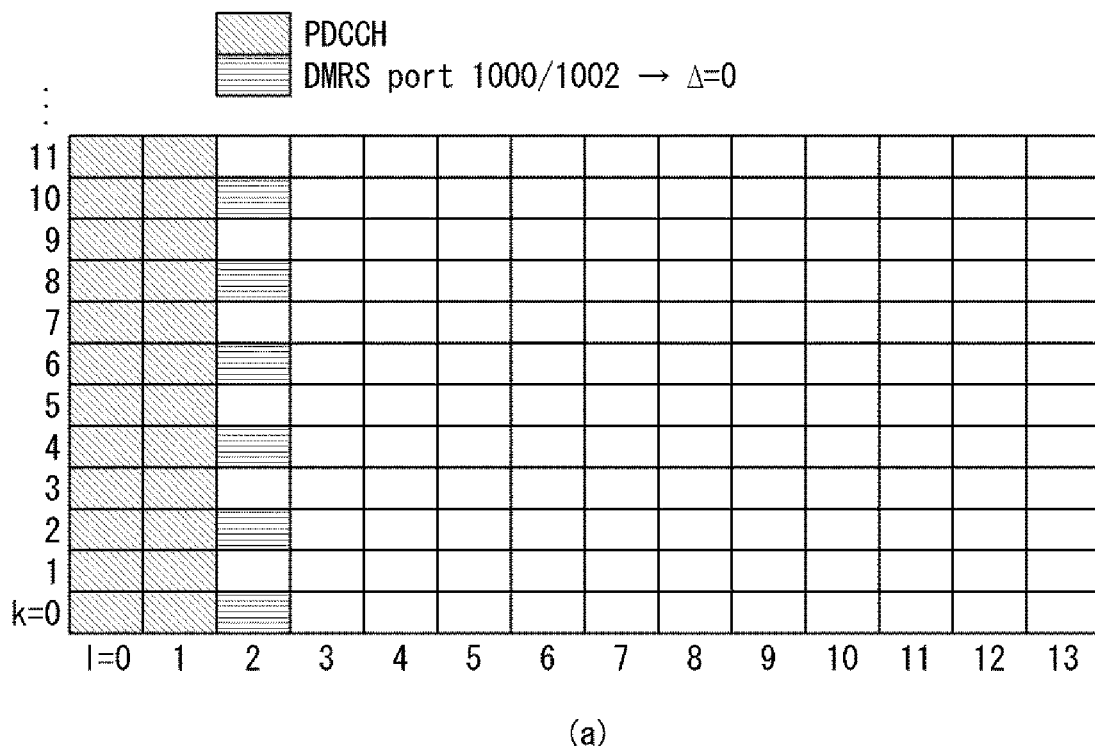
FIG. 20 and FIG. 21 are diagrams illustrating another example of a resource to which a demodulation reference signal is mapped which is proposed in the present invention.
Figure 20:
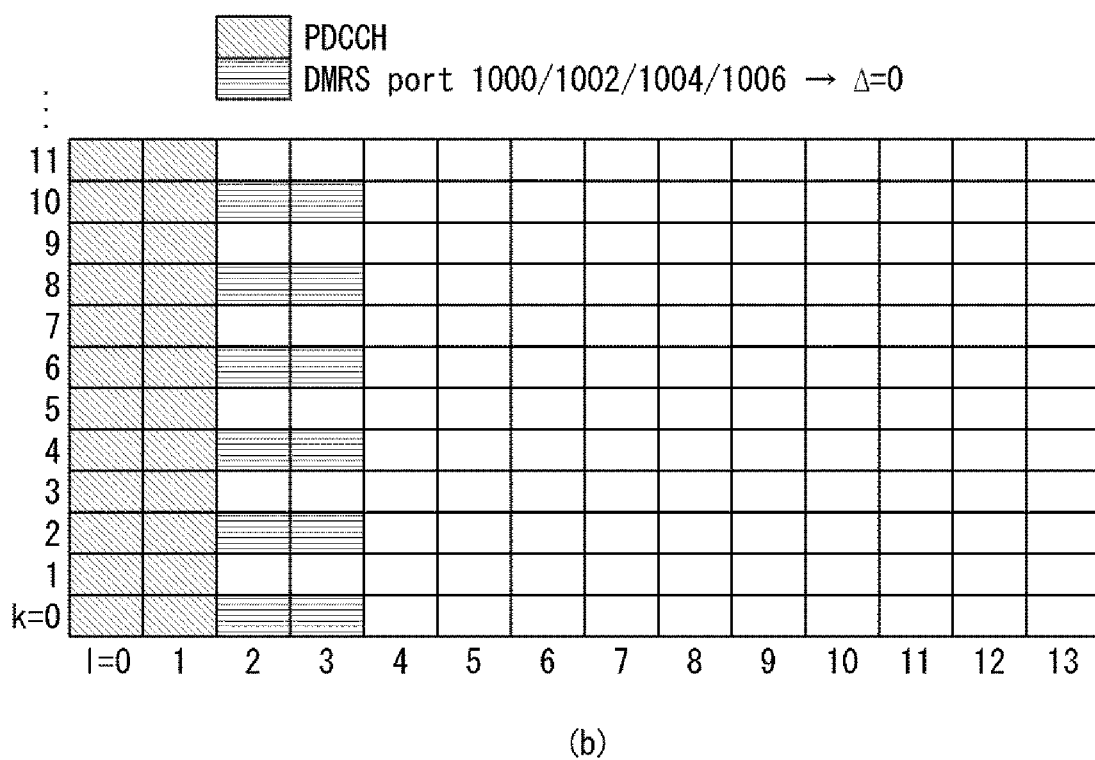
Figure 21:
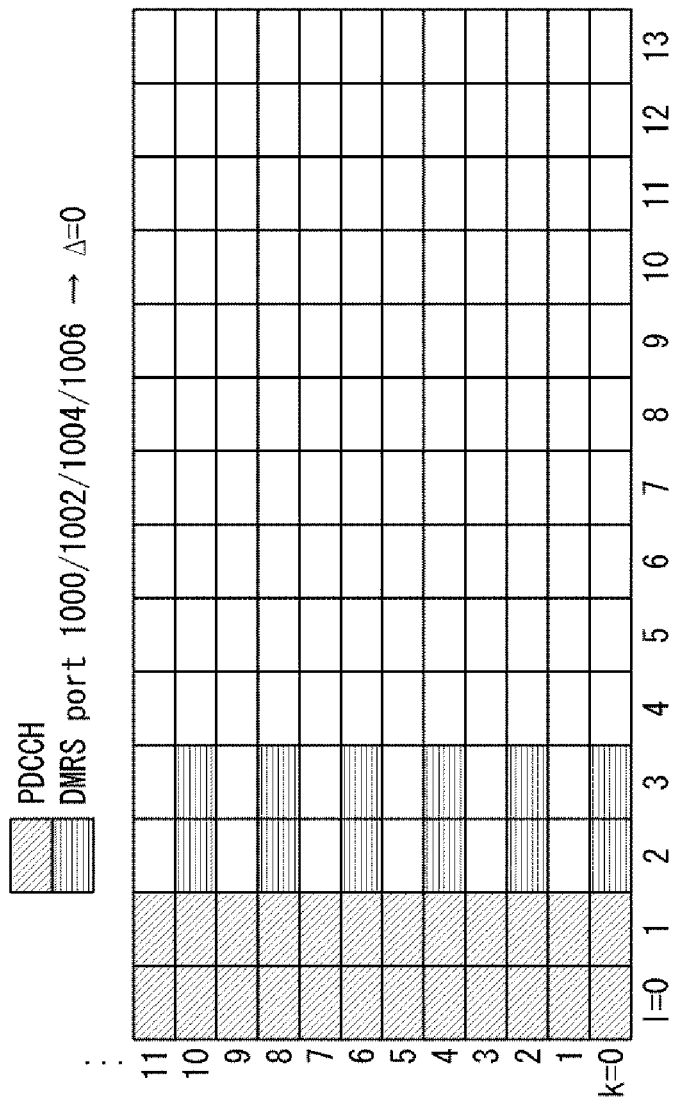

FIG. 20 and FIG. 21 are diagrams illustrating another example of a resource to which a demodulation reference signal is mapped which is proposed in the present invention.

In a DCI format, a DCI field may be defined, which includes information of at least one of antenna port(s), the number of layers, the number of symbols, and the like. In this case, each of the antenna port(s) may be associated with $\Delta$=0 or $\Delta$=1, and a DCI field may be configured in different schemes associated with each of the values (e.g., $\Delta$=0 or $\Delta$=1).

In addition, an eNB may set either one value of $\Delta$=0 or $\Delta$=1 to a UE through high layer signaling.

The UE may receive a DCI field in a scheme associated with $\Delta$ value set by high layer signaling. A configuration of a DCI field is preconfigured between an eNB and a UE, and the UE may obtain information of the antenna port(s), the number of layers, and the number of symbols.

In this case, a resource in which RS definition is available is restricted to a specific value, and payload size of a DCI field may be reduced. In this case, multiplexing may be available between different waveforms.

For example, for the configuration of 4 layers, multiplexing of both of 1 symbol DMRS and 2 symbol DMRS may be available, but 1 symbol DMRS may be multiplexed with different waveform in the same OFDM symbol.

FIG. 20 and Table 31 below represent an example of $\Delta$=0 case.

TABLE 31

| value # | # of layers | antenna port(s) | # of symbols |
|---|---|---|---|
| 0 | 1 layer | P0 | 1 |
| 1 | 1 layer | P2 | 1 |
| 2 | 1 layer | P0 | 2 |
| 3 | 1 layer | P2 | 2 |
| 4 | 1 layer | P4 | 2 |
| 5 | 1 layer | P6 | 2 |
| 6 | 2 layer | P0/P2 | 1 |
| 7 | 2 layer | P0/P4 | 2 |
| 8 | 2 layer | P2/P6 | 2 |
| 9 | 3 layer | P0/P2/P4 | 2 |
| 10 | 4 layer | P0/P2/P4/P6 | 2 |

Table 32 below represents an example of $\Delta$=1 case.

TABLE 32

| value # | # of layers | antenna port(s) | # of symbols |
|---|---|---|---|
| 0 | 1 layer | P1 | 1 |
| 1 | 1 layer | P3 | 1 |
| 2 | 1 layer | P1 | 2 |
| 3 | 1 layer | P3 | 2 |
| 4 | 1 layer | P5 | 2 |
| 5 | 1 layer | P7 | 2 |
| 6 | 2 layer | P1/P3 | 1 |
| 7 | 2 layer | P1/P5 | 2 |
| 8 | 2 layer | P3/P7 | 2 |
| 9 | 3 layer | P1/P3/P5 | 2 |
| 10 | 4 layer | P1/P3/P5/P7 | 2 |

In embodiment 22, a definition of DCI field is represented as a part of examples among available methods, and a method for defining a message in a DCI field may be used with the methods of embodiment 1 to embodiment 21 described above.

For example, with embodiment 22, using signaling for the number of symbols, a size of additional DCI payload may be reduced.

Table 33 below represents an example of a DCI field in Δ=0, in the case that the number of symbols value or the maximum value of the number of symbols is set to '1' through high layer signaling.

TABLE 33

| value | message | | |
|---|---|---|---|
| # | # of layers | antenna port(s) | # of symbols |
| 0 | 1 layer | P0 | 1 |
| 1 | 1 layer | P2 | 1 |
| 2 | 2 layer | P0/P2 | 1 |

Table 34 below represents an example of a DCI field in Δ=1, in the case that the number of symbols value or the maximum value of the number of symbols is set to '1' through high layer signaling.

TABLE 34

| value | message | | |
|---|---|---|---|
| # | # of layers | antenna port(s) | # of symbols |
| 0 | 1 layer | P1 | 1 |
| 1 | 1 layer | P3 | 1 |
| 2 | 2 layer | P1/P3 | 1 |

Table 35 below and FIG. 21 represent an example of a DCI field in Δ=0, in the case that the number of symbols value or the maximum value of the number of symbols is set to '2' through high layer signaling.

TABLE 35

| value | message | | |
|---|---|---|---|
| # | #of layers | antenna port(s) | #of symbols |
| 0 | 1 layer | P0 | 2 |
| 1 | 1 layer | P2 | 2 |
| 2 | 1 layer | P4 | 2 |
| 3 | 1 layer | P6 | 2 |
| 4 | 2 layer | P0/P4 | 2 |
| 5 | 2 layer | P2/P6 | 2 |
| 6 | 3 layer | P0/P2/P4 | 2 |
| 7 | 4 layer | P0/P2/P4/P6 | 2 |

Table 36 below represents an example of a DCI field in Δ=1, in the case that the number of symbols value or the maximum value of the number of symbols is set to '2' through high layer signaling.

TABLE 36

| value | message | | |
|---|---|---|---|
| # | # of layers | antenna port(s) | # of symbols |
| 0 | 1 layer | P1 | 2 |
| 1 | 1 layer | P3 | 2 |
| 2 | 1 layer | P5 | 2 |
| 3 | 1 layer | P7 | 2 |
| 4 | 2 layer | P1/P5 | 2 |
| 5 | 2 layer | P3/P7 | 2 |
| 6 | 3 layer | P1/P3/P5 | 2 |
| 7 | 4 layer | P1/P3/P5/P7 | 2 |

As another embodiment of the present invention, a DCI field may be defined, which has a combination of antenna port(s), the number of layers, and the number of symbols in different schemes by being associated with a carrier frequency.

In addition, according to the carrier frequency set between an eNB and a UE, a definition scheme of a DCI field associated with the corresponding carrier frequency may be used between the eNB and the UE.

The definition of a DCI field is preconfigured between an eNB and a UE, and the UE may obtain information of the antenna port(s), the number of layers, and the number of symbols, by receiving a DCI field transmitted through a control channel.

In a higher carrier frequency such as 30 GHz, the number of cases of supporting high layer numbers may be extremely low. Accordingly, in such a case, in order to reduce a DCI payload size, the definition of the corresponding layer (e.g., layer 4 or more) may be omitted in a DCI field.

Embodiments 1 to 22 described above are based on the antenna port(s), the number of layers, the number of symbols, and the like, but in addition, it is apparent that it is available to be combined with additional information such as scrambling ID, and so on.

Further, it is based on DMRS type 1, but the core proposals of the present invention may also be applied to DMRS type 2, and may be applied to uplink as well as downlink.

The table is referred to a DMRS table, which defines a DCI field including information such as antenna port(s), the number of layers, and the like in relation to a DMRS between an eNB and a UE.

The DMRS table may be configured as the method below.

Embodiment 23

Figure 22:
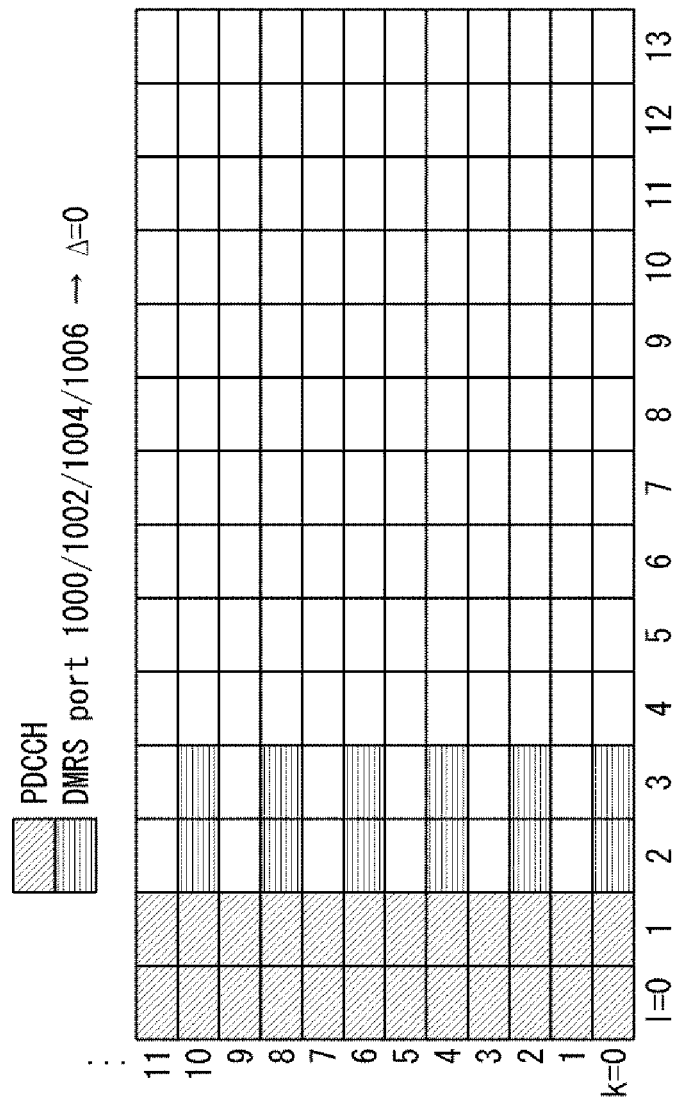
FIG. 22 is a diagram illustrating an example of a performance according to a configuration type of a demodulated reference signal which is proposed in the present invention.

FIG. 22 is a diagram illustrating an example of a performance according to a configuration type of a demodulated reference signal which is proposed in the present invention.

It may be defined in the DMRS table that defines a format of a DMRS field by being joint-encoded with a port index of an antenna port and/or the number of layers, and so on, whether a PDSCH and a DMRS are multiplexed in the same DMRS symbol.

The defined DMRS table may be transmitted from an eNB to a UE through DCI signaling, and set to the UE.

At this time, both of multiplexing and non-multiplexing are defined in the DMRS table only for a specific antenna port, and dynamically set to the UE through DCI signaling by the eNB, and it may be configured that non-multiplexing is performed as a default between the eNB and the UE for other antenna ports.

In this embodiment, multiplexing represents multiplexing of a DMRS and a PDSCH in the same OFDM symbol, and non-multiplexing represents not to multiplex a DMRS and a PDSCH in the same OFDM symbol.

In this embodiment, for non-multiplexing, power boosting for a DMRS RE may be performed. For example, power boosting of 3 dB may be performed for DMRS configuration type 1, and power boosting of 4.77 dB may be performed for DMRS configuration type 2.

Table 37 below represents an example of a DCI field for the DMRS table according to embodiment 1.

TABLE 37

| value # | # of layers | antenna port(s) | # of symbols |
|---|---|---|---|
| 0 | 1 layer | P0 (w/PDSCH multiplexing) | 1 |
| 1 | 1 layer | P0 | 1 |
| 2 | 1 layer | P1 | 1 |
| 3 | 1 layer | P2 | 1 |
| 4 | 1 layer | P3 | 1 |
| 5 | 2 layer | P0/P1 | 1 |
| 6 | 2 layer | P2/P3 | 1 |
| 7 | 3 layer | P0/P1/P2 | 1 |
| 8 | 4 layer | P0/P1/P2/P3 | 1 |
| 9 | 1 layer | P0 | 2 |
| 10 | 1 layer | P1 | 2 |
| 11 | 1 layer | P2 | 2 |
| 12 | 1 layer | P3 | 2 |
| 13 | 1 layer | P4 | 2 |
| 14 | 1 layer | P5 | 2 |
| 15 | 1 layer | P6 | 2 |
| 16 | 1 layer | P7 | 2 |
| 17 | 2 layer | P0/P1 | 2 |
| 18 | 2 layer | P2/P3 | 2 |
| 19 | 2 layer | P4/P5 | 2 |
| 20 | 2 layer | P6/P7 | 2 |
| 21 | 3 layer | P0/P1/P2 | 2 |
| 22 | 3 layer | P3/P4/P5 | 2 |
| 23 | 4 layer | P0/P1/P2/P3 | 2 |
| 24 | 4 layer | P4/P5/P6/P7 | 2 |
| 25 | 5 layer | P0/P1/P2/P3/P4 | 2 |
| 26 | 6 layer | P0/P1/P2/P3/P4/P5 | 2 |
| 27 | 7 layer | P0/P1/P2/P3/P4/P5/P6 | 2 |
| 28 | 8 layer | P0/P1/P2/P3/P4/P5/P6/P7 | 2 |
| 29 | reserved | reserved | reserved |
| 30 | reserved | reserved | reserved |
| 31 | reserved | reserved | reserved |

When it is set to #0 in Table 37, a DMRS and a PDSCH may be multiplexed. In addition, in the case that a value except #0 is set, a DMRS and a PDSCH may not be multiplexed.

For 1 layer transmission case, a UE of high SNR may have better SE performance when RS overhead is small as shown in FIG. 22.

Accordingly, in order to an optimal performance to the UE of high SNR, a port configuration for such a case may be defined in a DCI table, and a port may be set to a UE through DCI signaling.

Embodiment 24

For MU-MIMO, the maximum number of transmission layers of SU-MIMO may be set to a UE through high layer signaling of an eNB. In this case, the DMRS table and a DCI payload size that defines the DMRS table may be defined with being associated with the maximum number of transmission layers of SU-MIMO.

Particularly, the number of combination of antenna port(s) and the number of layers may be changed, which is configurable according to the maximum number of transmission layers of SU-MIMO supported in the case of MU-MIMO.

For example, in the case that the maximum number of transmission layers is set as a small value, the number of combinations of antenna port(s) and the number of layers becomes smaller, and accordingly, a DCI payload size for defining the DMRS table also becomes smaller.

Accordingly, in the case that the maximum number of transmission layers of SU-MIMO supported in the case of MU-MIMO is set by high layer signaling according to environments of an eNB and a UE, an optimal DMRS table associated with the corresponding number of layers is defined, and accordingly, overhead of DCI signaling may be reduced.

Embodiment 25

The DMRS table may be differently configured according to a configuration type of DMRS.

Particularly, a configuration type of DMRS has different properties such as the maximum number of orthogonal DMRS ports according to type 1 and type 2.

Accordingly, many combinations needs to be included in one DMRS table for type 1 and type 2 have a single DMRS table, and accordingly, a DCI payload size becomes greater.

Therefore, each of DMRS tables defined by an optimal bit number may be set in accordance with a property of each type.

For example, in the case that mapping between a configuration type of DMRS and an antenna port is as shown in FIG. 17, a DCI field is as represented in Table 38 below. For the convenience of description, each of DMRS ports 1000/1001/.../1007 is described for P0/P1/.../P7, respectively.

TABLE 38

| value # | # of layers | antenna port(s) | # of symbols |
|---|---|---|---|
| 0 | 1 layer | P0 (w/PDSCH multiplexing) | 1 |
| 1 | 1 layer | P0 | 1 |
| 2 | 1 layer | P1 | 1 |
| 3 | 1 layer | P2 | 1 |
| 4 | 1 layer | P3 | 1 |
| 5 | 2 layer | P0/P1 | 1 |
| 6 | 2 layer | P2/P3 | 1 |
| 7 | 3 layer | P0/P1/P2 | 1 |
| 8 | 4 layer | P0/P1/P2/P3 | 1 |
| 9 | 1 layer | P0 | 2 |
| 10 | 1 layer | P1 | 2 |
| 11 | 1 layer | P2 | 2 |
| 12 | 1 layer | P3 | 2 |
| 13 | 1 layer | P4 | 2 |
| 14 | 1 layer | P5 | 2 |
| 15 | 1 layer | P6 | 2 |
| 16 | 1 layer | P7 | 2 |
| 17 | 2 layer | P0/P1 | 2 |
| 18 | 2 layer | P2/P3 | 2 |
| 19 | 2 layer | P4/P5 | 2 |
| 20 | 2 layer | P6/P7 | 2 |
| 21 | 3 layer | P0/P1/P2 | 2 |
| 22 | 3 layer | P3/P4/P5 | 2 |
| 23 | 4 layer | P0/P1/P2/P3 | 2 |
| 24 | 4 layer | P4/P5/P6/P7 | 2 |
| 25 | 5 layer | P0/P1/P2/P3/P4 | 2 |
| 26 | 6 layer | P0/P1/P2/P3/P4/P5 | 2 |
| 27 | 7 layer | P0/P1/P2/P3/P4/P5/P6 | 2 |
| 28 | 8 layer | P0/P1/P2/P3/P4/P5/P6/P7 | 2 |
| 29 | reserved | reserved | reserved |
| 30 | reserved | reserved | reserved |
| 31 | reserved | reserved | reserved |

The index has no specific mark in Table 38 does not multiplex a DMRS and a PDSCH, and 3 dB power boosting may be performed for a DMRS RE.

Hereinafter, in the same way, an index has no specific mark in the embodiment of the present invention not multiplex a DMRS and a PDSCH, and 3 dB power boosting may be performed for a DMRS RE.

In Table 38, multiplexing between a DMRS and a PDSCH may be performed only for #0 case. This is because there is an improvement of performance owing to PDSCH multiplexing in high SNR region for 1 layer transmission case, as described in FIG. 22.

In addition, for high frequency density and scheduling flexibility of Comp (NCJT) in embodiment 25, the FDM may be performed first.

In embodiment 25, the CDM scheme using P0/P2 and/or P2 for performing PDSCH multiplexing may be added.

In this embodiment, dynamic signaling for the number of DMRS symbols is available, and accordingly, RS overhead may be efficiently managed and there is high MU-MIMO capacity, simultaneously.

However, the number of bits for defining a DCI field may be increased. Accordingly, in order to decrease the number of bits for defining a DCI field, in the case of an eNB in which MU-MIMO capacity is not important, the maximum number of DMRS symbols may be set to a UE by high layer signaling, and accordingly, a payload size of DCI field may be reduced.

Table 39 below represents an example of a case that the maximum number of DMRS symbols is set to '1' (4 bits).

TABLE 39

| value # | # of layers | antenna port(s) | # of symbols | scrambling ID |
|---|---|---|---|---|
| 0 | 1 layer | P0 (w/PDSCH multiplexing) | 1 | nSCID = 0 |
| 1 | 1 layer | P0 | 1 | nSCID = 0 |
| 2 | 1 layer | P1 | 1 | nSCID = 0 |
| 3 | 1 layer | P2 | 1 | nSCID = 0 |
| 4 | 1 layer | P3 | 1 | nSCID = 0 |
| 5 | 2 layer | P0/P1 | 1 | nSCID = 0 |
| 6 | 2 layer | P2/P3 | 1 | nSCID = 0 |
| 7 | 3 layer | P0/P1/P2 | 1 | nSCID = 0 |
| 8 | 4 layer | P0/P1/P2/P3 | 1 | nSCID = 0 |
| 9 | 1 layer | P0 | 1 | nSCID = 1 |
| 10 | 1 layer | P1 | 1 | nSCID = 1 |
| 11 | 1 layer | P2 | 1 | nSCID = 1 |
| 12 | 1 layer | P3 | 1 | nSCID = 1 |
| 13 | 2 layer | P0/P1 | 1 | nSCID = 1 |
| 14 | 2 layer | P2/P3 | 1 | nSCID = 1 |
| 15 | reserved | reserved | reserved | reserved |

In the case of Table 39, the maximum number of symbols of DMRS may be decreased, and accordingly, RS overhead may be reduced. And different scrambling IDs may be applied to increase the number of quasi-orthogonal ports.

Table 40 below represents an example of a case that the maximum number of DMRS symbols is set to '1' (3 bits).

TABLE 40

| value # | # of layers | antenna port(s) | # of symbols |
|---|---|---|---|
| 0 | 1 layer | P0 | 1 |
| 1 | 1 layer | P1 | 1 |
| 2 | 1 layer | P2 | 1 |
| 3 | 1 layer | P3 | 1 |
| 4 | 2 layer | P0/P1 | 1 |
| 5 | 2 layer | P2/P3 | 1 |
| 6 | 3 layer | P0/P1/P2 | 1 |
| 7 | 4 layer | P0/P1/P2/P3 | 1 |

In the case of Table 40, RS overhead may be reduced by decreasing the number of DMRS symbols, and in order to minimize the number of bits for defining a DCI field, in 1 layer transmission, a message allowing multiplexing with a PDSCH may be excluded.

Table 41 below represents an example of a case that the maximum number of DMRS symbols is set to '1' (4 bits).

TABLE 41

| value # | # of layers | antenna port(s) | # of symbols |
|---|---|---|---|
| 0 | 1 layer | P0 (w/PDSCH multiplexing) | 1 |
| 1 | 1 layer | P2 (w/PDSCH multiplexing) | 1 |
| 2 | 1 layer | P0 | 1 |
| 3 | 1 layer | P1 | 1 |
| 4 | 1 layer | P2 | 1 |
| 5 | 1 layer | P3 | 1 |
| 6 | 2 layer | P0/P2 (w/PDSCH multiplexing) | 1 |
| 7 | 2 layer | P0/P1 | 1 |
| 8 | 2 layer | P2/P3 | 1 |
| 9 | 3 layer | P0/P1/P2 | 1 |
| 10 | 4 layer | P0/P1/P2/P3 | 1 |
| 11 | reserved | reserved | reserved |
| 12 | reserved | reserved | reserved |
| 13 | reserved | reserved | reserved |
| 14 | reserved | reserved | reserved |
| 15 | reserved | reserved | reserved |

In the case of Table 41, a DMRS may be mapped to only one symbol. In this case, an additional DMRS may be mapped, and in the case that the number of symbols that construct a slot is small, multiplexing is performed by using the CDM scheme as represented in #6, and accordingly, the performance may be improved.

Since a plurality of reserved regions is existed in Table 41, inefficient aspect may be existed.

Accordingly, in order to compensate it, #0, #1 and #6 used for reducing RS overhead in high SNR region may be excluded in a DCI field.

Alternatively, in the SU aspect, a maximum transmission layer is restricted to 2, and the number of quasi-orthogonal ports may be increased or a DCI payload size and RS overhead may be decreased.

In the case that a great number of additional DMRSs are mapped to a symbol, high Doppler situation occurs and it is unable to support high rank for a UE, and therefore, it may be efficient to lower the maximum number of transmission layers and to reduce a DCI payload size.

Table 42 below represents an example that the maximum number of transmission layers is restricted to 2 in the SU aspect, and the number of quasi-orthogonal ports is increased through scrambling ID (4 bits.).

TABLE 42

| value # | # of layers | antenna port(s) | # of symbols | scrambling ID |
|---|---|---|---|---|
| 0 | 1 layer | P0 (w/PDSCH multiplexing) | 1 | 0 |
| 1 | 1 layer | P2 (w/PDSCH multiplexing) | 1 | 0 |
| 2 | 1 layer | P0 | 1 | 0 |
| 3 | 1 layer | P1 | 1 | 0 |
| 4 | 1 layer | P2 | 1 | 0 |
| 5 | 1 layer | P3 | 1 | 0 |
| 6 | 2 layer | P0/P2 (w/PDSCH multiplexing) | 1 | 0 |
| 7 | 2 layer | P0/P1 | 1 | 0 |
| 8 | 2 layer | P2/P3 | 1 | 0 |
| 9 | 1 layer | P0 | 1 | 1 |
| 10 | 1 layer | P1 | 1 | 1 |
| 11 | 1 layer | P2 | 1 | 1 |
| 12 | 1 layer | P3 | 1 | 1 |
| 13 | 2 layer | P0/P2 (w/PDSCH multiplexing) | 1 | 1 |
| 14 | 2 layer | P0/P1 | 1 | 1 |
| 15 | 2 layer | P2/P3 | 1 | 1 |

TABLE 42-continued

| value | | message | | |
|---|---|---|---|---|
| # | # of layers | antenna port(s) | # of symbols | scrambling ID |

Table 43 below represents an example that the maximum number of transmission layers is restricted to 2 in the SU aspect, RS overhead is reduced by performing multiplexing of PDSCH, and the number of quasi-orthogonal ports is increased (3 bits.).

TABLE 43

| value | | message | | |
|---|---|---|---|---|
| # | # of layers | antenna port(s) | # of symbols | scrambling ID |
| 0 | 1 layer | P0 | 1 | 0 |
| 1 | 1 layer | P2 | 1 | 0 |
| 2 | 2 layer | P0/P2 | 1 | 0 |
| 3 | 1 layer | P0 | 1 | 1 |
| 4 | 1 layer | P2 | 1 | 1 |
| 5 | 2 layer | P0/P2 | 1 | 1 |
| 6 | reserved | reserved | reserved | reserved |
| 7 | reserved | reserved | reserved | reserved |

In the case of defining a DCI field according to Table 43, an RE occupied by a port except an allocated DMRS port may be multiplexed with a PDSCH.

Table 44 below represents an example that the maximum number of transmission layers is restricted to 2 in the SU aspect, RS overhead is reduced by performing multiplexing of PDSCH, and a DCI payload size is reduced (3 bits.).

TABLE 44

| | message | | |
|---|---|---|---|
| value # | # of layers | antenna port(s) | # of symbols |
| 0 | 1 layer | P0 | 1 |
| 1 | 1 layer | P2 | 1 |
| 2 | 2 layer | P0/P2 | 1 |
| 3 | Reserved | reserved | reserved |

In the case of defining a DCI field according to Table 44, an RE occupied by a port except an allocated DMRS port may be multiplexed with a PDSCH.

Figure 23:
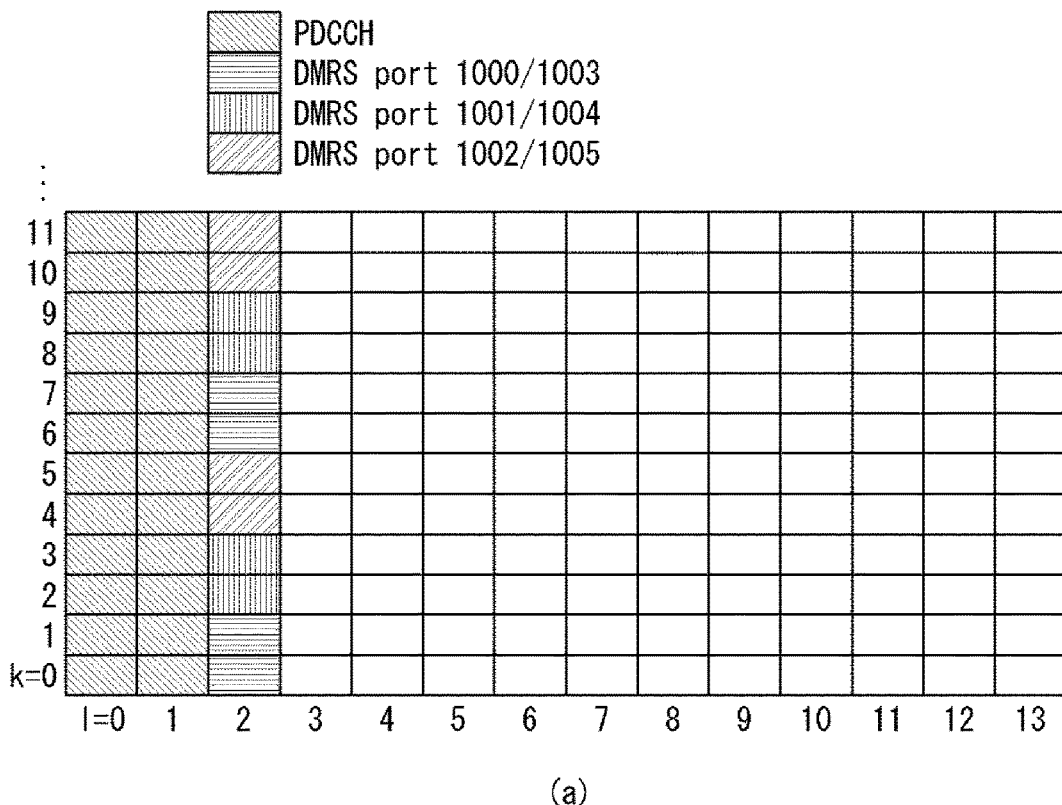
FIG. 23 is a diagram illustrating an example of a port mapping of an antenna port for configuration type 2 of a DMRS.
Figure 23:
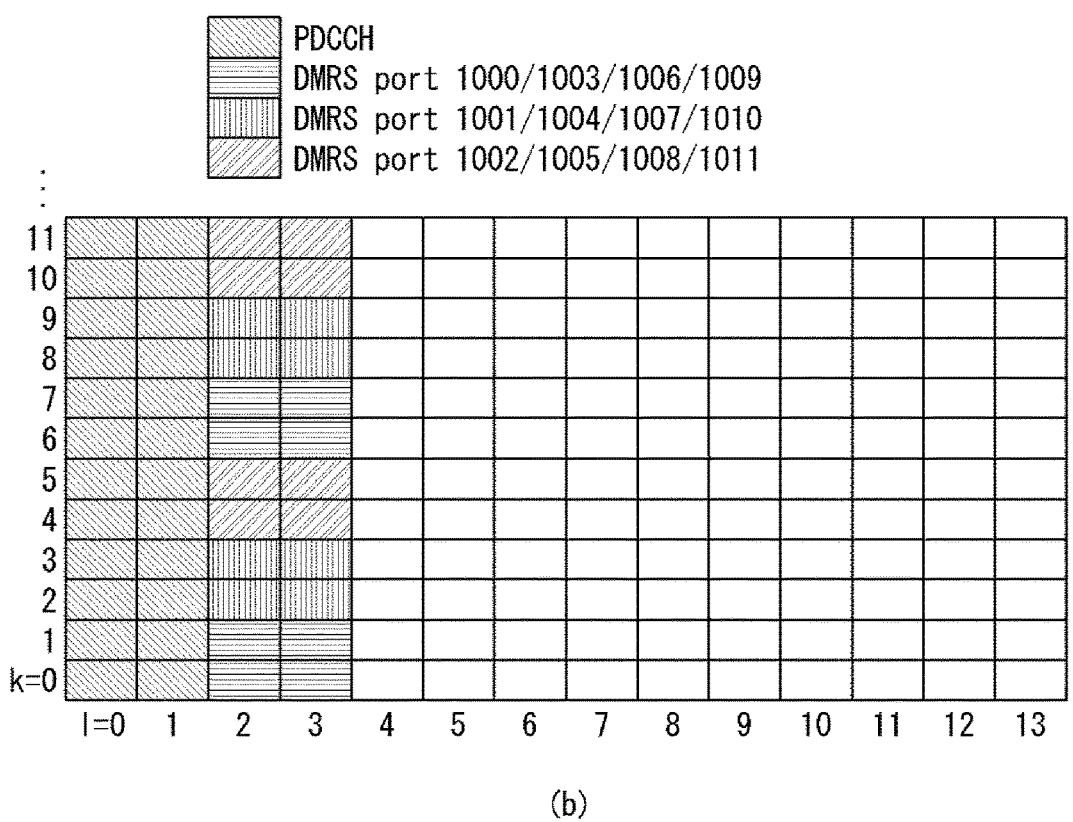

FIG. 23 is a diagram illustrating an example of a port mapping of an antenna port for configuration type 2 of a DMRS.

In the case that a configuration type of DMRS is type 2 and mapping of an antenna port is as shown in FIG. 23, a DCI field may be defined as represented in Table 45 below.

TABLE 45

| | message | | |
|---|---|---|---|
| Value # | # of layers | antenna port(s) | # of symbols |
| 0 | 1 layer | P0 (w/PDSCH multiplexing) | 1 |
| 1 | 1 layer | P0 | 1 |
| 2 | 1 layer | P1 | 1 |
| 3 | 1 layer | P2 | 1 |
| 4 | 1 layer | P3 | 1 |
| 5 | 1 layer | P4 | 1 |
| 6 | 1 layer | P5 | 1 |
| 7 | 2 layer | P0/P1 | 1 |
| 8 | 2 layer | P2/P3 | 1 |
| 9 | 2 layer | P4/P5 | 1 |

TABLE 45-continued

| | message | | |
|---|---|---|---|
| Value # | # of layers | antenna port(s) | # of symbols |
| 10 | 3 layer | P0/P1/P2 | 1 |
| 11 | 3 layer | P3/P4/P5 | 1 |
| 12 | 4 layer | P0/P1/P2/P3 | 1 |
| 13 | 5 layer | P0/P1/P2/P3/P4 | 1 |
| 14 | 6 layer | P0/P1/P2/P3/P4/P5 | 1 |
| 15 | 1 layer | P0 | 2 |
| 16 | 1 layer | P1 | 2 |
| 17 | 1 layer | P2 | 2 |
| 18 | 1 layer | P3 | 2 |
| 19 | 1 layer | P4 | 2 |
| 20 | 1 layer | P5 | 2 |
| 21 | 1 layer | P6 | 2 |
| 22 | 1 layer | P7 | 2 |
| 23 | 1 layer | P8 | 2 |
| 24 | 1 layer | P9 | 2 |
| 25 | 1 layer | P10 | 2 |
| 26 | 1 layer | P11 | 2 |
| 27 | 2 layer | P0/P1 | 2 |
| 28 | 2 layer | P2/P3 | 2 |
| 29 | 2 layer | P4/P5 | 2 |
| 30 | 2 layer | P6/P7 | 2 |
| 31 | 2 layer | P8/P9 | 2 |
| 32 | 2 layer | P10/P11 | 2 |
| 33 | 3 layer | P0/P1/P2 | 2 |
| 34 | 3 layer | P3/P4/P5 | 2 |
| 35 | 3 layer | P6/P7/P8 | 2 |
| 36 | 3 layer | P9/P10/P11 | 2 |
| 37 | 4 layer | P0/P1/P2/P3 | 2 |
| 38 | 4 layer | P4/P5/P6/P7 | 2 |
| 39 | 4 layer | P8/P9/P10/P11 | 2 |
| 40 | 5 layer | P0/P1/P2/P3/P4 | 2 |
| 41 | 6 layer | P0/P1/P2/P3/P4/P5 | 2 |
| 42 | 7 layer | P0/P1/P2/P3/P4/P5/P6 | 2 |
| 43 | 8 layer | P0/P1/P2/P3/P4/P5/P6/P7 | 2 |
| 44 | reserved | reserved | reserved |
| 45 | reserved | reserved | reserved |
| 46 | reserved | reserved | reserved |
| 47 | reserved | reserved | reserved |
| 48 | reserved | reserved | reserved |
| 49 | reserved | reserved | reserved |
| 50 | reserved | reserved | reserved |
| 51 | reserved | reserved | reserved |
| 52 | reserved | reserved | reserved |
| 53 | reserved | reserved | reserved |
| 54 | reserved | reserved | reserved |
| 55 | reserved | reserved | reserved |
| 56 | reserved | reserved | reserved |
| 57 | reserved | reserved | reserved |
| 58 | reserved | reserved | reserved |
| 59 | reserved | reserved | reserved |
| 60 | reserved | reserved | reserved |
| 61 | reserved | reserved | reserved |
| 62 | reserved | reserved | reserved |
| 63 | reserved | reserved | reserved |

In the case of Table 45, dynamic signaling is available according to the number of DMRS symbols, and there is high MU-MIMO capacity while managing RS overhead efficiently. However, large number of bits is required for defining a DCI field, and there are many reserved regions.

In order to compensate the disadvantage, an eNB may configure the number of symbols to which a DMRS is mapped to a UE through high layer signaling. That is, according to the number of symbols to which a DMRS is mapped, different DCI fields may be defined and used.

For example, in the case that a configuration type of DMRS is type 1, the maximum number of symbols to which a DMRS is mapped may be set, but the number of symbols to which a DMRS is mapped is set for type 2, thereby a DCI field may be efficiently defined.

For type 2, when the maximum number of symbols is set to '2', 6 bits are required for defining a DCI field, but the number of reserved regions may increase.

In addition, different from type 1, up to total 6 ports may be supported in a single symbol, and type 2 has higher MU-MIMO capacity than type 1. Accordingly, like type 1, it may be efficient not to define a message for all number of symbols to which a DMRS is mapped in a single DCI field.

Table 46 below represents an example of a case that the number of symbols to which a DMRS is mapped is set to '1' (4 bits).

TABLE 46

| | message | | |
|---|---|---|---|
| value # | # of layers | antenna port(s) | # of symbols |
| 0 | 1 layer | P0 (w/PDSCH multiplexing) | 1 |
| 1 | 1 layer | P0 | 1 |
| 2 | 1 layer | P1 | 1 |
| 3 | 1 layer | P2 | 1 |
| 4 | 1 layer | P3 | 1 |
| 5 | 1 layer | P4 | 1 |
| 6 | 1 layer | P5 | 1 |
| 7 | 2 layer | P0/P1 | 1 |
| 8 | 2 layer | P2/P3 | 1 |
| 9 | 2 layer | P4/P5 | 1 |
| 10 | 3 layer | P0/P1/P2 | 1 |
| 11 | 3 layer | P3/P4/P5 | 1 |
| 12 | 4 layer | P0/P1/P2/P3 | 1 |
| 13 | 5 layer | P0/P1/P2/P3/P4 | 1 |
| 14 | 6 layer | P0/P1/P2/P3/P4/P5 | 1 |
| 15 | reserved | reserved | reserved |

In Table 46, in the case of 2 layer transmission in reserved regions, a message (e.g., P0/P3) for performing PDSCH multiplexing and 1 layer transmission (e.g., P3) of an antenna port occupying an RE like P0 may be added.

Table 47 below represents an example of a case that the number of symbols to which a DMRS is mapped is set to '2' (5 bits).

TABLE 47

| | message | | |
|---|---|---|---|
| value # | # of layers | antenna port(s) | # of symbols |
| 0 | 1 layer | P0 | 2 |
| 1 | 1 layer | P1 | 2 |
| 2 | 1 layer | P2 | 2 |
| 3 | 1 layer | P3 | 2 |
| 4 | 1 layer | P4 | 2 |
| 5 | 1 layer | P5 | 2 |
| 6 | 1 layer | P6 | 2 |
| 7 | 1 layer | P7 | 2 |
| 8 | 1 layer | P8 | 2 |
| 9 | 1 layer | P9 | 2 |
| 10 | 1 layer | P10 | 2 |
| 11 | 1 layer | P11 | 2 |
| 12 | 2 layer | P0/P1 | 2 |
| 13 | 2 layer | P2/P3 | 2 |
| 14 | 2 layer | P4/P5 | 2 |
| 15 | 2 layer | P6/P7 | 2 |
| 16 | 2 layer | P8/P9 | 2 |
| 17 | 2 layer | P10/P11 | 2 |
| 18 | 3 layer | P0/P1/P2 | 2 |
| 19 | 3 layer | P3/P4/P5 | 2 |
| 20 | 3 layer | P6/P7/P8 | 2 |
| 21 | 3 layer | P9/P10/P11 | 2 |
| 22 | 4 layer | P0/P1/P2/P3 | 2 |
| 23 | 4 layer | P4/P5/P6/P7 | 2 |
| 24 | 4 layer | P8/P9/P10/P11 | 2 |
| 25 | 5 layer | P0/P1/P2/P3/P4 | 2 |
| 26 | 6 layer | P0/P1/P2/P3/P4/P5 | 2 |
| 27 | 7 layer | P0/P1/P2/P3/P4/P5/P6 | 2 |
| 28 | 8 layer | P0/P1/P2/P3/P4/P5/P6/P7 | 2 |
| 29 | reserved | reserved | reserved |
| 30 | reserved | reserved | reserved |

TABLE 47-continued

| | message | | |
|---|---|---|---|
| value # | # of layers | antenna port(s) | # of symbols |
| 31 | reserved | reserved | reserved |

In Table 47, in the case of 1 layer and/or 2 layer transmission in reserved regions, a message (e.g., P0, P3, P0/P3) for performing PDSCH multiplexing may be added.

Table 48 below represents an example of a case that the maximum number of transmission layers is restricted to '2' in the SU aspect (3 bits).

TABLE 48

| | message | | | |
|---|---|---|---|---|
| value # | # of layers | antenna port(s) | # of symbols | scrambling ID |
| 0 | 1 layer | P0 | 1 | nSCID = 0 |
| 1 | 1 layer | P3 | 1 | nSCID = 0 |
| 2 | 2 layer | P0/P3 | 1 | nSCID = 0 |
| 3 | 1 layer | P0 | 1 | nSCID = 1 |
| 4 | 1 layer | P3 | 1 | nSCID = 1 |
| 5 | 2 layer | P0/P3 | 1 | nSCID = 1 |
| 6 | reserved | reserved | reserved | reserved |
| 7 | reserved | reserved | reserved | reserved |

In the case of Table 48, multiplexing of a PDSCH is performed, and accordingly, RS overhead may be reduced and the quasi-orthogonal port may be increased.

In the case that a DCI field is set according to Table 48, an RE occupied by a port except an allocated DMRS port may be multiplexed with a PDSCH.

Table 49 below represents an example of a case that the maximum number of transmission layers is restricted to '2' in the SU aspect (3 bits).

TABLE 49

| | message | | |
|---|---|---|---|
| value # | # of layers | antenna port(s) | # of symbols |
| 0 | 1 layer | P0 | 1 |
| 1 | 1 layer | P3 | 1 |
| 2 | 2 layer | P0/P3 | 1 |
| 3 | reserved | reserved | reserved |

In the case that a DCI field is defined according to Table 49, multiplexing of a PDSCH is performed, and RS overhead may be reduced and a DCI payload size may be reduced.

In addition, an RE occupied by a port except an allocated DMRS port may be multiplexed with a PDSCH.

Embodiment 26

In the case that the maximum number of symbols to which a DMRS is mapped is set to '2', one or less scrambling ID may be used, and the quasi-orthogonal port is not supported.

In the case that the maximum number of symbols to which a DMRS is mapped is set to '1', two or more scrambling ID may be used, and the scrambling ID may be joint-encoded with antenna port(s), the number of layers, and the like in the DMRS table.

In addition, a scrambling ID is selected dynamically through DCI signaling, and the quasi-orthogonal port may be supported.

An available combination of the scrambling IDs may be set to a UE through RRC signaling, and in the case that a combination including two or more scrambling IDs is set, either one scrambling ID of the two may be selected dynamically through DCI signaling.

Particularly, in the case that the maximum number of symbols to which a DMRS is mapped is set to '2', there may be a great number of orthogonal DMRS ports (e.g., 8 ports for type 1 and 12 ports for type 2), and accordingly, one scrambling ID may not be selected dynamically through DCI signaling.

This is because a size of DCI payload becomes greater for defining the DMRS table for an available combination using two or more scrambling IDs.

Accordingly, in the case that the maximum number of symbols to which a DMRS is mapped is set to '2', one or more scrambling ID may be used and scrambling ID is not selected dynamically through DCI signaling, and accordingly, a size of DCI payload may be decreased.

However, in the case that the maximum number of symbols to which a DMRS is mapped is set to '1', one or more scrambling ID may be used, and the scrambling ID may be joint-encoded with antenna port(s), the number of layers, and the like in the DMRS table.

In addition, a scrambling ID is selected dynamically through DCI signaling, and the quasi-orthogonal port may be supported.

This is because the number of ports supported substantially is small or may be used for the purpose of reducing RS overhead in the case that the maximum number of symbols to which a DMRS is mapped is set to '1', and in this case, the quasi-orthogonal port may be supported.

That is, in the case of being intended to use the quasi-orthogonal port for MU-MIMO and to reduce RS overhead simultaneously, the following embodiment may be used.

Such an embodiment may be applied to type 2 case as well as type 1 case.

Otherwise, the embodiment may also be applied to a specific type. For example, type 1 and type 2 have different maximum number of DMRS ports that may be supported by one DMRS symbol.

In the case of type 1, the number of supportable antenna ports is total 4 ports, which is smaller than 6 ports, that of type 2. Accordingly, this embodiment may be applied only to a type of which orthogonal port number is relatively small, and the quasi-orthogonal port may be supported.

Table 50 below represents an example of a case that a DMRS is mapped to two symbols in type 1 and one scrambling ID is used.

TABLE 50

| value # | # of layers | antenna port(s) | # of symbols |
|---|---|---|---|
| | | message | |
| 0 | 1 layer | P0 (w/PDSCH multiplexing) | 1 |
| 1 | 1 layer | P0 | 1 |
| 2 | 1 layer | P1 | 1 |
| 3 | 1 layer | P2 | 1 |
| 4 | 1 layer | P3 | 1 |
| 5 | 2 layer | P0/P1 | 1 |
| 6 | 2 layer | P2/P3 | 1 |
| 7 | 3 layer | P0/P1/P2 | 1 |
| 8 | 4 layer | P0/P1/P2/P3 | 1 |
| 9 | 1 layer | P0 | 2 |
| 10 | 1 layer | P1 | 2 |
| 11 | 1 layer | P2 | 2 |
| 12 | 1 layer | P3 | 2 |

TABLE 50-continued

| value # | # of layers | antenna port(s) | # of symbols |
|---|---|---|---|
| | | message | |
| 13 | 1 layer | P4 | 2 |
| 14 | 1 layer | P5 | 2 |
| 15 | 1 layer | P6 | 2 |
| 16 | 1 layer | P7 | 2 |
| 17 | 2 layer | P0/P1 | 2 |
| 18 | 2 layer | P2/P3 | 2 |
| 19 | 2 layer | P4/P5 | 2 |
| 20 | 2 layer | P6/P7 | 2 |
| 21 | 3 layer | P0/P1/P2 | 2 |
| 22 | 3 layer | P3/P4/P5 | 2 |
| 23 | 4 layer | P0/P1/P2/P3 | 2 |
| 24 | 4 layer | P4/P5/P6/P7 | 2 |
| 25 | 5 layer | P0/P1/P2/P3/P4 | 2 |
| 26 | 6 layer | P0/P1/P2/P3/P4/P5 | 2 |
| 27 | 7 layer | P0/P1/P2/P3/P4/P5/P6 | 2 |
| 28 | 8 layer | P0/P1/P2/P3/P4/P5/P6/P7 | 2 |
| 29 | reserved | reserved | reserved |
| 30 | reserved | reserved | reserved |
| 31 | reserved | reserved | reserved |

Table 51 below represents an example of a case that a DMRS is mapped to one symbol in type 1 and one of two scrambling IDs is dynamically used.

TABLE 51

| value # | # of layers | antenna port(s) | # of symbols | scrambling ID |
|---|---|---|---|---|
| | | message | | |
| 0 | 1 layer | P0 (w/PDSCH multiplexing) | 1 | 0 |
| 1 | 1 layer | P0 | 1 | 0 |
| 2 | 1 layer | P1 | 1 | 0 |
| 3 | 1 layer | P2 | 1 | 0 |
| 4 | 1 layer | P3 | 1 | 0 |
| 5 | 2 layer | P0/P1 | 1 | 0 |
| 6 | 2 layer | P2/P3 | 1 | 0 |
| 7 | 3 layer | P0/P1/P2 | 1 | 0 |
| 8 | 4 layer | P0/P1/P2/P3 | 1 | 0 |
| 9 | 1 layer | P0 | 1 | 1 |
| 10 | 1 layer | P1 | 1 | 1 |
| 11 | 1 layer | P2 | 1 | 1 |
| 12 | 1 layer | P3 | 1 | 1 |
| 13 | 2 layer | P0/P1 | 1 | 1 |
| 14 | 2 layer | P2/P3 | 1 | 1 |
| 15 | reserved | reserved | reserved | reserved |

Embodiment 27

Figure 24:
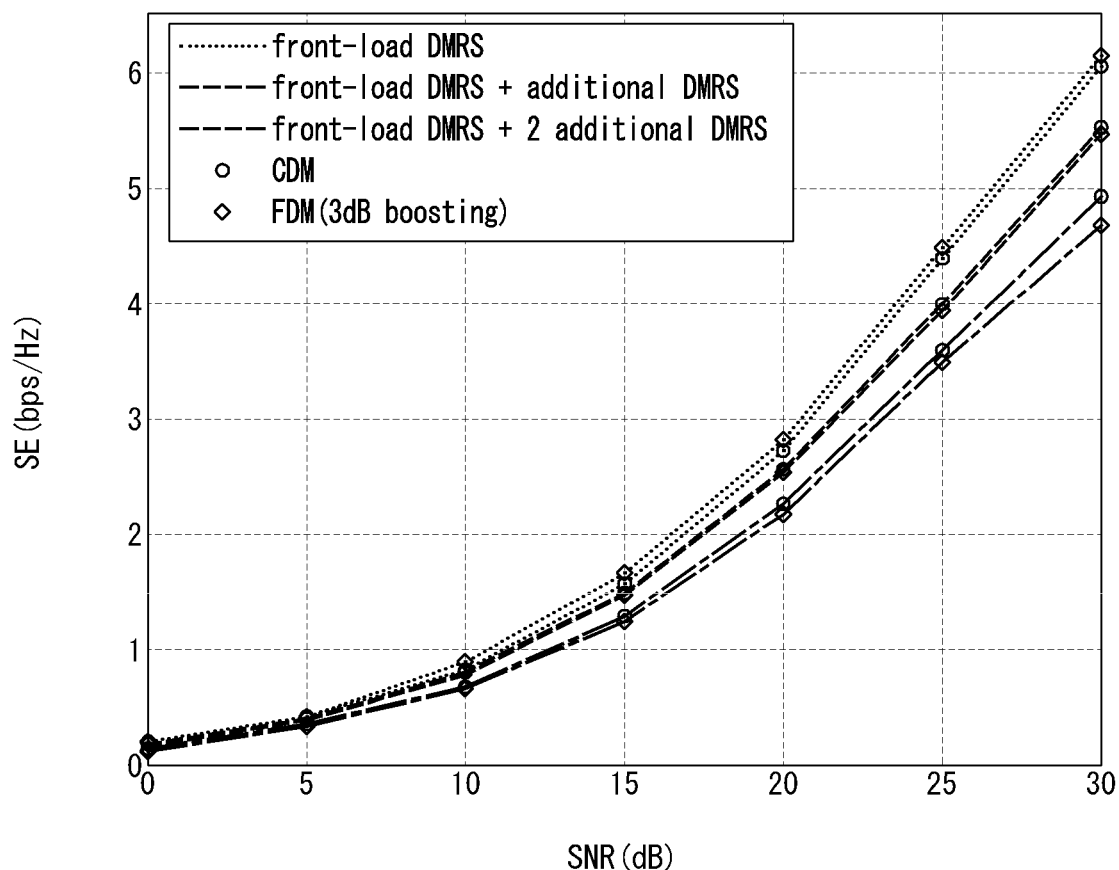
FIG. 24 is a diagram illustrating an example of a UE performance according to an additional DMRS which is proposed in the present invention.

FIG. 24 is a diagram illustrating an example of a UE performance according to an additional DMRS which is proposed in the present invention.

An eNB may setup the number of DMRSs (hereinafter, the number of additional DMRSs) additionally mapped to a UE through high layer signaling. In this case, the DMRS table used between the eNB and the UE may be determined with being associated with the number of symbols to which an additional DMRS is mapped which is setup through high layer signaling.

In embodiment 27, the DMRS table may be preconfigured between the eNB and the UE such that a specific DMRS table is used implicitly with being associated with the number of additional DMRSs setup through high layer signaling.

Alternatively, the eNB may setup explicitly to the UE such that a specific DMRS table among a plurality of DMRS tables may be used through high layer signaling.

Particularly, in the case that a great number of additional DMRSs are set to the UE as shown in FIG. 24, the case of a same number of DMRS ports has high RS overhead in comparison with the case that a small number of additional DMRSs are set.

Accordingly, in the case that a small number of additional DMRSs are set, port multiplexing is performed using the FDM. However, in the case that a great number of additional DMRSs are set, port multiplexing is performed using the CDM and RS overhead is reduced, which may has higher performance.

For example, in the case that a small number of additional DMRSs are set, the FDM is used for 2 layer transmission, and in the case that a great number of additional DMRSs are set, a definition for the CDM is added in the DMRS table or the FDM scheme may be replaced by the CDM scheme.

Such a method may also be applied to a slot in which the number of symbols that configure a slot is small.

In the case that the number of symbols that configure a slot is small, even in the case of the same RS RE number, RS overhead may be increased. Accordingly, in order to reduce RS overhead, multiplexing through the CDM method may be setup in the DMRS table such that multiplexing is performed through the CDM scheme.

Embodiment 28

In the case that a DMRS configuration type is type 1, when a DMRS is mapped to two symbols, a PDSCH is not multiplexed in the symbol in which the DMRS is mapped.

Particularly, in the case of type 1, the case that a DMRS having the same RS overhead which is the same as the case that a DMRS is mapped to one symbol is mapped to two symbols may have the same performance with the case that a DMRS is mapped to one symbol.

Accordingly, the case that a DMRS is mapped to two symbols may support more orthogonal DMRS ports or may be used for the purpose of providing further RS energy.

In this case, when it is configured that a DMRS is mapped to two symbols, a PDSCH is not multiplexed, but a DMRS RE may be power-boosted.

Embodiment 29

Figure 25:
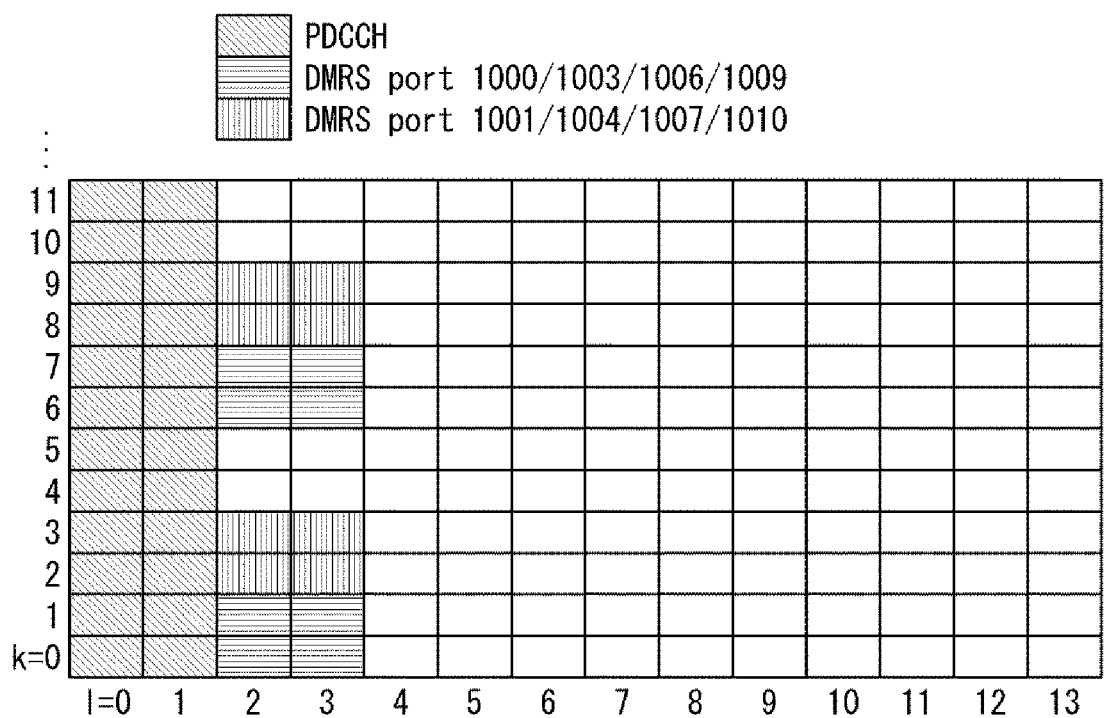
FIG. 25 is a diagram illustrating an example of antenna port mapping for a configuration type of a demodulated reference signal which is proposed in the present invention.

FIG. 25 is a diagram illustrating an example of antenna port mapping for a configuration type of a demodulated reference signal which is proposed in the present invention.

In the case that a DMRS configuration type is type 2, it is configured that a DMRS is mapped to two symbols, and in the case that the entire number of transmission layers is 8, a PDSCH may be multiplexed in a symbol same as the DMRS.

Particularly, for type 2, different from type 1, when a DMRS is mapped to two symbols, as shown in FIG. 25, the case of performing multiplexing with a PDSCH may occur.

In this case, a DMRS and a PDSCH may be multiplexed to reduce RS overhead.

Alternatively, even for type 2, it is configured that a DMRS is mapped to two symbols, and a PDSCH may not be multiplexed in the same symbol of the DMRS.

In this case, power boosting is available using greater power for a DMRS, and the channel estimation performance may be improved, and separate signaling may not be required for whether to RM in MU-MIMO.

As described above, one of the functions of the DCI is to forward scheduling information of downlink, uplink or sidelink to a UE. A plurality of DCI formats may be defined according to the information to be forwarded to a UE, and a DCI format may define a plurality of DCI fields for forwarding specific information. A definition scheme of the DCI field may be changed as described in embodiments 1 to 29.

Each of the DCI fields may carry different types of information and forward it to a UE.

A UE may receive and decode a DCI field defined in a DCI format of PDCCH, and may receive information in relation to an operation that the UE needs to perform like the scheduling information.

The UE performs an operation such as receiving data according to the received information.

As an example of a DCI field defined in a DCI format, a field of 3 bits or 4 bits may be existed, which include information of antenna port(s), scrambling identity and/or the number of layers, and so on, In such a DCI field, the maximum number of layers of 4 layers and 8 layers may be defined in 1 codeword and 2 codeword, respectively.

When the maximum number of layers to represent is decreased, a size of DCI payload may be decreased as much.

Regarding to this, the codebook subset restriction (CBSR) may be used. An eNB may restrict a range of RI, PMI, and the like that a UE needs to feedback to the eNB.

In the case that the CBSR is set to the UE, the number of layers that the UE is going to use may also be restricted according to the corresponding CBSR.

Accordingly, in relation to the CBSR configuration, a payload size of the DCI may be decreased by changing a definition scheme of a DCI field associated with the number of layers in a DCI format.

Embodiment 30

In a DCI format, a DCI field may be defined, which includes information of antenna port(s), the number of layers, and the like. At this time, a UE may identify the maximum value of the remaining RIs except the RI (e.g., it is assumed that the CSI (e.g., PMI, CQI) of a rank corresponding to the RI in which the CBSR is indicated for the purpose of rank restriction is not fed back) indicated with the CBSR as the maximum rank number considered in CSI feedback and/or the maximum rank number that an eNB may setup to the UE.

In this case, a DCI field may be defined only for the layer of the maximum rank value (i.e., the maximum value among the remaining RIs) or less. In addition, the definition of a DCI field is preconfigured between an eNB and a UE, and the UE may obtain information of the antenna port(s), the number of layers, and/or the number of symbols, that are configured, by receiving a DCI field transmitted through a control channel.

UE operation in relation to a reception of a DCI field: A UE receives a DCI field transmitted through the control channel, and obtains the antenna port(s), the number of layers, and the like. The UE receives a data signal and a DMRS using the information. For example, the UE may obtain the information (e.g., antenna port index, position of RS RE, etc.) in relation to a DMRS mapping pattern through the information, and using this, may estimate a channel value required for channel compensation. Later, the UE may compensate a channel for the received data signal using the estimated channel value, and detect a transmission data by performing demodulation and decoding processes for the signal after the compensation. Such an operation of the UE may be applied identically although there is no separate description.

Additionally, when the timing when the corresponding CBSR configuration is received is referred to #n, the timing when a size adjustment of a DCI payload due to the CBSR may be configured as #n+k1.

In this case, k1 value may be configured/indicated by an eNB, or a specific value may be fixedly used.

Table 52 below represents an example of the case that the CBSR is not configured.

TABLE 52

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, nSCID = 0 (OCC = 2) | 0 | 2 layer, port 7-8, nSCID = 0 (OCC = 2) |
| 1 | 1 layer, port 7, nSCID = 1 (OCC = 2) | 1 | 2 layer, port 7-8, nSCID = 1 (OCC = 2) |
| 2 | 1 layer, port 8, nSCID = 0 (OCC = 2) | 2 | 2 layer, port 7-8, nSCID = 0 (OCC = 4) |
| 3 | 1 layer, port 8, nSCID = 1 (OCC = 2) | 3 | 2 layer, port 7-8, nSCID = 1 (OCC = 4) |
| 4 | 1 layer, port 7, nSCID = 0 (OCC = 4) | 4 | 2 layer, port 11,13, nSCID = 0 (OCC = 4) |
| 5 | 1 layer, port 7, nSCID = 1 (OCC = 4) | 5 | 2 layer, port 11,13, nSCID = 1 (OCC = 4) |
| 6 | 1 layer, port 8, nSCID = 0 (OCC = 4) | 6 | 3 layer, port 7-9 |
| 7 | 1 layer, port 8, nSCID = 1 (OCC = 4) | 7 | 4 layer, port 7-10 |
| 8 | 1 layer, port 11, nSCID = 0 (OCC = 4) | 8 | 5 layer, port 7-11 |
| 9 | 1 layer, port 11, nSCID = 1 (OCC = 4) | 9 | 6 layer, port 7-12 |
| 10 | 1 layer, port 13, nSCID = 0 (OCC = 4) | 10 | 7 layers, ports 7-13 |
| 11 | 1 layer, port 13, nSCID = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Table 53 below represents an example of the case that the maximum value of the remaining RIs except the RI indicated through the CBSR is 2.

TABLE 53

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, nSCID = 0 (OCC = 2) | 0 | 2 layer, port 7-8, nSCID = 0 (OCC = 2) |
| 1 | 1 layer, port 7, nSCID = 1 (OCC = 2) | 1 | 2 layer, port 7-8, nSCID = 1 (OCC = 2) |
| 2 | 1 layer, port 8, nSCID = 0 (OCC = 2) | 2 | 2 layer, port 7-8, nSCID = 0 (OCC = 4) |
| 3 | 1 layer, port 8, nSCID = 1 (OCC = 2) | 3 | 2 layer, port 7-8, nSCID = 1 (OCC = 4) |
| 4 | 1 layer, port 7, nSCID = 0 (OCC = 4) | 4 | 2 layer, port 11,13, nSCID = 0 (OCC = 4) |
| 5 | 1 layer, port 7, nSCID = 1 (OCC = 4) | 5 | 2 layer, port 11,13, nSCID = 1 (OCC = 4) |
| 6 | 1 layer, port 8, nSCID = 0 (OCC = 4) | | |
| 7 | 1 layer, port 8, nSCID = 1 (OCC = 4) | | |
| 8 | 1 layer, port 11, nSCID = 0 (OCC = 4) | | |
| 9 | 1 layer, port 11, nSCID = 1 (OCC = 4) | | |
| 10 | 1 layer, port 13, nSCID = 0 (OCC = 4) | | |
| 11 | 1 layer, port 13, nSCID = 1 (OCC = 4) | | |
| 12 | 2 layers, ports 7-8 | | |

Embodiment 31

In a DCI format, a DCI field may be defined, which includes information of antenna port(s), the number of layers, and the like. At this time, a UE may transmit CSI feedback based on the rank number corresponding to the remaining RIs except the RI (e.g., it is assumed that the CSI (e.g., PMI, CQI) of a rank corresponding to the RI in which the CBSR is indicated for the purpose of rank restriction is not fed back) indicated with the CBSR.

Alternatively, the UE may identify the remaining RI as the rank number that an eNB may setup to the UE, and a DCI field may be defined only for the layer corresponding to the corresponding rank value (i.e., the remaining RI value which is not indicated by the CBSR).

In addition, a DCI field definition is preconfigured between an eNB and a UE, and the UE may obtain information of the antenna port(s), the number of layers, and the like, that are configured, by receiving a DCI field transmitted through a control channel.

Table 54 below represents an example of the case that the RI indicated by the CBSR is 1, 3, 5, 6, 7 and 8.

TABLE 54

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 2 layers, ports 7-8 | 0 | 2 layer, port 7-8, nSCID = 0 (OCC = 2) |
| 1 | 4 layers, ports 7-10 | 1 | 2 layer, port 7-8, nSCID = 1 (OCC = 2) |
| | | 2 | 2 layer, port 7-8, nSCID = 0 (OCC = 4) |
| | | 3 | 2 layer, port 7-8, nSCID = 1 (OCC = 4) |
| | | 4 | 2 layer, port 11,13, nSCID = 0 (OCC = 4) |
| | | 5 | 2 layer, port 11,13, nSCID = 1 (OCC = 4) |
| | | 6 | 4 layer, port 7-10 |

In addition, when the timing when the corresponding CBSR configuration is received is referred to #n, the timing when a size adjustment of DCI payload due to the CBSR may be configured as #n+k2.

In this case, k2 value may be configured/indicated by an eNB, or a specific value may be fixedly used.

Embodiment 32

In a DCI format, a DCI field may be defined, which includes information of antenna port(s), the number of layers, and the like. At this time, a DCI field may be defined only for the RI value or less that a UE feedbacks to an eNB.

In addition, a DCI field definition is preconfigured between an eNB and a UE, and the UE may obtain information of the antenna port(s), the number of layers, and the like, that are configured, by receiving a DCI field transmitted through a control channel.

Particularly, the UE may calculate CQI, RI, PMI, and the like of the UE using CSI-RS transmitted by the eNB, and may feedback the CQI, the RI, the PMI, calculated by the UE itself to the eNB.

The eNB may select MCS, the number of layers, precoding matrix, and so on based on the feedback value from the UE, and the number of layers that the UE is going to set to the UE may be selected as the RI value or less that the UE feedbacks.

That is, a value of the number of layers that the UE is going to set to the UE may be determined as the RI value or less that the UE feedbacks, and a value of the number of layers that should be defined in a DCI field is setup in relation to the RI value that the UE feedbacks, and accordingly, a payload size of DCI may be reduced.

In addition, when the timing when the corresponding CBSR configuration is received is referred to #n, the timing when a size adjustment of DCI payload is reflected may be configured as #n+k3.

In this case, k3 value may be configured/indicated by an eNB, or a specific value may be fixedly used.

When the timing (e.g., the timing when a UE receives ACK signal in response to the corresponding data) when it is notified to a UE whether an eNB detects an RI feedback signal is referred to #n', the timing when a size adjustment is reflected may be configured/indicated as #n'+k3'.

In this case, k3' value may be configured/indicated by an eNB, or a specific value may be fixedly used.

In the case that such a method is used, due to the eNB' misdetection of the corresponding feedback signal, it may be prevented that information of a DCI field assumed by the eNB and the UE becomes changed since the RI value detected by the eNB and the RI value that the UE feedbacks are different.

The eNB may setup a specific number of layers to the UE based on the detection result of the RI feedback signal transmitted from the UE.

For example, in the case that the RI value that the UE feedbacks is 2, and the eNB succeeds in detection of the feedback signal and identifies the RI value that the UE feedbacks is 2, the eNB may set the corresponding value, 2 (or one of the RI value or less that the UE feedbacks) to the UE through high layer signaling.

In addition, the timing when the corresponding value is set is referred to #n", the timing when an adjustment of payload size is reflected may be configured/indicated as #n"+k3".

In this case, k3" value may be configured/indicated by an eNB, or a specific value may be fixedly used.

As such, an eNB setup a specific value to a UE directly, due to the eNB' misdetection of the corresponding feedback signal, it may be prevented that information of a DCI field assumed by the eNB and the UE becomes changed since the RI value detected by the eNB and the RI value that the UE feedbacks are different.

The method in relation to the timing when an adjustment of DCI payload size is reflected may be identically applied in relation to the method of using CSI feedback information of a UE.

Table 55 below represents an example of the case that the RI value that a UE feedbacks to an eNB is '1'.

TABLE 55

| | One Codeword:<br>Codeword 0 enabled,<br>Codeword 1 disabled |
|---|---|
| Value | Message |
| 0 | 1 layer, port 7, nSCID = 0 (OCC = 2) |
| 1 | 1 layer, port 7, nSCID = 1 (OCC = 2) |
| 2 | 1 layer, port 8, nSCID = 0 (OCC = 2) |
| 3 | 1 layer, port 8, nSCID = 1 (OCC = 2) |
| 4 | 1 layer, port 7, nSCID = 0 (OCC = 4) |
| 5 | 1 layer, port 7, nSCID = 1 (OCC = 4) |
| 6 | 1 layer, port 8, nSCID = 0 (OCC = 4) |
| 7 | 1 layer, port 8, nSCID = 1 (OCC = 4) |
| 8 | 1 layer, port 11, nSCID = 0 (OCC = 4) |
| 9 | 1 layer, port 11, nSCID = 1 (OCC = 4) |
| 10 | 1 layer, port 13, nSCID = 0 (OCC = 4) |
| 11 | 1 layer, port 13, nSCID = 1 (OCC = 4) |

In Embodiment 32, the case is assumed that there is one CSI that the UE feedbacks to the eNB, but embodiment 32 may also be applied to the case that a plurality of reporting settings is set in a single UE, and feedback is performed for a plurality of CSIs.

Embodiment 33

Figure 26:
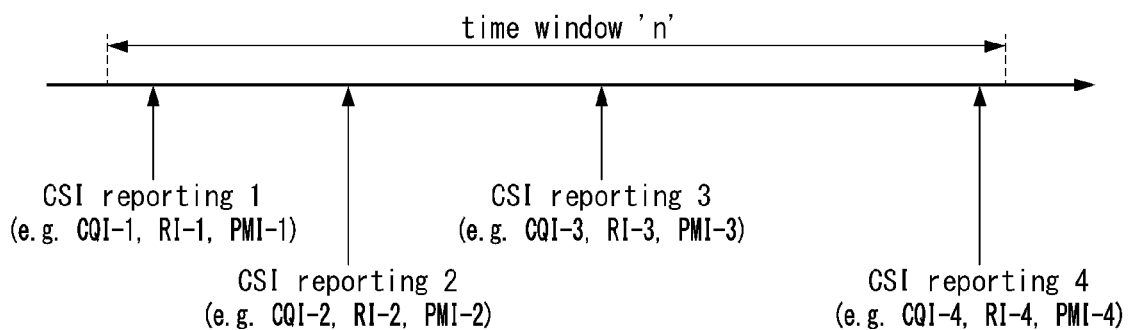
FIG. 26 is a diagram illustrating an example of a method of configuring a DCI field according to a Rank Indicator which is proposed in the present invention.

FIG. 26 is a diagram illustrating an example of a method of configuring a DCI field according to a Rank Indicator which is proposed in the present invention.

In a DCI format, a DCI field may be defined, which includes information of antenna port(s), the number of layers, and the like. At this time, a DCI field may be defined only for the layer of the maximum RI value or less among the RIs fed back to and eNB within time window 'n'.

In addition, 'n' value may be set to a UE through high layer signaling of an eNB, or may be a fixed value preconfigured between an eNB and a UE. In addition, a DCI field definition is preconfigured between an eNB and a UE, and the UE may obtain information of the antenna port(s), the number of layers, and the like, that are configured, by receiving a DCI field transmitted through a control channel.

For example, in the case that RI-1/2/3/4 correspond to 1, 2, 1, 1, respectively, in FIG. 26, the maximum RI value in time window 'n' is '2' which is RI-2 value.

In this case, a DCI field is as represented in Table 56 below.

TABLE 56

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, nSCID = 0 (OCC = 2) | 0 | 2 layer, port 7-8, nSCID = 0 (OCC = 2) |
| 1 | 1 layer, port 7, nSCID = 1 (OCC = 2) | 1 | 2 layer, port 7-8, nSCID = 1 (OCC = 2) |
| 2 | 1 layer, port 8, nSCID = 0 (OCC = 2) | 2 | 2 layer, port 7-8, nSCID = 0 (OCC = 4) |
| 3 | 1 layer, port 8, nSCID = 1 (OCC = 2) | 3 | 2 layer, port 7-8, nSCID = 1 (OCC = 4) |
| 4 | 1 layer, port 7, nSCID = 0 (OCC = 4) | 4 | 2 layer, port 11,13, nSCID = 0 (OCC = 4) |
| 5 | 1 layer, port 7, nSCID = 1 (OCC = 4) | 5 | 2 layer, port 11,13, nSCID = 1 (OCC = 4) |
| 6 | 1 layer, port 8, nSCID = 0 (OCC = 4) | | |
| 7 | 1 layer, port 8, nSCID = 1 (OCC = 4) | | |
| 8 | 1 layer, port 11, nSCID = 0 (OCC = 4) | | |
| 9 | 1 layer, port 11, nSCID = 1 (OCC = 4) | | |
| 10 | 1 layer, port 13, nSCID = 0 (OCC = 4) | | |
| 11 | 1 layer, port 13, nSCID = 1 (OCC = 4) | | |
| 12 | 2 layers, ports 7-8 | | |

Embodiment 34

In a DCI format, a DCI field may be defined, which includes information of antenna port(s), the number of layers, and the like. At this time, a DCI field may be defined only for the layer of the RI value or less which is the most recently fed back.

A DCI field definition is preconfigured between an eNB and a UE, and the UE may obtain information of the antenna port(s), the number of layers, and the like, that are configured, by receiving a DCI field transmitted through a control channel.

For example, in the case that RI-1/2/3/4 correspond to 1, 2, 1, 1, respectively, in FIG. 26, the RI value which is the most recently fed back is '1' which is RI-4 value. In this case, a DCI field is as represented in Table 57 below.

TABLE 57

| One Codeword: Codeword 0 enabled, Codeword 1 disabled | |
|---|---|
| Value | Message |
| 0 | 1 layer, port 7, nSCID = 0 (OCC = 2) |
| 1 | 1 layer, port 7, nSCID = 1 (OCC = 2) |
| 2 | 1 layer, port 8, nSCID = 0 (OCC = 2) |
| 3 | 1 layer, port 8, nSCID = 1 (OCC = 2) |

TABLE 57-continued

| One Codeword: Codeword 0 enabled, Codeword 1 disabled | |
|---|---|
| Value | Message |
| 4 | 1 layer, port 7, nSCID = 0 (OCC = 4) |
| 5 | 1 layer, port 7, nSCID = 1 (OCC = 4) |
| 6 | 1 layer, port 8, nSCID = 0 (OCC = 4) |
| 7 | 1 layer, port 8, nSCID = 1 (OCC = 4) |
| 8 | 1 layer, port 11, nSCID = 0 (OCC = 4) |
| 9 | 1 layer, port 11, nSCID = 1 (OCC = 4) |
| 10 | 1 layer, port 13, nSCID = 0 (OCC = 4) |
| 11 | 1 layer, port 13, nSCID = 1 (OCC = 4) |

When at least one of embodiments 32 to 34 is applied, as a specific default operation, it may be defined/configured that state(s) of the corresponding DCI field for layer 1 is not deleted but existed always.

In this case, the operations described in embodiments 32 to 34 may be restricted that a DCI payload size may be reduced according to a specific condition only for the case of layer 2 or more.

Using such a method, an eNB may perform scheduling according to a minimum layer transmission in any situation, and accordingly, a stable scheduling option such as a sort of fallback scheduling may be maintained.

The DCI table values described in embodiments 32 to 34 are just examples, but the method for reducing a payload size of DCI described in the present invention may also be applied to a new table entry of a DCI field defined for an indication such as antenna port(s), the number of layers, and so on.

Signaling to Indicate Antenna Ports for Blind Detection of Paired DMRS Ports

In order to control interference on a reception signal, a UE may perform a blind detection (BD) for other DMRS port paired with MU-MIMO for a port except a DMRS port set to the corresponding UE.

In the case of the UE that detects other DMRS port paired with MU-MIMO through a BD, an interference signal of the corresponding DMRS port is reflected in a channel compensation step for the reception signal, and accordingly, a detection performance of the reception signal may be increased.

The BD may improve the detection performance of the reception signal, but UE complexity may increase since the detection needs to be performed for all DMRS ports.

Accordingly, in order to alleviate the UE complexity increase, an eNB may inform the information of the DMRS port in relation to the BD to the UE.

Embodiment 35

An eNB may setup whether to apply MU-MIMO for a DMRS port that uses at least one of different TD-OCC code, FD-OCC or FDM to a UE through high layer signaling.

For the TD-OCC, degradation may occur in a channel estimation performance in high frequency band owing to an influence of phase noise. In this case, the eNB may not schedule MU-MIMO that uses a DMRS port using the TD-OCC as represented in Table 58 below.

Such a method has low possibility of being changed dynamically, and an eNB transmits the corresponding information to the UE through high layer signaling. Accordingly, the number of DMRS ports that the UE should perform the BD, and UE complexity may be reduced.

TABLE 58

| Antenna port | | | $w_t(l') = [w_t(0)\ w_t(1)]$ | |
|---|---|---|---|---|
| p | Δ | $\varphi_k$ | One symbol | Two symbol |
| 1000 | 0 | 0 | [+1] | [+1 +1] |
| 1001 | 1 | 0 | [+1] | [+1 +1] |
| 1002 | 0 | π(k mod 2) | [+1] | [+1 +1] |
| 1003 | 1 | π(k mod 2) | [+1] | [+1 +1] |
| 1004 | 0 | 0 | — | [+1 −1] |
| 1005 | 1 | 0 | — | [+1 −1] |
| 1006 | 0 | π(k mod 2) | — | [+1 −1] |
| 1007 | 1 | π(k mod 2) | — | [+1 −1] |

In the state that a UE is setup with antenna port 1000, in the case that the fact that an eNB does not schedule MIMO using the DMRS ports using the TD-OCC is set to the UE, the antenna ports that the UE should perform the BD may be decreased from the existing 1001/1002/1003/ . . . /1007 to 1001/1002/1003.

That is, in the case that the MU-MIMO possibility for a DMRS port that uses at least one of different TD-OCC code, FD-OCC or FDM is set to the UE through high layer signaling, the UE may expect that all of the DMRS ports configured to the UE itself are set to the same TD OCC, that is, [1 1] (or [1−1]). In the case that MU-MIMO scheduling is performed, it may be expected that all of other ports of another UE, as well as its own DMRS port, may be set to the same TD OCC, that is, [1 1] (or [1−1]).

Accordingly, when the UE perform the BD for ports of other UE, the UE may perform BD for only the port using the same TD OCC with the TD OCC of the port configured to the UE itself.

In addition, an explicit signaling method using high layer signaling is assumed in embodiment 35, but the operation of embodiment 35 may be performed based on a promise preconfigured between the eNB and the UE without direct signaling.

For example, the case that degradation of the channel estimation performance becomes greater owing to the TD-DCC is the case that an influence of phase noise is strong.

In relation to this, in the case of a PTRS which is a reference signal for phase estimation, it may set to the UE whether a PTRS is transmitted through high layer signaling.

That is, for the UE that is influenced by phase noise significantly, the eNB may set to the UE such that a PTRS is transmitted. Accordingly, in relation to whether to transmit a PTRS, the eNB may setup a possibility of whether to apply MU-MIMO to the UE using DMRS ports that perform multiplexing with the TD-OCC implicitly.

For example, in the case that it is configured that a PTRS transmission is performed to the UE through high layer signaling, the corresponding UE may promise with the eNB such that other UE using a DMRS port multiplexed with the TD-OCC is not MU pairing.

Accordingly, the BD may be performed only for the port that uses the same TD-OCC code as the DMRS port set to the UE itself.

On the other hand, in the case that it is configured that a PTRS transmission is not performed to the UE through high layer signaling, the corresponding UE may not expect that other UE using a DMRS port multiplexed with the TD-OCC is not MU pairing.

Accordingly, the BD may be performed for the ports that use different TD-OCC code as well as the ports that use the same TD-OCC code as the DMRS port set to the UE itself.

In addition, in the case of the UE of high MCS (and/or large BW), the performance degradation of a transmission signal detection may be greater owing to an error of a channel estimation value. Accordingly, the method described above may be applied only for the case of a specific MCS or more (and/or a specific BW or more) together with whether to transmit a PTRS.

For example, in the case that it is set to a UE that a PTRS is transmitted by high layer signaling and MCS set to a specific UE is k or more and/or configured scheduled BW is b or more, the UE may assume that other UE is not MU paring using the DMRS port in which multiplexing is performed with the TD-OCC.

In this case, the BD may be performed only for the port that uses the same TD-OCC code as the DMRS port set to the UE.

In embodiment 35, each of k and b may be preconfigured with a fixed value between an eNB and a UE, or set to a UE through high layer signaling.

Figure 27:
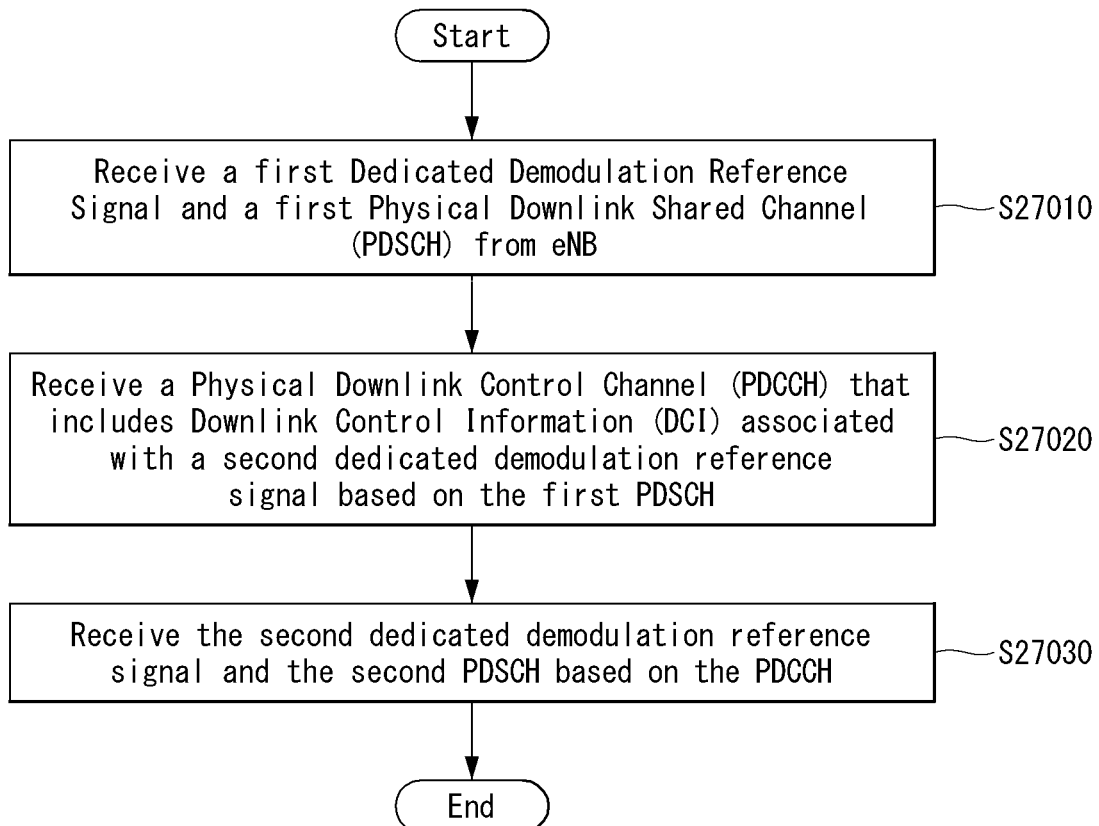
FIG. 27 is a diagram illustrating a method for receiving a demodulated reference signal based on configuration information of the demodulated reference signal which is proposed in the present invention.

FIG. 27 is a diagram illustrating a method for receiving a demodulated reference signal based on configuration information of the demodulated reference signal which is proposed in the present invention.

Referring to FIG. 27, a UE may detect data received through a reference signal transmitted from an eNB by modulating and demodulating it.

Particularly, the UE may receive a first Dedicated Demodulation Reference Signal (DMRS) and a first Physical Downlink Shared Channel (PDSCH) (step, S27010).

The first DMRS may mean a DMRS transmitted before the information in relation to mapping of a DMRS from the eNB in a specific transmission environment as described in embodiment 21.

The first DMRS may be configured according to configuration type 1 in a specific DMRS port as the method described in embodiment 21, and the antenna port in which the first DMRS is transmitted may not be associated with all remaining orthogonal antenna ports.

That is, the first DMRS may be transmitted only on a particular antenna port which is not multiplexed with other antenna ports.

The first PDSCH may include information for receiving a PDCCH, which is control information that the UE receives from the eNB.

Later, the UE may modulate and demodulate the first PDSCH based on the first DMRS.

Then, the UE may receive a Physical Downlink Control Channel (PDCCH) that includes Downlink Control Information (DCI) associated with a second Dedicated demodulation reference signal (DMRS) based on the first PDSCH (step, S27020).

At this time, the DCI may be configured through the method described in embodiment 1 to embodiment 35.

For example, the maximum number of symbols to which the second DMRS is mapped may set to the UE through high layer signaling, and the DCI may be configured according to the maximum number of symbols to which the second DMRS is mapped.

Later, the UE may receive the second DMRS and the second PDSCH based on the PDCCH (step, S27030).

Using such a method, the UE may receive a DMRS from the eNB, and may detect data by modulating and demodulating it.

General Device to which Present Invention May be Applied

Figure 28:
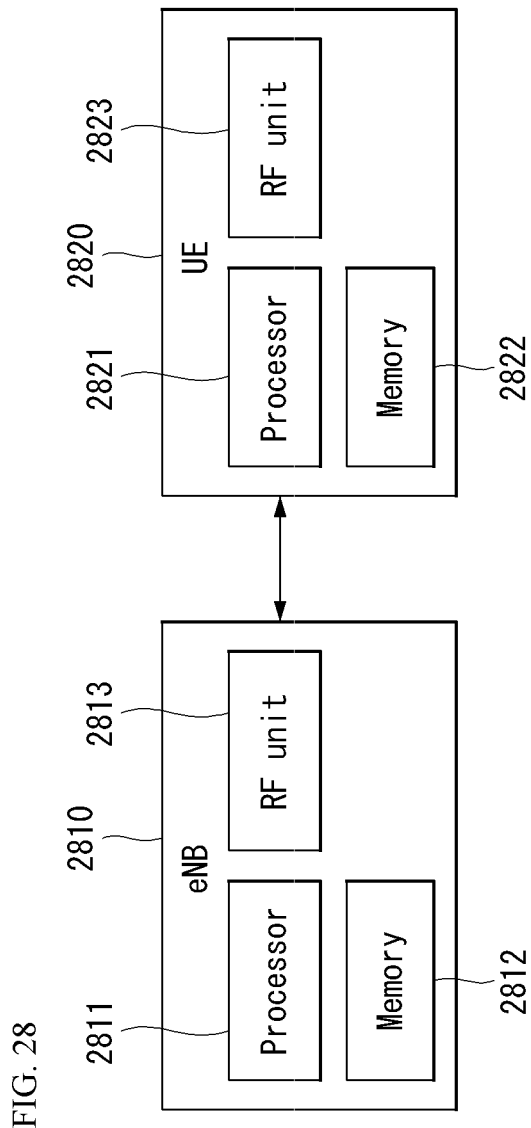
FIG. 28 is a block diagram of a wireless communication device according to an embodiment of the present invention.

FIG. 28 is a block diagram of a wireless communication device according to an embodiment of the present invention.

Referring to FIG. 28, a wireless communication system includes a base station (BS) (or eNB) 2810 and a plurality of terminals (or UEs) 2820 located within coverage of the eNB 2810.

Each of the eNB and the UE may also be represented as a wireless device.

The eNB 2810 includes a processor 2811, a memory 2812, and a radio frequency (RF) unit 2813. The processor 2811 implements functions, processes and/or methods proposed in FIGS. 1 to 12. Layers of radio interface protocols may be implemented by the processor 2811. The memory 2812 may be connected to the processor 2811 to store various types of information for driving the processor 2811. The RF unit 2813 may be connected to the processor 2811 to transmit and/or receive a wireless signal.

The UE 2820 includes a processor 2821, a memory 2822, and a radio frequency (RF) unit 2823.

The processor 2821 implements functions, processes and/or methods proposed in FIGS. 1 to 12. Layers of radio interface protocols may be implemented by the processor 2821. The memory 2822 may be connected to the processor 2821 to store various types of information for driving the processor 2821. The RF unit 2823 may be connected to the processor 2821 to transmit and/or receive a wireless signal.

The memory 2812 or 2822 may be present within or outside of the processor 2811 or 2821 and may be connected to the processor 2811 or 2821 through various well known units.

Also, the eNB 2810 and/or the UE 2820 may have a single antenna or multiple antennas.

Figure 29:
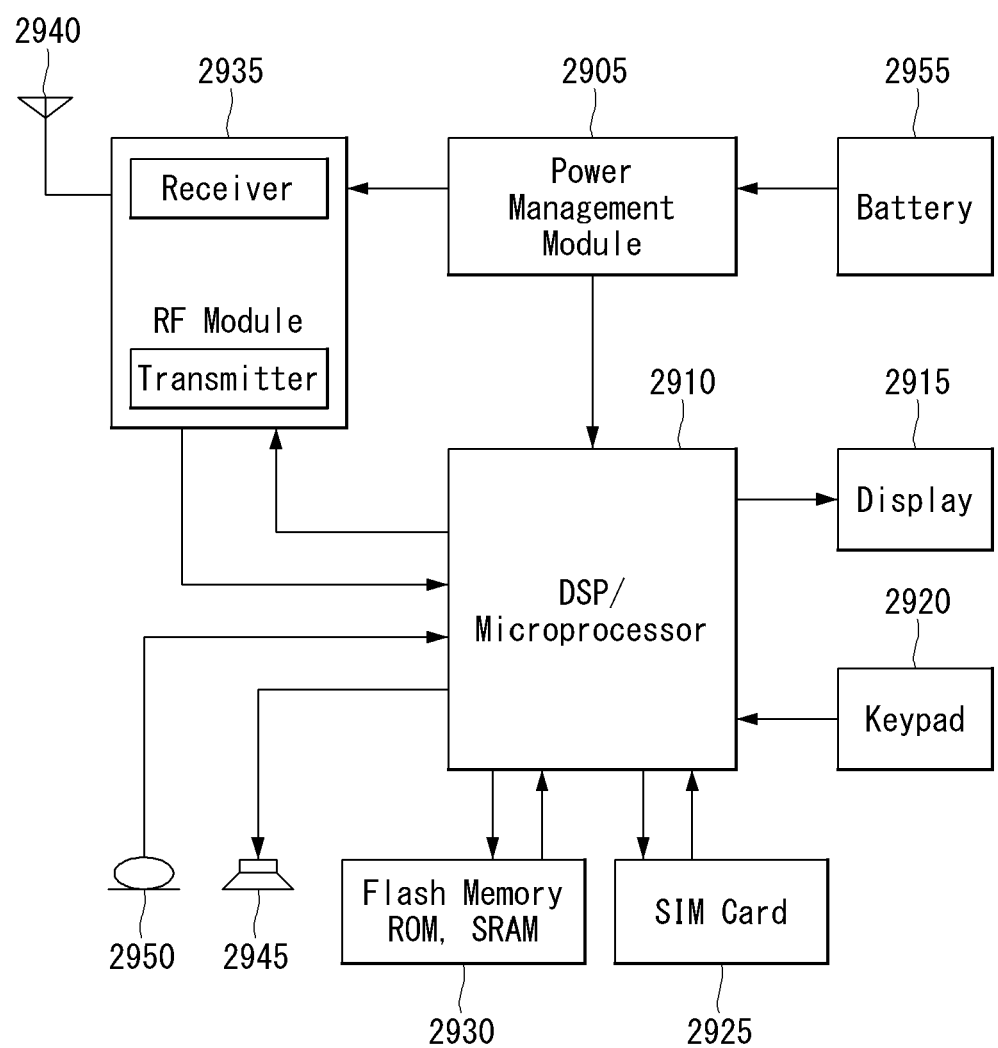
FIG. 29 illustrates a block diagram of a communication apparatus according to an embodiment of the present invention.

FIG. 29 illustrates a block diagram of a communication apparatus according to an embodiment of the present invention.

Particularly, in FIG. 29, the UE described above FIG. 28 will be exemplified in more detail.

Referring to FIG. 29, the UE includes a processor (or digital signal processor; DSP) 2910, an RF module (RF unit) 2935, a power management module 2905, an antenna 2940, a battery 2955, a display 2915, a keypad 2920, a memory 2930, a Subscriber Identification Module (SIM) card 2925 (which may be optional), a speaker 2945 and a microphone 2950. The UE may include a single antenna or multiple antennas.

The processor 2910 may be configured to implement the functions, procedures and/or methods proposed by the present invention as described in FIG. 17 to FIG. 26. Layers of a wireless interface protocol may be implemented by the processor 2910.

The memory 2930 is connected to the processor 2910 and stores information related to operations of the processor 2910. The memory 2930 may be located inside or outside the processor and may be connected to the processors through various well-known means.

A user enters instructional information, such as a telephone number, for example, by pushing the buttons of a keypad 2920 or by voice activation using the microphone 2950. The processor receives and processes the instructional information to perform the appropriate function, such as to dial the telephone number. Operational data may be retrieved from the SIM card 2925 or the memory 2930 to perform the function. Furthermore, the processor may display the instructional and operational information on the display 2915 for the user's reference and convenience.

The RF module 2935 is connected to the processor, transmits and/or receives an RF signal. The processor forwards instructional information to the RF module, to initiate communication, for example, transmits radio signals comprising voice communication data. The RF module includes a receiver and a transmitter to receive and transmit radio signals. An antenna 2940 facilitates the transmission and reception of radio signals. Upon receiving radio signals, the RF module may forward and convert the signals to baseband frequency for processing by the processor. The processed signals may be transformed into audible or readable information outputted via the speaker 2945.

Figure 30:
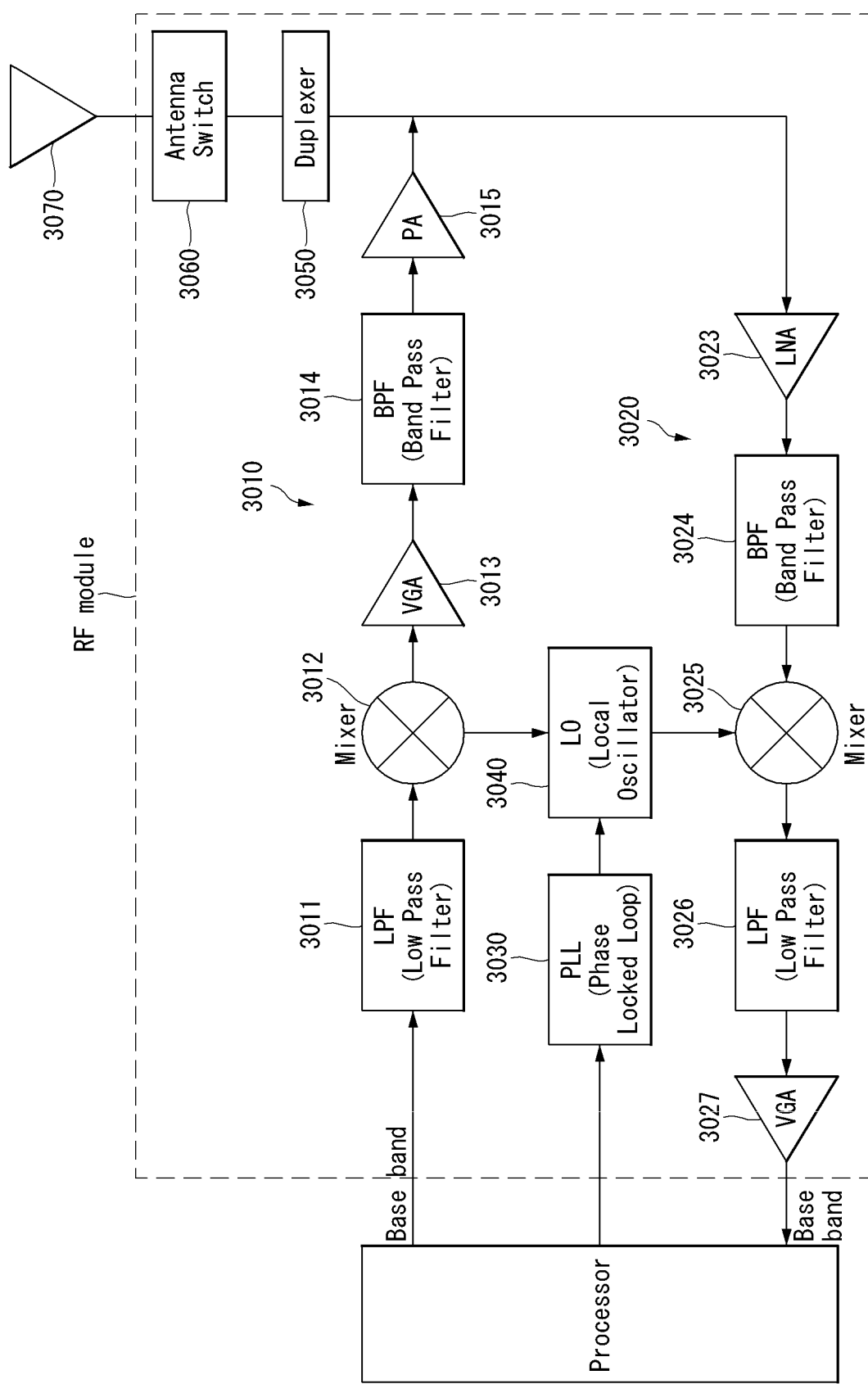
FIG. 30 is a diagram illustrating an example of an RF module of a wireless communication apparatus to which the method proposed in the present disclosure may be applied.

FIG. 30 is a diagram illustrating an example of an RF module of a wireless communication apparatus to which the method proposed in the present disclosure may be applied.

Particularly, FIG. 30 shows an example of an RF module that may be implemented in Frequency Division Duplex (FDD) system.

First, in a transmit path, the processor described in FIG. 28 and FIG. 29 processes data to be transmitted and provides an analog output signal to transmitter 3010.

Within the transmitter 3010, the analog output signal is filtered by a low pass filter (LPF) 3011 to remove undesired images caused by prior digital-to-analog conversion (ADC), upconverted from baseband to RF by an upconverter (Mixer) 3012, and amplified by a variable gain amplifier (VGA) 3013. The amplified signal is filtered by a filter 3014, further amplified by a power amplifier (PA) 3015, routed through duplexer(s) 3050/antenna switch(s) 3060, and transmitted via an antenna 3070.

In addition, in the receive path, an antenna 3070 receives signals from exterior and provides the received signals, which is routed through antenna switch(s) 3060/duplexer(s) 3050 and provided to the receiver 3020.

Within the receiver 3020, the received signal is amplified by a low noise amplifier (LNA) 3023, filtered by a band pass filter 3024, and downconverted from RF to baseband by a downconverter (Mixer) 3025.

The downconverted signal is filtered by a low pass filter (LPF) 3026, and amplified by a VGA 3027 to obtain an analog input signal, which is provided to the processor described in FIG. 12 and FIG. 13.

Further, a local oscillator (LO) generator 3040 generates and provides transmission and reception LO signals to upconverter 3012 and downconverter 3025, respectively.

In addition, a phase locked loop (PLL) 3030 may receive control information from the processor and provide control signals to LO generator 3040 to generate the transmission and reception LO signals at the proper frequencies.

The circuits shown in FIG. 30 may be arranged differently from the configuration shown in FIG. 30.

Figure 31:
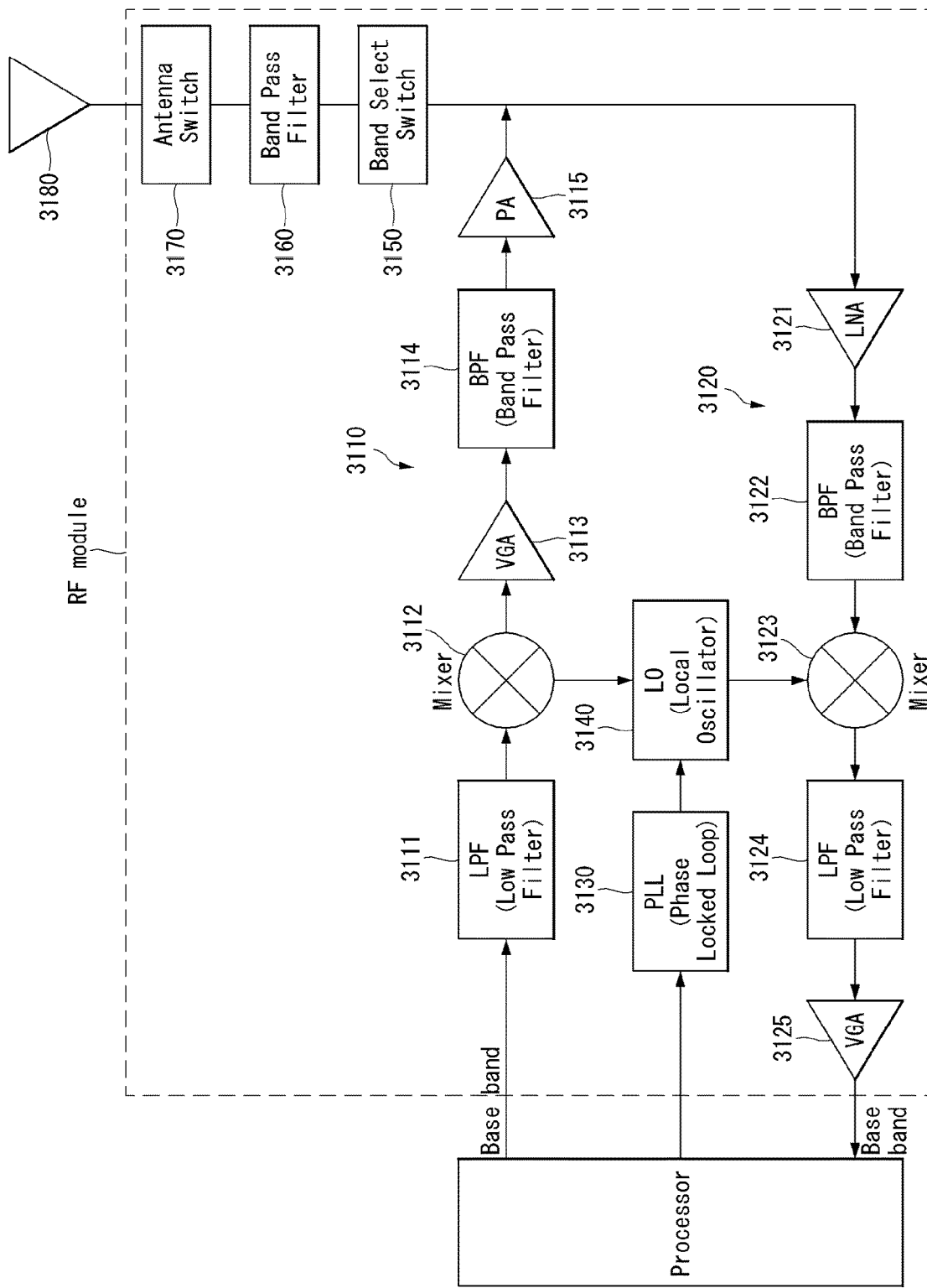
FIG. 31 is a diagram illustrating another example of an RF module of a wireless communication apparatus to which the method proposed in the present disclosure may be applied.

FIG. 31 is a diagram illustrating another example of an RF module of a wireless communication apparatus to which the method proposed in the present disclosure may be applied.

Particularly, FIG. 31 shows an example of an RF module that may be implemented in Time Division Duplex (TDD) system.

The transmitter 3110 and the receiver 3131 of the RF module in the TDD system are the same as the structures of the transmitter and the receiver of the RF module in the FDD system.

Hereinafter, only the structure of the RF module of the TDD system is described, which is different from the RF module of the FDD system, and the same structure is referred to the description of FIG. 30.

The signal amplified by a power amplifier (PA) 3115 of a transmitter is routed through a band select switch 3150, a band pass filter (BPF) 3160 and an antenna switch(s) 3170, and transmitted via an antenna 3180.

Further, in the receive path, the antenna 3180 receives signals from exterior and provides the received signals, which is routed through the antenna switch(s) 3170, the band pass filter (BPF) 3160, and the band select switch 3150, and provided to the receiver 3120.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention applied to 3GPP LTE/LTE-A system, 5G system (New RAT system) is primarily described as an example, but may be applied to various wireless communication systems in addition to the 3GPP LTE/LTE-A system, 5G system.

The invention claimed is:

1. A method for receiving a Reference Signal (RS) performed by a User Equipment (UE) in a wireless communication system, the method comprising:
receiving, from a base station, configuration information including a maximum number value related to a maximum number of symbols to which a Dedicated Demodulation Reference Signal is mapped and a configuration type of the Dedicated Demodulation Reference Signal related to (i) a time and frequency mapping pattern of the Dedicated Demodulation Reference Signal to physical resources and (ii) antenna ports configuration used to transmit the Dedicated Demodulation Reference Signal through a higher layer signaling;
receiving, from the base station, a Physical Downlink Control Channel (PDCCH) including Downlink Control Information (DCI) in relation to a configuration of the Dedicated Demodulation Reference Signal; and
receiving, from the base station, the Dedicated Demodulation Reference Signal and a Physical Downlink Shared Channel (PDSCH) based on the PDCCH,
wherein the DCI includes a DCI field for receiving the Dedicated Demodulation Reference Signal,
wherein configurations related to receiving the Dedicated Demodulation Reference Signal are configured differently based on the maximum number value and the configuration type, and
wherein the DCI field is configured based on the configurations differently configured based on the value of the maximum number value and the configuration type.

2. The method of claim 1, further comprising:
receiving, from the base station, (i) a specific PDSCH and (ii) a specific Dedicated Demodulation Reference Signal related to the specific PDSCH, before receiving the higher layer signaling,
wherein the specific Dedicated Demodulation Reference Signal is transmitted through a pattern and a specific antenna port previously set between the UE and the base station.

3. The method of claim 1,
wherein the Dedicated Demodulation Reference Signal is mapped to (i) one or (ii) one or two symbols on a time axis based on the maximum number value.

4. The method of claim 1, wherein the DCI field is related to antenna port information on which the Dedicated Demodulation Reference Signal is transmitted and/or number information of symbols.

5. The method of claim 1, wherein the Dedicated Demodulation Reference Signal is transmitted on different antenna ports, and
wherein the different antenna ports are multiplexed through at least one multiplexing method of Code Division Multiplexing (CDM) scheme or Frequency Division Multiplexing (FDM) scheme.

6. The method of claim 5, wherein the DCI field is further related to port information of antenna ports for the at least one multiplexing method.

7. The method of claim 5, wherein the different antenna ports are multiplexed through the CDM scheme on frequency and/or time axis, and
wherein the DCI field further includes port information of the different antenna ports.

8. The method of claim 5, wherein the different antenna ports are multiplexed through the CDM scheme on a time axis and/or the FDM scheme on a frequency axis, and
wherein the DCI field further includes port information of the different antenna ports.

9. The method of claim 1, wherein the configurations include (i) a first configuration for a case where a value of the maximum number value is 1 and the configuration type is a configuration type 1, (ii) a second configuration for a case where the value of the maximum number value is 1 and the configuration type is a configuration type 2, (iii) a third configuration for a case where the value of the maximum number value is 2 and the configuration type is the configuration type 1, and (iv) a fourth configuration for a case where the value of the maximum number value is 2 and the configuration type is the configuration type 2.

10. The method of claim 9, wherein a physical channel in which the Dedicated Demodulation Reference Signal and the PDSCH are transmitted is mapped on different frequency axis and time axis, based on the Dedicated Demodulation Reference Signal being mapped according to a single time axis symbol and the configuration type 1.

11. The method of claim 9, wherein the Dedicated Demodulation Reference Signal is multiplexed with a physical channel in which the PDSCH is transmitted using CDM scheme, based on the Dedicated Demodulation Reference Signal is mapped according to a two time axis symbol and the configuration type 2.

12. The method of claim 9, wherein the first configuration for the case where the value of the maximum number value is 1 and the configuration type is the configuration type 1 is configured based on antenna ports 0-3,
wherein the second configuration for the case where the value of the maximum number value is 1 and the configuration type is the configuration type 2 is configured based on antenna ports 0-5,
wherein the third configuration for the case where the value of the maximum number value is 2 and the configuration type is the configuration type 1 is configured based on antenna ports 0-7 and
wherein the fourth configuration for the case where the value of the maximum number value is 2 and the configuration type is the configuration type 2 is configured based on antenna ports 0-11.

13. The method of claim 12, wherein the DCI field is configured for layer values of a value smaller than a Rank Indicator having a maximum value among remaining Rank Indicators except a Rank Indicator represented by a codebook subset restriction (CBSR).

14. The method of claim 12, wherein the DCI field is configured only for layer values corresponding to remaining Rank Indicators except a Rank Indicator represented by a codebook subset restriction (CBSR).

15. The method of claim 1, further comprising:
reporting channel state information representing a channel state to the base station,
wherein the channel state information includes Rank Indicator values used for reporting the channel state information by the UE.

16. The method of claim 15, wherein the DCI field is configured based on layer values corresponding to the Rank Indicator values.

17. The method of claim 15, wherein the DCI field is configured based on layer values of a value smaller than a Rank Indicator value transmitted from the UE the most recently among the Rank Indicator values.

18. The method of claim 1, further comprising:
estimating a channel value for channel compensation based on the Dedicated Demodulation Reference Signal;
compensating a channel using the channel value;
demodulating the PDSCH; and
decoding the demodulated PDSCH.

19. A User Equipment (UE) configured to transmit and receive a Reference Signal (RS) in a wireless communication system, the UE comprising:
a radio frequency (RF) unit; and
a processor functionally connected with the RF unit,
wherein the processor is configured to perform operations comprising:
receiving, from a base station, configuration information including a maximum number value related to a maximum number of symbols to which a Dedicated Demodulation Reference Signal is mapped and a configuration type of the Dedicated Demodulation Reference Signal related to (i) a time and frequency mapping pattern of the Dedicated Demodulation Reference Signal to physical resources and (ii) antenna ports configuration used to transmit the Dedicated Demodulation Reference Signal through a higher layer signaling;
receiving, from the base station, a Physical Downlink Control Channel (PDCCH) including Downlink Control Information (DCI) in relation to a configuration of the Dedicated Demodulation Reference Signal; and
receiving, from the base station, the Dedicated Demodulation Reference Signal and a Physical Downlink Shared Channel (PDSCH) based on the PDCCH,
wherein the DCI includes a DCI field for receiving the Dedicated Demodulation Reference Signal,
wherein configurations related to receiving the Dedicated Demodulation Reference Signal are configured differently based on the maximum number value and the configuration type, and
wherein the DCI field is configured based on the configurations differently configured based on the value of the maximum number value and the configuration type.

20. A method for transmitting a Reference Signal (RS) performed by a base station in a wireless communication system, the method comprising:
transmitting, to a user equipment (UE), configuration information including a maximum number value related to a maximum number of symbols to which a Dedicated Demodulation Reference Signal is mapped and a configuration type of the Dedicated Demodulation Reference Signal related to (i) a time and frequency mapping pattern of the Dedicated Demodulation Reference Signal to physical resources and (ii) antenna ports configuration used to transmit the Dedicated Demodulation Reference Signal through a higher layer signaling;
transmitting, to the UE, a Physical Downlink Control Channel (PDCCH) including Downlink Control Information (DCI) in relation to a configuration of the Dedicated Demodulation Reference Signal; and
transmitting, to the UE, the Dedicated Demodulation Reference Signal and a Physical Downlink Shared Channel (PDSCH) based on the PDCCH,
wherein the DCI includes a DCI field for receiving the Dedicated Demodulation Reference Signal,
wherein configurations related to receiving the Dedicated Demodulation Reference Signal are configured differently based on the maximum number value and the configuration type, and
wherein the DCI field is configured based on the configurations differently configured based on the value of the maximum number value and the configuration type.

* * * * *